US012675695B1

(12) United States Patent
Jeong

(10) Patent No.: US 12,675,695 B1
(45) Date of Patent: Jul. 7, 2026

(54) FUNCTION APPROXIMATION UNIT CONFIGURED TO APPROXIMATE NONLINEAR FUNCTIONS IN A NEURAL PROCESSING UNIT AND OPERATING METHOD THEREOF

(71) Applicant: DEEPX CO., LTD., Seongnam-si (KR)

(72) Inventor: Jin Ung Jeong, Seoul (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 19/325,156

(22) Filed: Sep. 10, 2025

(30) Foreign Application Priority Data

Jul. 23, 2025 (KR) ......................... 10-2025-0099529

(51) Int. Cl.
*G06N 3/08* (2023.01)
(52) U.S. Cl.
CPC ...................................... *G06N 3/08* (2013.01)
(58) Field of Classification Search
CPC ...................................................... G06N 3/08
See application file for complete search history.

(56) References Cited

U.S. PATENT DOCUMENTS

| | | | |
|---|---|---|---|
| 8,037,119 B1 * | 10/2011 | Oberman .............. | G06F 7/5324 |
| | | | 708/503 |
| 2022/0012571 A1 * | 1/2022 | Pillai ........................ | G06N 3/10 |
| 2024/0289168 A1 * | 8/2024 | Ananthanarayanan ...................... | |
| | | | G06N 3/063 |

OTHER PUBLICATIONS

Kokane, Omkar, et al. "DA-VINCI: Dynamically-configurable Activation function for Versatile Neuron via CORDIC Implementation." Authorea Preprints (2025). (Year: 2025).*

* cited by examiner

*Primary Examiner* — Hal Schnee

(74) *Attorney, Agent, or Firm* — Bridgeway IP Law Group, PLLC; Jihun Kim

(57) ABSTRACT

Methods and devices of a function approximation unit configured to approximate a nonlinear function within a neural processing unit are described. According to one embodiment, the method includes storing an input value through an input register of the function approximation unit, transmitting the input value to a selected one of a plurality of preprocessing circuits of the unit according to a control signal, generating a preprocessing result corresponding to the input value by the selected one of the preprocessing circuits, transmitting the preprocessing result to a programmable function approximation circuit and a selected one of a plurality of post-processing circuits of the unit, generating an approximated function output based on the preprocessing result in the programmable function approximation circuit, and generating a final output value by post-processing the preprocessing result or the approximated function output in the selected one of the post-processing circuits.

19 Claims, 35 Drawing Sheets npu is an AI accelerator ——→   NPU
                               (100)   ——→ yes, I am the AI accelerator S11 — Obtain an attention score S12 — Process the attention score through a feed-forward neural network S13 — Generate a final output token

10000

1000

BUS_1
(310)

BUS_3
(330)

MEM
(2000)

NPU
(100)

S_MEM
(400)

BUS_2
(320)

CPU
(200)

FuncApx

FUNCTION APPROXIMATION UNIT CONFIGURED TO APPROXIMATE NONLINEAR FUNCTIONS IN A NEURAL PROCESSING UNIT AND OPERATING METHOD THEREOF

CROSS-REFERENCE TO RELATED APPLICATIONS

This application claims priority to Korean Patent Application No. 10-2025-0099529 filed on Jul. 23, 2025, in the Korean Intellectual Property Office, the disclosure of which is incorporated herein by reference.

BACKGROUND OF THE DISCLOSURE

Technical Field

The present disclosure relates to a neural processing unit and method including a dedicated circuit for an activation function. More specifically, the present disclosure relates to a neural processing unit and method including a dedicated circuit for an activation function that can accelerate a language generation model.

Background Art

Humans possess intelligence that enables them to perform tasks such as recognition, generation, classification, inference, prediction, and control/decision making. Artificial intelligence (AI) refers to the artificial imitation of human intelligence.

The human brain is composed of numerous nerve cells called neurons, and each neuron is connected to hundreds or thousands of other neurons through connections called synapses. A neural network (ANN) model is a model of the operating principles of biological neurons and the connections between them, and it is created to imitate human intelligence. In other words, a neural network is a system in which nodes that imitate neurons are connected in a layer structure.

As neural network technology has advanced, the application of neural network inference services utilizing big data-based training has become increasingly diverse. These inference services can infer various and complex data through a learned model, which is the result of training a neural network on a vast dataset. However, as the functionality and accuracy required for neural network inference services continue to increase, the parameter size, computational complexity, and memory bandwidth demands of neural network models are increasing exponentially. Consequently, the performance requirements for processors and memory that can support these inference tasks are also increasing. To address these demands, neural network inference services are increasingly being deployed on cloud computing-based servers that provide efficient processing capabilities for large-scale data operations.

Generative artificial intelligence models are increasingly being developed to operate in various environments. These models include various neural network models, including language models for interactive systems, stable diffusion models that generate images from text input, and transformer models that predict and determine future activities based on a series of events in a specific situation. The computational cost of generating a response to an input query based on these generative artificial intelligence models is very high. For example, among generative artificial intelligence models, the commercialization of large language models (LLMs) has become widespread.

Generative artificial intelligence models are very diverse, and new models are continuously being released to the market. Representative generative artificial intelligence models include, for example, GPT, LLaMA, DeepSeek, Mistral, DBRX, Qwen, Nova, Jamba, PaLM, PanGu, OPT, Gemini, Falcon, BLOOM, CLIP, RoBERTa, ALBERT, ELECTRA, LXNet, BERT, BART, CTRL, DALL-E, Stable Diffusion, Midjourney, Imagen, DeepFloyd, Runway Gen, DreamBooth, StyleGAN, BigGAN, Sora, Pika Labs, Stable Video Diffusion, Imagen Video, Make-A-Video, Phenaki, Dreamix, VideoPoet, Text2Video-Zero, and CogVideo.

However, providing generative artificial intelligence services requires a high-performance general-purpose graphics processing unit (GPGPU). But the total power consumption of GPGPUs operated worldwide to process these LLMs has reached a level similar to the power consumption of an entire country, and this excessive energy demand is causing problems for the commercialization of LLMs. Building a GPGPU-based data center to provide LLM services requires careful evaluation of power plant capacity to determine whether the necessary energy can be supplied, and the difficulty of meeting the energy demands of these data centers in many urban areas can be a major barrier to the widespread deployment of large-scale AI models.

SUMMARY OF THE DISCLOSURE

Neural networks are classified into 'single-layer neural networks' and 'multi-layer neural networks' according to the number of layers. A typical multi-layer neural network is composed of an input layer, a hidden layer, and an output layer. (1) The input layer is a layer that receives input values, and the number of input layers is the same as the number of input variables. (2) The hidden layer is located between the input layer and the output layer and is a layer that receives signals from the input layer, extracts features, and transmits them to the output layer. (3) The output layer is a layer that receives signals from the hidden layer and outputs them to the outside.

To implement higher artificial intelligence, a deep neural network (DNN), which has an increased number of hidden layers, has been disclosed. Among DNNs, a transformer artificial neural network is a DNN based on attention technology. The transformer utilizes a large number of matrix multiplication operations. The transformer can obtain an operation value, an attention score (Q, K, V), using an input value and parameters such as a query (Q), a key (K), and a value (V). The transformer can process various inference operations based on the operation value (e.g., the attention score (Q, K, V)). The transformer has shown excellent performance in the field of generative artificial intelligence.

The transformer is utilized in various large-scale language models. For example, a language model receives a query in text form and generates a response. The response generated by the language model can be generated by re-inputting tokens generated as part of the response generated by the language model back into the language model. The cost of generating the response for such a language model is proportional to the number of parameters in the language model. Therefore, the computational cost of generating the response using the language model with a large number of parameters is high. Conversely, reducing the number of parameters can lower the computational cost and improve the response speed, but it may cause a problem of deteriorating the quality of the generated response.

Furthermore, the inference accuracy of a neural network model can vary depending on the characteristics of the activation function implemented in a neural processing unit. That is, the performance and efficiency of the neural network model are determined by the hardware implementation characteristics of the processing circuit of the activation function of the neural processing unit. In addition, a neural network model that processes an activation function with a complex formula can be processed by a hardware accelerator. When implementing a dedicated processor for the neural network model with hardware, the dedicated processor for the neural network model may require a significant chip area (e.g., a large number of logic gates). Also, such a chip may consume a considerable amount of power.

Complex functions to be solved in the neural network model mostly have nonlinearity. To solve this problem, most activation functions are functions having nonlinearity (Nonlinear Function).

The performance and efficiency of the neural network model processed in hardware can vary depending on the characteristics of the nonlinearity of the activation function applied to at least one neural network model processed by the neural processing unit.

Activation functions used in neural network models, especially nonlinear functions including log or exponential operations, have a problem of greatly increasing the complexity of digital logic design when implemented in hardware. This is a direct cause of complicating the structure of the hardware operator, thereby increasing the power consumption of the chip and reducing the operation processing speed.

To solve this problem, there is an approach of implementing a specific activation function as a hard-wired dedicated circuit, but this may face the following limitations.

First, the absence of flexibility. A hard-wired method can only process a predefined fixed function, so it is impossible to independently process newly emerging or modified activation functions according to the advancement of AI technology without hardware changes. Eventually, these functions are replaced by inefficient software processing or act as a constraint that makes the application of new AI models themselves difficult.

Second, the inefficiency of resources. Depending on the operational complexity of the activation function to be processed, the number of gates in the dedicated circuit increases exponentially, which has the disadvantage of increasing the chip area and manufacturing cost.

To solve the problem, the present disclosure describes a neural processing structure that can maximize hardware resource efficiency and reduce power consumption by hard-wiring the function to selectively perform integer-based operations for certain sections and floating-point-based vector operations for other sections, according to the characteristics of the neural network operation. Through this, a new neural processing unit structure that can overcome the limitations of existing ASICs and dramatically improve the power, performance, and area (PPA) ratio is proposed.

However, the neural processing unit to which the conventional activation function approximation technology including the above approach is applied still faced the following technical limitations.

First, there is the problem of decreased inference accuracy and inefficiency of hardware resources. Conventional polynomial approximation or lookup table (LUT) methods require an excessive amount of computation or vast hardware resources to secure inference accuracy. In particular, in the case of a transformer-based model where the data range of the nonlinear operation is wide and changes dynamically, a huge number of LUT entries are needed to cope with this using the LUT method. This may cause area overhead in hardware implementation, which is a direct cause of increasing the chip manufacturing cost and deteriorating power efficiency.

Second, there is a structural bottleneck phenomenon that slows down the operation speed. Conventional transcendental function approximation operations rely on a complex pre- and post-processing process that mixes floating-point (FP) and integer (INT) representations. It is clear that this software instruction-based sequential processing method inevitably increases the operation cycle, which is a bottleneck point that reduces the function throughput per unit time and deteriorates the overall operational efficiency of the neural network.

Third, there is the problem of a lack of flexibility and scalability that is difficult to accommodate with new models. As mentioned earlier, the existing hard-wired processor can only process a predefined fixed activation function, so it has a limitation of not being able to keep up with the development of new AI technology.

In particular, recently, there have been attempts to reduce the size of the LUT by decomposing the range of input data into a scaling part and an invariant part normalized to a specific range, and approximating only the invariant part with the LUT (e.g., Range-Invariant LUT). However, this approach follows the similar limitations. The core of the technology still relies on the look-up method. Thus, although the number of LUT entries can be reduced to partially improve memory efficiency, a multi-stage sequential processing process, such as input decomposition, LUT reference, and scaling, is required. And this may be a cause of operation latency. In other words, this is only a gradual improvement of the existing LUT method and is far from implementing high-speed processing in a single pipeline without complex instruction control.

To overcome the complex limitations of the conventional art, the present disclosure proposes the following innovative solutions.

First, to solve the problem of lack of flexibility, a programmable methodology that can approximate any type of activation function and an improved hardware design to drive it may be beneficial.

In addition, to achieve both accuracy and efficiency simultaneously, the most efficient approach to reduce the overall approximation error while lowering hardware complexity is to divide the function into several regions based on the morphological characteristics of the activation function to be approximated, and to individually program the approximation parameters improved for the characteristics of each region (e.g., linear section, nonlinear section, etc.).

To solve the problem of reduced operation speed, the present disclosure, instead of relying on software instructions, proposes a neural processing unit equipped with a function approximation unit that can process functions at high speed without complex instruction control by implementing each stage of function approximation (e.g., input value preprocessing, approximation operation, result post-processing, etc.) as an independent dedicated circuit and connecting them in a pipeline structure.

However, the problems of the present disclosure are not limited to the problems mentioned above, and other problems may be clearly understood by those skilled in the art from the following description.

According to an embodiment of the present disclosure, an operating method of a function approximation unit configured to approximate a nonlinear function within a neural processing unit, wherein the function approximation unit comprises an input register, a plurality of preprocessing circuits, a programmable function approximation circuit and a plurality of post-processing circuits, is provided. The method includes storing an input value through the input register; transmitting the input value to a selected one of the plurality of preprocessing circuits according to a control signal; generating a preprocessing result corresponding to the input value by the selected one of the plurality of preprocessing circuits; transmitting the preprocessing result to the programmable function approximation circuit and a selected one of the plurality of post-processing circuits; generating an approximated function output based on the preprocessing result in the programmable function approximation circuit; and generating a final output value by post-processing the preprocessing result or the approximated function output in the selected one of the plurality of post-processing circuits.

According to another embodiment of the present disclosure, a function approximation device configured to approximate a nonlinear function within a neural processing unit is provided. The function approximation unit includes an input register to receive and store an input value and a plurality of preprocessing circuits to perform a reciprocal function, a reciprocal of a square root function, or a negative exponential function. Here, the input value from the input register is transmitted to any one or selected one of the plurality of preprocessing circuits. The function approximation unit further includes a programmable function approximation circuit to generate an approximated function output based on a preprocessing result generated by any one or the selected one of the plurality of preprocessing circuits and a plurality of post-processing circuits to perform a reciprocal function, a reciprocal of a square root function, or a negative exponential function. The preprocessing result by any one or the selected one of the plurality of preprocessing circuits and the approximated function output from the programmable function approximation circuit may be transmitted to any one of the plurality of post-processing circuits. The function approximation unit further includes an output register to receive and store an output from the plurality of post-processing circuits.

According to the present disclosure, the following effects can be achieved.

First, operational performance and processing speed can be dramatically improved. The function approximation unit FuncApx of the present disclosure implements each stage for complex transcendental function operations such as reciprocal and reciprocal of a square root as an independent dedicated circuit and connects them in a pipeline structure. This eliminates the overhead of the conventional method of sequentially executing a large number of instructions, enabling high-speed processing of complex function operations within a few clock cycles, which has the effect of shortening the overall latency of neural network inference and maximizing throughput.

Second, the efficiency of hardware resources can be maximized and power consumption can be reduced. By dividing an activation function into several regions according to its characteristics and applying a programming method that applies improved approximation parameters to each region, the use of unnecessarily complex operation circuits can be reduced and high accuracy can be achieved with a simpler logic. This has the effect of reducing the number of gates in the hardware, thereby reducing the chip area, and significantly reducing leakage current and dynamic power consumption by selectively activating only the necessary operation circuits. As a result, a neural processing unit with a greatly improved power, performance, and area (PPA) ratio can be implemented.

Third, high inference accuracy can be guaranteed. By separating and processing the exponent part and the mantissa part of an input value, and by normalizing the input range of the mantissa part, which is the target of the approximation operation, to a specific section where the function variation is small, the approximation error can be effectively reduced even with limited hardware resources. This ultimately has the important effect of preventing the degradation of the inference accuracy of the neural network model.

Fourth, flexibility and scalability for future AI models can be secured. The function approximation unit of the present disclosure is designed to be programmable, so it can flexibly respond to various activation functions that may newly appear or be modified in the future by simply applying new programmable parameters without redesigning the hardware. This provides the effect of extending the lifespan of the neural processing unit and increasing its adaptability to continuous technological advancements.

The effects according to the present disclosure are not limited to the contents exemplified above, and more diverse effects are included within the present disclosure.

BRIEF DESCRIPTION OF THE DRAWINGS

Example embodiments are illustrated by way of example and not limitation in the figures of the accompanying drawings, in which like references indicate similar elements and in which:

FIG. 11 is a block diagram illustrating a system on chip according to a third embodiment of the first example of the present disclosure.

FIG. 12 is a block diagram illustrating a system on chip according to a fourth embodiment of the first example of the present disclosure.

Figure 1:
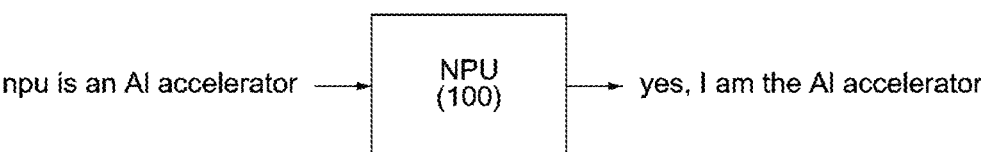
FIG. 1 is a diagram illustrating a computing system for processing a transformer-based generative artificial intelligence language model that can be applied to examples of the present disclosure.

Other features of the present embodiments will be apparent from the accompanying drawings and from the detailed description that follows.

DETAILED DESCRIPTION OF THE PRESENT DISCLOSURE

Specific structural or stepwise descriptions for the examples according to the concepts of the present disclosure disclosed herein are merely illustrated for the purpose of explaining the examples according to the concepts of the present disclosure.

Embodiments according to the concepts of the present disclosure may be implemented in various forms. The present disclosure should not be construed as being limited to the embodiments described herein.

Embodiments according to the concepts of the present disclosure may be variously modified. The present disclosure may take various forms. Therefore, specific examples are illustrated in the drawings and will be described in detail in the present disclosure. However, this is not intended to limit the examples according to the concepts of the present disclosure to a specific disclosed form. Therefore, all modifications, equivalents, or substitutes included in the spirit and technical scope of the present disclosure should be understood as being included in the present disclosure.

Terms such as first and/or second may be used to describe various components. However, the present disclosure should not be limited by these terms.

These terms are only used for the purpose of distinguishing one component from another. For example, without departing from the scope of the rights according to the concepts of the present disclosure, a first component may be named a second component, and similarly, a second component may also be named a first component.

When a component is referred to as being "connected" or "coupled" to another component, it should be understood that it can be directly connected or coupled to the other component, but that other components may also exist in between. On the other hand, when a component is referred to as being "directly connected" or "directly coupled" to another component, it should be understood that no other components exist in between.

Other expressions describing the relationship between components, such as "between" and "directly between" or "adjacent to" and "directly adjacent to," should be interpreted in the same way.

In this document, expressions such as "A or B," "at least one of A or/and B," or "one or more of A or/and B" may include all possible combinations of the items listed together. For example, "A or B," "at least one of A and B," or "at least one of A or B" may refer to all of the cases including (1) at least one A, (2) at least one B, or (3) both at least one A and at least one B.

Expressions such as "first," "second," "primary," or "secondary" used in the present disclosure may modify various components regardless of order and/or importance. These expressions are only used to distinguish one component from another and do not limit the components. For example, a first user device and a second user device may represent different user devices regardless of order or importance. For example, without departing from the scope of the rights described in this document, a first component may be named a second component, and similarly, a second component may also be renamed a first component.

The terminology used in the present disclosure is for the purpose of describing particular embodiments only and is not intended to be limiting of the scope of other examples.

A singular expression may include a plural expression unless the context clearly indicates otherwise. The terms used herein, including technical or scientific terms, may have the same meaning as commonly understood by one of ordinary skill in the art to which the technology described herein belongs.

Terms defined in general dictionaries among the terms used in the present disclosure may be interpreted as having the same or similar meaning as the meaning in the context of the related art. The terms used in the present disclosure are not interpreted in an ideal or excessively formal sense unless explicitly defined in this document. In some cases, even terms defined in the present disclosure should not be interpreted to exclude the embodiments of this document.

The terminology used in the present disclosure is for the purpose of describing particular embodiments only and is not intended to be limiting of the present disclosure.

A singular expression includes a plural expression unless the context clearly indicates otherwise. In the present disclosure, terms such as "comprising" or "having" are intended to designate the presence of a described feature, number, step, operation, component, part, or a combination thereof. Therefore, it should be understood that the presence or addition of one or more other features, numbers, steps, operations, components, parts, or combinations thereof is not precluded.

Unless otherwise defined, all terms used herein, including technical or scientific terms, have the same meaning as commonly understood by one of ordinary skill in the art to which the present disclosure belongs. Terms such as those defined in commonly used dictionaries should be interpreted as having a meaning consistent with the meaning in the context of the related art. Unless explicitly defined in the present disclosure, they are not interpreted in an ideal or excessively formal sense.

The respective features of the various examples of the present disclosure may be partially or wholly combined or coupled with each other. The various examples of the present disclosure can be technically interlocked and driven in various ways, as can be sufficiently understood by those skilled in the art. Each example of the present disclosure may be implemented independently of each other, or may be implemented together in an associated relationship.

In describing each example, descriptions of technical content that are well known in the technical field to which the present disclosure belongs and are not directly related to the present disclosure are omitted. This is to deliver the gist of the present disclosure more clearly by omitting unnecessary explanations.

In the present disclosure, a 'unit' may refer to a hardware module or a hardware circuit. For example, a '~unit' may be a hardware circuit for performing a specific function. However, a '~unit' does not necessarily mean a dedicated circuit physically separated from other circuits to perform only that function. A '~unit' may be configured based on a plurality of circuits, and these circuits may exist in different locations and perform a specific function by interlocking under a control signal. For example, an 'A unit' and a 'B unit' may include at least some common electronic circuits.

In the present disclosure, an 'artificial intelligence model' may include not only generative AI models but also traditional AI models that perform judgment, classification, prediction, and the like. An artificial intelligence model may include a language model, a model that reads images or videos, and any model that generates output data from input data using an artificial neural network may correspond to an artificial intelligence model. For example, an artificial intelligence model can generate output text from input text. An artificial intelligence model can classify input data or generate prediction data from input data. An artificial intelligence model can search for or track an object of interest from an image or video. An artificial intelligence model can perform situation judgment by analyzing an image or video. An artificial intelligence model can generate an image/video corresponding to input text based on the input text. An artificial intelligence model can generate output text describing an input image/video from the input image/video. The input data and output data can be text, voice signals, images, videos, etc., respectively, and are not limited in type.

An artificial intelligence model may be implemented as an artificial neural network. Therefore, as a representative embodiment, processing or operation for an 'artificial intelligence model' means processing or operation of an artificial neural network, and the parameters of the artificial intelligence model may include the weights of the artificial neural network, but are not limited thereto. For example, it should be understood that the processing or operation of an artificial intelligence model may include mathematical operations not included in the neural network structure, such as softmax.

A 'Transformer' is an artificial intelligence model implemented based on an Attention Mechanism and may be used in a Large Language Model (LLM) and a small LLM. Language models include BERT (Bidirectional Encoder Representations from Transformers), GPT (Generative Pretrained Transformer), RoBERTa (Robustly Optimized BERT Pretraining Approach), ALBERT (A Lite BERT), ELECTRA (Efficiently Learning an Encoder that Classifies Token Replacements Accurately), Transformer-XL (Transformer with Extra Long Context), XLNet (a model combining the advantages of GPT and BERT), BART (Bidirectional and Auto-Regressive Transformers), CTRL (Conditional Transformer Language), T5 (Text-to-Text Transfer Transformer), LaMDA (Language Model for Dialogue Applications), Gopher (DeepMind's LLM), InstructGPT (a Fine-tuned model based on GPT-3), PanGu (Huawei's Chinese model), PaLM (Pathways Language Model), OPT 175B (Open Pretrained Transformer 175B), BLOOM (BigScience Large Open-science Open-access Multilingual Model), Hyper-CLOVA (Naver's Korean super-giant model), etc., and new language models that will appear in the future may also be included.

A transformer can be utilized not only in natural language processing (NLP) but also in computer vision, and representative transformer-based vision models include ViT (Vision Transformer), Swin Transformer (Sliding Window-based Transformer for Vision), and the like.

Therefore, the transformer is one of the core techniques of various artificial intelligence models that utilize the attention mechanism. A transformer-based language model, for example, can output 'yes you are an expert' when 'npu is an ai accelerator' is input.

According to the examples of the present disclosure, a device, method, system, and computer-readable medium that enable a generative artificial intelligence service to operate on the device itself (also referred to as on-device) can be provided.

In general, a transformer-based generative artificial intelligence model receives a query and generates a response. For example, a language model receives a query in text form and generates a token. Then, the query and the generated token are input back into the language model to generate the next token. This token generation operation may be repeated several times until the response to the query is complete. A token may correspond to a word or part of a word. The response generated by the language model may include a series of tokens that are further generated by passing the tokens generated as part of the response generated by the language model back through the language model.

Figure 2:
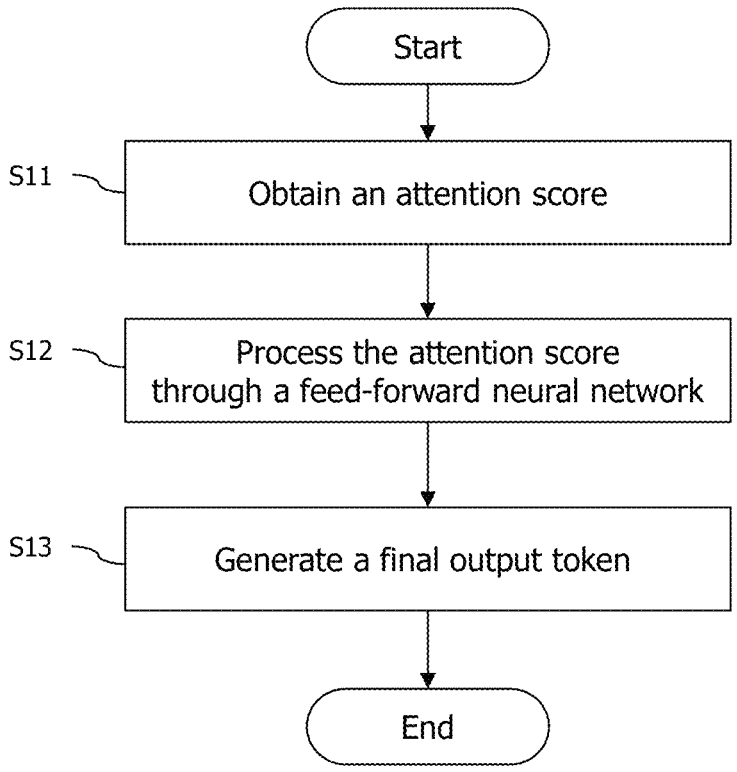
FIG. 2 is a flowchart illustrating a method of a neural processing unit for generating output data from input data using an artificial intelligence model that can be applied to examples of the present disclosure.

First, FIG. 1 and FIG. 2 illustrate a process of inferring a transformer-based generative artificial intelligence language model on an NPU, according to one embodiment. A computing system according to the present disclosure operates on an edge device and infers input text data through embedding, attention, feedforward, softmax, etc., to output nun tokens. This process is composed of numerous matrix multiplications and nonlinear operations, and the disclosed NPU enables high-speed inference through the optimization of these operations.

FIG. 1 is a block diagram illustrating a computing system for processing a language model that can be applied to examples of the present disclosure.

Referring to FIG. 1, a computing system 1 receives input data and generate output data. The computing system 1 includes a neural processing unit (NPU) 100. In addition, the computing system 1 further includes a central processing unit (CPU), a Graphics Processing Unit (GPU), a memory, and other arithmetic units in addition to the neural processing unit 100, and the embedding transformation for the input text may be performed by the central processing unit or the graphics processing unit. The transformed embedding vector is transmitted to the neural processing unit 100 and can be utilized for subsequent inference operations by the neural processing unit 100. The neural processing unit 100 can perform inference operations of a transformer-based generative artificial intelligence model. The neural processing unit 100 may be referred to as an artificial intelligence accelerator, an artificial intelligence hardware accelerator, etc., but is not limited thereto. Here, the computing system 1 may be an example of a device 10000 and may include a smartphone, a robot, an ADAS system, and the like.

The neural processing unit 100 can generate output data from input data. According to an embodiment, the input data may be text data. The output data may be text data or image/video data. The text data is composed of at least one token. For example, if text comprising five tokens, 'npu', 'is', 'an', 'AI', 'accelerator', is input to the NPU, the neural processing unit 100 may perform a transformer-based artificial neural network operation to output text comprising six tokens, 'yes', 'i' 'am' 'the', 'AI', 'accelerator'.

The transformer-based artificial neural network operation can be performed in an on-device manner. That is, the computing system 1 can be included and driven on an edge device such as a smartphone, camera, CCTV, robot, drone, etc., and does not require wired or wireless communication with the outside of the computing system 1 for the artificial neural network operation.

The transformer-based artificial neural network operation can be performed based on an attention mechanism. Under the attention mechanism, input data in text form is converted into an embedding vector through an embedding process, and the embedding vector can be converted into a query, a key, and a value vector using a vector-matrix multiplication (MatMul) with a query weight matrix, a key weight matrix, and a value weight matrix. The query weight matrix, the key weight matrix, and the value weight matrix are each pre-learned value. Thereafter, the similarity of the query Q with the key K is calculated, and an attention score can be obtained by assigning a value V to the calculated similarity.

FIG. 2 is a flowchart illustrating a method for generating output data by a neural processing unit, according to one embodiment. The neural processing unit generates output data from input data using an artificial intelligence model, which may be applied to examples of the present disclosure.

Referring to FIG. 2, in operation S11, the neural processing unit 100 obtains an attention score for the input data.

The input data may include a plurality of tokens, and each token may be represented by an embedding vector of a predetermined dimension ($d_{model}$). The number of dimensions of the embedding vector ($d_{model}$) may be, for example, 128, 256, 1024, 2048, or 4096. For convenience of explanation, $d_{model}$ is assumed to be 4096 below. In this embodiment, one token in the computing system 1 can be represented by a 1×4096 dimensional embedding vector.

For example, if a user inputs "npu is an AI accelerator" composed of 5 tokens to the computing system 1, the computing system 1 can convert the corresponding input text into a 5×4096 (i.e., five 1×4096) size embedding vector, and the neural processing unit 100 can receive the embedding vector. The neural processing unit 100 can obtain a query vector Q by vector-matrix multiplying the embedding vector by a query weight matrix. The neural processing unit 100 can obtain a key vector K by vector-matrix multiplying the embedding vector by a key weight matrix. The neural processing unit 100 can obtain a similarity through an inner product between the query vector Q and the key vector K. When the query vector Q and the key vector K are inner product multiplied, a scalar value is obtained, and as a result, a vector $QK^T$ of the same size (1×5) as the number of tokens of the input data is obtained. $QK^T$ represents the similarity of the current token with the key k (each of the 5 tokens). However, since the elements of the obtained size vector $QK^T$ can be numerically very large, for numerical stability, the final normalized similarity can be obtained by dividing $QK^T$ by the square root of the size of the key vector K ($\sqrt{d_k}$) and then applying a softmax operation. The following Equation 1 mathematically represents the similarity calculation based on softmax. k may be one of 1, 2, . . . , N (where N is the number of tokens included in the input data, in this embodiment N=5).

$$\text{Similarity with key } K \text{ of current location} = softmax\left(\frac{QK^T}{\sqrt{d_k}}\right) \quad \text{Equation 1}$$

The softmax operation is an operation that converts several numbers into probabilities between 0 and 1. Equation 2 below shows a formula for performing a softmax operation on a vector $[z_1, z_2, . . . , z_n]$.

$$\sigma(zi) = \frac{e^{z}i}{\sum_{j=1}^{n} e^{z_i}} \qquad \text{Equation 2}$$

However, if a very large value exists in zi, a numerical instability problem may occur. To solve this, a numerically more stable calculation can be made possible by using a method of subtracting the maximum value $z_{max}$ (negative exponential trick). The following Equation 3 is a softmax operation formula that modifies Equation 2 using $z_{max}$.

$$\sigma(zi) = \frac{e^{z_i - z_{max}}}{\sum_{j=1}^{n} e^{z_i - z_{max}}} \qquad \text{Equation 3}$$

Through Equation 1, the similarity can be obtained, for example, as a 1×5 size vector of [0.007, 0.993, 0, 0, 0]. The similarity is a value expressed as a probability of the similarity of the current query (e.g., 'npu') with other tokens.

According to an embodiment, the neural processing unit 100 may assign a value to the similarity. The value vector is similar to the method of calculating the key vector. The embedding vector can be converted into a value vector through a vector-matrix multiplication with a pre-learned value weight matrix. An attention score can be obtained by vector-matrix multiplying the similarity obtained through Equation 1 by the value vector V. As a result, an attention score of 5×4096 size, which is the same dimension as the input data, can be obtained by performing an operation such as the following Equation 4.

$$\text{Attention Score} = softmax\left(\frac{QK^T}{\sqrt{d_k}}\right) \times V \qquad \text{Equation 4}$$

That is, the neural processing unit 100 repeatedly performs the attention operation of Equation 4 to generate output data. In this process, it can be seen that the neural processing unit 100 repeatedly performs high-dimensional calculations including vector-matrix multiplication, division, multiplication, and the like. According to an embodiment, the neural processing unit 100 may additionally perform residual connection and layer normalization. Residual connection and layer normalization are for supplementing the possibility of gradient vanishing that may occur in the derivative-based learning method of deep learning, and can reduce information loss by adding the input value to the output value that has passed through the layer of the artificial neural network. For the residual connection, after the attention score is calculated, the embedding vector of the input data can be added to the corresponding attention score. Layer normalization can alleviate the covariant shift by adjusting the value based on the mean and variance of the output value (i.e., the result of the residual connection) in natural language processing.

Next, in operation S12, the neural processing unit 100 processes the attention score through a feed-forward neural network.

The feed-forward neural network is for predicting non-linear phenomena, and can infer contextual meanings such as phrases and clauses by recombining the relationship information of the tokens for which the attention score has been calculated. The feed-forward neural network may, for example, use a fully connected hidden layer where two layers having 2,048 nodes are all connected, and the output may be a 4,096-dimensional vector, the same as the input. The feed-forward neural network is pre-learned, and a vector-matrix multiplication operation may be repeatedly performed for inference. Here, the input is represented by a 4,096-dimensional vector as the result of passing through the residual connection and normalization in step S11, and the residual connection and normalization of step S11 may be additionally performed on the output of the hidden layer composed of two layers.

Next, in operation S13, the neural processing unit 100 generates a final output token.

For this, the output vector calculated in step S12 must be expanded to the number of the entire token set that can be processed by the language model (e.g., 30,000). For example, the output vector of step S12 can be expanded to a 1×30000 size logit vector by being matrix multiplied with a final output weight matrix (e.g., 4,096×30,000). The size of the final output weight matrix for the final output is dmodel×SIZE_DIC, where SIZE_DIC represents the total number of tokens that can be output from the language model being inferred in the neural processing unit 100 (in this embodiment, 30,000). A softmax operation is applied to the calculated 1×30,000 size logit vector, so that all 30,000 tokens are normalized to probability values between 0 and 1, and the token with the highest probability value among the 30,000 probability values can be selected as the next output token to be generated. For example, if the input to the neural processing unit 100 is 'npu is an AI accelerator', the output token may be determined as 'yes, I am the AI accelerator'.

As described above with reference to FIG. 1 and FIG. 2, the neural processing unit repeatedly performs numerous matrix multiplication operations (MatMul), vector operations, scalar operations, and the like for the inference operation of the transformer-based artificial neural network model, and the neural processing unit needs to be improved for these operations. Hereinafter, the structure and operation of the neural processing unit 100 will be described.

Figure 3:
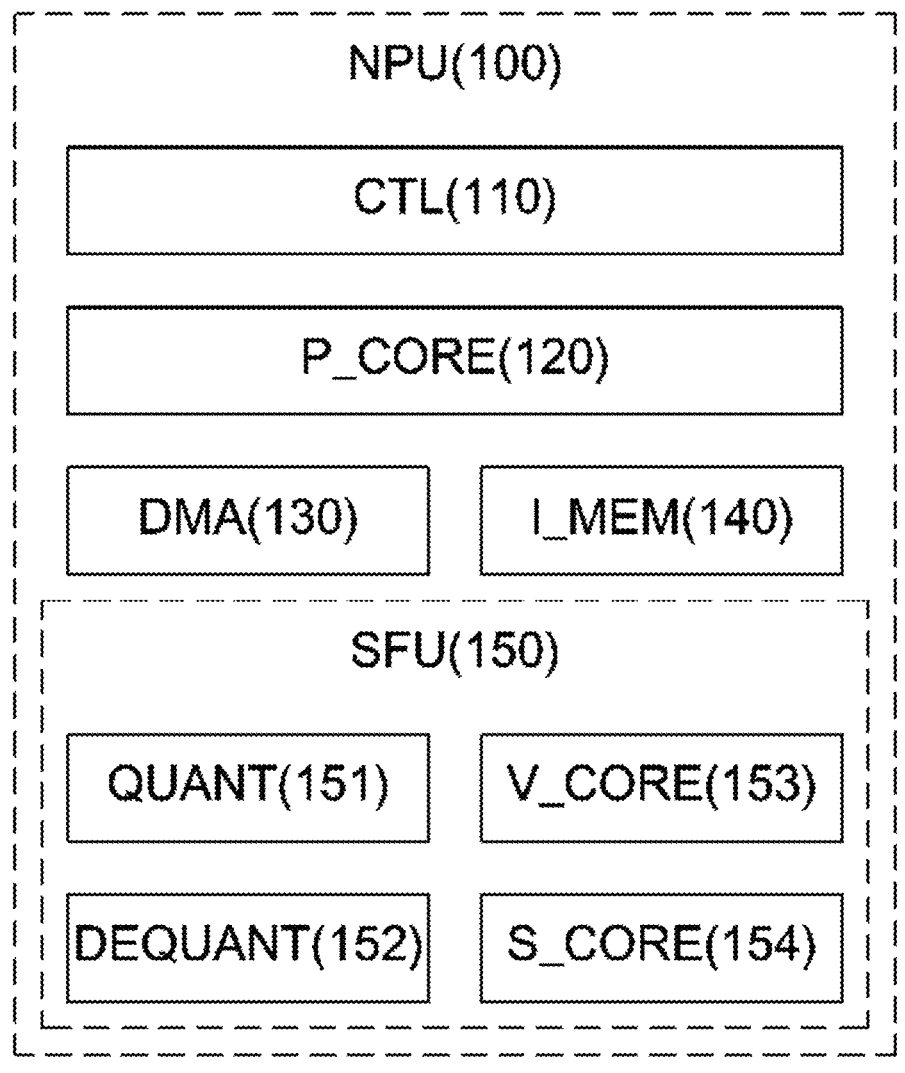
FIG. 3 is a block diagram illustrating a neural processing unit that can be applied to examples of the present disclosure.

FIG. 3 is a block diagram illustrating a neural processing unit that can be applied to examples of the present disclosure.

The neural processing unit 100 will be described in detail with reference to FIG. 3. The neural processing unit 100 is a dedicated processor specialized for deep neural network (DNN) operations, separate from a processor such as a central processing unit or a graphics processing unit. The neural processing unit 100 may be referred to as a tensor processing unit (TPU), an AI accelerator, a neural signal processor (NSP), a neural network processor (NNP), or the like.

The neural processing unit 100 may be a semiconductor implemented with electrical/electronic circuits. That is, each component of the neural processing unit 100 may be a semiconductor circuit composed of numerous electronic elements (e.g., transistors, capacitors, electrical wiring, etc.). Therefore, some of them may be difficult to identify and distinguish with the naked eye and can only be identified by their operation.

This neural processing unit 100 is for accelerating artificial neural network operations and is also called an artificial intelligence hardware accelerator. The artificial neural network can output the operations of a transformer-based language model. However, it is not limited to this and can also process vision-based models such as YOLO or ResNet. It can be mounted on a device 10000 and output various information based on artificial intelligence. The device

10000 may include a central processing unit, a graphics processing unit, an application processor (AP), a microcontroller unit (MCU), and the like, in addition to the neural processing unit 100. The device 10000 may include a microphone, a camera, a touch pad, a keyboard, etc., to receive input data, and may include a monitor, a speaker, etc., to output Reset data. The device 10000 may include a smartphone, a secretary terminal located at home or in an office, a home appliance, a VCU or ADAS system of a vehicle, a camera such as a CCTV, a robot, smart mobility, etc., but is not limited thereto.

The neural processing unit 100 according to the examples of the present disclosure is specially designed to accelerate the processing of the attention algorithm of a transformer-based neural network model with low power, which will be described in detail later. However, the neural processing unit 100 of the present disclosure is not limited to transformer neural networks and can process various neural network models such as a Convolutional Neural Network (CNN).

The neural processing unit 100 that can be applied to the examples of the present disclosure includes a controller (CTL) 110, a processing core (P_CORE) 120, a direct memory access (DMA) 130, an internal memory (I_MEM) 140, and a special function unit (SFU) 150.

The processing core 120, the vector core V_CORE 153, and the scalar core S_CORE 154 of the neural processing unit 100 may be arithmetic circuits configured to efficiently process the attention layer of a neural network model. The attention layer can obtain an attention score (Q, K, V), which is an operation value, using an input value and parameters such as a query Q, a key K, and a value V.

The processing core 120, the vector core 153, and the scalar core 154 are designed to process operations such as matrix multiplication, root mean square normalization, and softmax for the attention operation. The tensor data form required for these operations may be one of a multi-dimensional matrix form, a 2D matrix form, a 1D array form, or a scalar value, and the processing core 120, the vector core 153 or the scalar core 154 may be selected for the operation according to the data form. Therefore, the neural processing unit 100 can rapidly accelerate the operation of a generative artificial intelligence model with low power by appropriately adopting a suitable hardware module according to the operation.

That is, the processing core 120 can handle the mathematical operations necessary for artificial neural network inference operations and may include an ALU (Arithmetic Logic Unit), a MAC (Multiply-Accumulate Unit), an Adder Tree, and the like.

The controller 110 is electrically connected to the processing core 120, the direct memory access unit 130, the internal memory 140, and the special function unit 150. The controller 110 may be configured to control operations related to the neural network operations of the neural processing unit 100. The controller 110 can control each circuit included in the neural processing unit 100 to process the inference operation of the neural network model by an execution code generated by a compiler (not shown). The compiler (not shown) may be a semiconductor circuit or a software module that operates on a separate device from the neural processing unit 100.

The compiler (not shown) can obtain an execution code executable on the neural processing unit 100 by compiling a specific neural network model. That is, the compiler (not shown) can generate an execution code that can be exclusively executed on a specific neural processing unit having a specific performance. The execution code may also be referred to as machine code or binary code.

The controller 110 can control the processing core 120, the direct memory access unit 130, the internal memory 140, the special function unit 150, and the like based on various commands and operation schedules included in the execution code. The compiler (not shown) can be provided with the hardware characteristics of the neural processing unit 100 (e.g., the operational performance of the processing core 120, the operational performance of the vector core 153, the operational performance of the scalar core 154, the processing performance of the number system conversion units (quantization unit (QUANT) 151 and dequantization unit (DEQUANT) 152), the capacity of the internal memory 140, and the main memory (not shown) bandwidth of the corresponding bus (not shown), etc.). In addition, the compiler (not shown) can be provided with the structure information of the neural network model to be processed by the neural processing unit 100, information on the algorithms included in the neural network model, and information on the size of the parameters. Then, the compiler (not shown) can generate an execution code for controlling the read/write order of data required for the neural network operation, the neural network operation processing order, the operation status of each component of the neural processing unit 100, and the like. The controller 110 can be provided with the execution code from the compiler and control the neural processing unit 100 based on the execution code. Each execution code can be generated corresponding to each neural network model, and the neural processing unit 100 can be configured to process at least one execution code.

The processing core 120 may include an electronic circuit specialized for matrix multiplication, which accounts for the largest amount of computation in neural network operations. For example, the processing core 120 may be composed of a plurality of processing elements. For example, the processing core 120 may be designed with an M×N (where M and N are integers) processing element array structure or an adder tree structure, but is not limited thereto. The processing core 120 may be configured to process the matrix multiplication operation of input data and corresponding parameters (e.g., weights, kernels, query Q, key K, value V, etc.) in a parallel processing manner based on a plurality of processing elements (PE) (not shown).

For this, the processing elements (not shown) may each include a multiply and accumulate (MAC) operator. Therefore, the processing core 120 can efficiently process matrix multiplication or convolution operations. To elaborate, the processing core 120 may be a circuit designed to simultaneously process M×N size tensor data. The number of processing cores 120 may be at least one. The processing core 120 can exchange data with the vector core 153, the scalar core 154 of the special function unit 150, the internal memory 140, and the main memory (not shown). The processing core 120 may be configured to receive integer parameters and output integer parameters. The input integer parameters may include input parameters and weights. The input parameters may be configured to have a first bit width, and the weight parameters may be configured to have a second bit width. The output integer parameters may be configured to have a third bit width, and the third bit width may be configured to be larger than the first bit width or the second bit width.

As the number of processing elements (not shown) included in the processing core 120 increases, the number of transistors in the application specific integrated circuit (ASIC) may increase, and the manufacturing cost may increase. If the circuit of the processing core 120 is designed to process integer parameters instead of floating-point numbers, the number of transistors in the ASIC can be significantly reduced, and the power consumption of the neural processing unit 100 can be significantly reduced.

The bit width of the integer parameters that the processing core 120 can process can be determined based on the hardware design of the processing element (not shown). This will be described later in FIG. 4. The number of processing elements (not shown) can be from several hundred to tens of thousands. To elaborate, the number of transistors included in a processing element designed to process floating-point parameters is about four times greater than the number of transistors included in a processing element designed to process integer parameters. Therefore, if the circuit of the processing core 120 of the neural processing unit 100 according to the examples of the present disclosure is designed to exclude floating-point parameter operations and operate only on integer parameters, the number of transistors can be reduced by about 75% compared to a floating-point operation circuit. In this embodiment, the number of processing elements (not shown) included in the processing core 120 can be easily increased in the same chip area compared to floating-point, and there is an effect of improving the operation processing performance with low power while reducing the size of the semiconductor chip.

The special function unit 150 refers to a collection of various circuit units configured to process various neural network operations not processed by the processing core 120. That is, it is a circuit that can accelerate special operations that are difficult to perform in an ALU. The special function unit 150 can perform exponential operations, log functions (log, ln), square roots (sqrt), reciprocal and reciprocal square roots (reciprocal, $1/\text{sqrt}(x)$), trigonometric functions (Sin, Cos, Tan, ArcSin, ArcCos), quantization (INT8/FP16 conversion) operations, and the like. For example, the special function unit 150 includes a quantization unit 151, a dequantization unit 152, a vector core 153, and a scalar core 154. The quantization unit 151 and the dequantization unit 152 may be collectively referred to as a number system conversion unit, but are not limited thereto.

The quantization unit 151 of the special function unit 150 can convert floating-point (FP) data to integer (INT) data, and the dequantization unit 152 can convert integer data back to floating-point data.

The vector core 153 of the special function unit 150 refers to a set of circuits that process at least a part of the remaining operations of the artificial intelligence model, excluding the matrix multiplication processed by the processing core 120. The vector core 153 may be designed to include a plurality of specialized vector operation circuits. For example, the vector core 153 includes a vector maximum value operation unit (V_MAX) 1531, a vector multiplication unit V_MUL 1532, a vector addition unit (V_ADD) 1533, a MAC operation unit (V_MAC) 1534, a mask unit (V_MASK) 1535, a rounding and clipping unit (RND_CLIP) 1536, and a vector function approximation unit V_FuncApx 1537. The operation of each module of the vector core 153 will be described later with reference to FIG. 5.

The scalar core 154 of the special function unit 150 refer to a set of circuits that process at least a part of the remaining operations of the artificial intelligence model, excluding the operations processed by the processing core 120 and the vector core 153. The scalar core 154 may be designed to include a plurality of specialized scalar operation circuits. For example, the scalar core 154 includes a scalar maximum value operation unit (S_MAX) 1541, a scalar multiplication unit S_MUL 1542, a scalar addition unit (S_ADD) 1543, a scalar summation unit (S_SUM) 1544, and a scalar function approximation unit S_FuncApx 1545. The operation of each module of the scalar core 154 will be described later with reference to FIG. 6.

The direct memory access unit 130 may enable access at least one memory electrically connected to the neural processing unit 100 to perform data read/write operations. The at least one memory may include at least one of a main memory (not shown), a shared memory (not shown), a storage device (not shown), and the like. The neural processing unit 100 can transmit various data related to artificial intelligence operations to the at least one memory (not shown) or read data from the at least one memory (not shown) through the direct memory access unit 130. The direct memory access unit 130 may be configured to perform operations such as setting the address of the internal memory 140, generating and controlling read/write commands, and the like. The direct memory access unit 130 may be connected to at least one communication bus and configured to control the at least one memory.

The internal memory 140 is a memory located in the on-chip area of the neural processing unit 100. The internal memory 140 may include a memory for caching or storing data processed in the on-chip area and/or a register file for storing instructions for driving a compiled neural network model. The register file may also be configured to be included in the controller 110. For example, when a memory (not shown) connected to a bus is provided, the internal memory 140 can read and store data required for operations from the memory. The internal memory 140 may include SRAM, a Register file, DRAM, Resistive RAM, Magneto-resistive RAM, Phase-change RAM, Ferroelectric RAM, or Flash Memory. The internal memory 140 may be composed of at least one memory unit. The internal memory 140 may be composed of a single (homogeneous) memory unit or a heterogeneous memory unit. The capacity of the internal memory 140 may be several megabytes to tens of megabytes, but is not limited thereto.

The quantization unit 151 of the special function unit 150 may be configured to include a quantization circuit. The dequantization unit 152 may be configured to include a dequantization circuit. The quantization unit 151 and the dequantization unit 152 may be referred to as a number system conversion unit.

According to an embodiment, the input and output of the processing core 120 may be in integer form. The input and output of the vector core 153 and the scalar core 154 may be in floating-point form. The quantization unit 151 and the dequantization unit 152 can convert data into the data form (number system) required by each hardware during data transmission between the processing core 120, the vector core 153, and the scalar core 154. That is, the quantization circuit of the quantization unit 151 can convert floating-point parameters to integer parameters. The dequantization circuit of the dequantization unit 152 can convert integer parameters to floating-point parameters.

According to the examples of the present disclosure, the floating-point is not limited to the IEEE standard 754, and for the operational efficiency of the neural processing unit 100, reduction of memory usage, reduction of power consumption, and the like, brain floating-point, dynamic floating-point, variable precision floating-point (VPFP), custom floating-point (CFP), or flexible floating-point (FFP) may be applied. VPFP is a floating-point format that can dynamically set or adjust the bit width of the exponent and mantissa. Using The VPFP allows for flexible precision levels based on specific calculations to improve power and performance. Dynamic floating-point formats, used interchangeably with variable precision, allow for on-the-fly adjustment of the mantissa and exponent sizes during runtime, enabling response to data characteristics in real time. The CFP refers to an application-specific format where the bit allocation for the mantissa and exponent is tailored to the needs of a specific use case. This can be useful for implementing the neural processing unit 100 that selects the exact bit width to increase efficiency of hardware resources and the accuracy of data. The FFP refers to a floating-point format that allows for adjustable bit allocation between the exponent and the mantissa. The FFP can be implemented in the neural processing unit 100 to provide an optimal balance between range and precision. The bit width of the floating-point according to the examples of the present disclosure may be between 4 bits and 32 bits. The bit width of the integer according to the examples of the present disclosure may be between 4 bits and 32 bits.

The neural processing unit 100 disclosed in the present disclosure may provide a power gating function, a clock gating function, or a register retention function to allow the neural processing unit 100 to operate at low power.

The power gating function is a technique that may eliminate or reduce leakage power by cutting off the power to unused circuit blocks. A power switch is provided to the circuit block to which power gating is applied. Accordingly, a specific circuit block of the neural processing unit 100 can be disconnected from the power source using the power switch. The power gating function can eliminate both dynamic power and leakage power, allowing the device to operate in a low-power mode.

The clock gating function is a technique that reduces dynamic power consumption by cutting off the clock signal to unused circuit blocks. A circuit block to which clock gating is applied can selectively cut off the clock signal input to a specific circuit block using clock control logic. When clock gating is applied, since power is continuously supplied to the neural processing unit (NPU), the state of the circuit can be maintained. Since the power is not turned off with clock gating, operation can be resumed immediately by reactivating the clock, and dynamic power can be saved by preventing unnecessary switching activity.

The register retention function is a technique designed to allow a specific register of the neural processing unit 100 to maintain its state even when the power is turned off. A register to which register retention is applied can maintain the data stored in the register using only low power in sleep mode. Therefore, even if the register enters a power-saving mode, important register values are maintained, so initialization is not required upon return. Register retention can provide low-power operation, and can maintain data using extremely low power even when the power of the neural processing unit 100 is turned off.

The hardware operation between each component of the neural processing unit 100 of FIG. 3 will be described in detail below based on FIG. 8.

Figure 4:
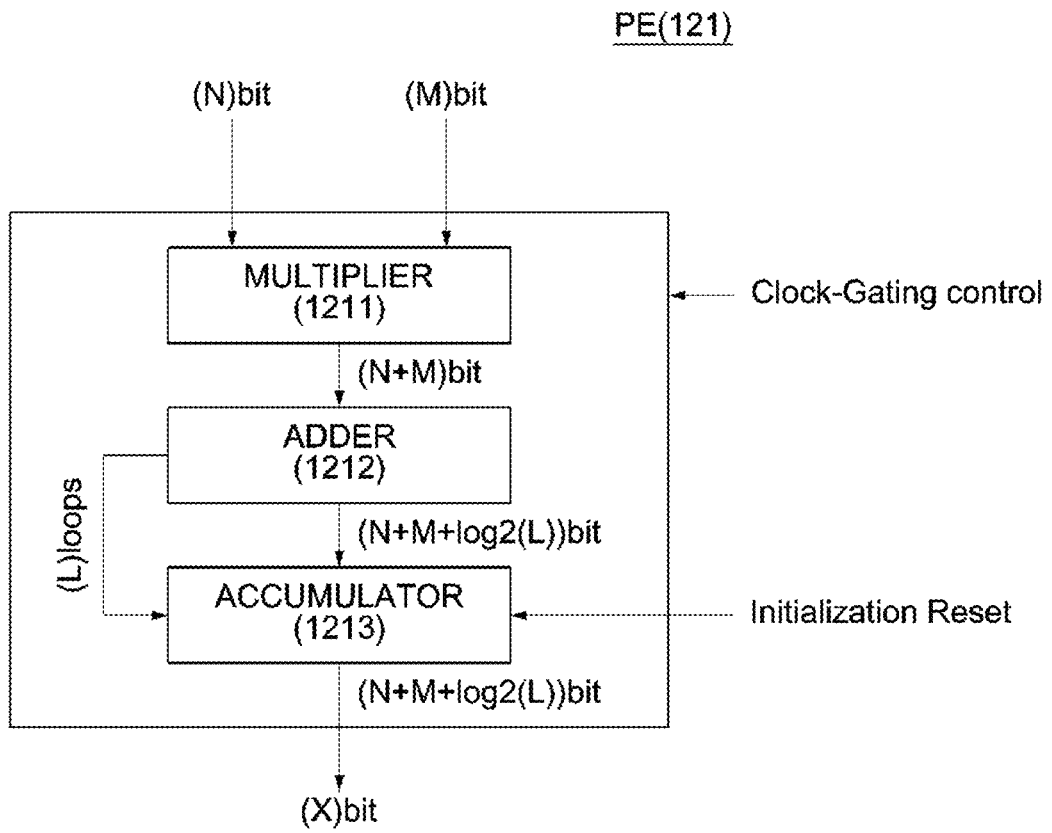
FIG. 4 is a block diagram illustrating a processing element that can be applied to examples of the present disclosure.

FIG. 4 is a block diagram illustrating a processing element that can be applied to examples of the present disclosure.

Referring to FIG. 4, a processing element 121 includes a multiplier 1211, an adder 1212, and an accumulator 1213. The processing element 121 of FIG. 4 may be one of a plurality of processing elements included in the processing core 120 of FIG. 3, and hereinafter, the processing element 121 may be referred to as representing each processing element.

The multiplier 1211 multiplies the received (N) bit data and (M) bit data. The operation value of the multiplier 1211 is output as (N+M) bit data. Here, N and M are integers greater than 0. A first input unit may be configured to receive (N) bit data. A second input unit may be configured to receive (M) bit data. For example, the first input unit may be configured to receive input parameters and the second input unit may be configured to receive weight parameters.

The bit width of the parameters input to the first input unit and the second input unit of the processing element 121 can be determined when compiling the current neural network model processed by the neural processing unit 100 to obtain an execution code. That is, the bit width of the input parameters and the bit width of the weight parameters of the neural network model can be determined in the compilation step by the compiler. For example, the bit width of the input parameters and the weight parameters can be quantized to be the same, and the bit width can be 32 bits, 16 bits, 8 bits, 4 bits, etc., but the present disclosure is not limited thereto. For example, the bit width of the input parameters and the bit width of the weight parameters can be determined to be different from each other, and the parameters can be quantized based on each bit width. For example, the bit width of the input parameters and the bit width of the weight parameters can be quantized to 16 bits and 8 bits, respectively. For example, the bit width of the input parameters and the bit width of the weight parameters can be quantized to 8 bits and 4 bits, respectively. That is, the bit width of the parameters input to each input unit of the processing element 121 can be different from each other. The quantization information of the data input to each input unit of the processing element 121 may be included in the execution code.

The accumulator 1213 accumulates the operation value of the multiplier 1211 and the operation value of the accumulator 1213 using the adder 1212 for (L) loops times. Therefore, the bit width of the data of the output unit and the input unit of the accumulator 1213 can be output as (N+M+log $_2$(L)) bit where L is an integer greater than 0. When the accumulation is finished, an initialization reset signal may be input to initialize the data stored in the accumulator 1213 to 0. The accumulator 1213 of the processing element 121 is configured to maintain the accumulated value when zero skipping is activated. The output data (X) bit can be set to a bit width that does not cause an overflow of the output data (X) bit based on the maximum value that can be accumulated in the accumulator 1213. For example, (X) bit may be 16 bits to 64 bits.

To elaborate, the quantization unit 151 of the special function unit 150 can convert the integer parameters output from the processing core 120 into floating-point and transmit them to the vector core 153, the scalar core 154, and/or the internal memory 140. The quantization unit 151 can be controlled under the control signal of the controller 110.

Figure 7:
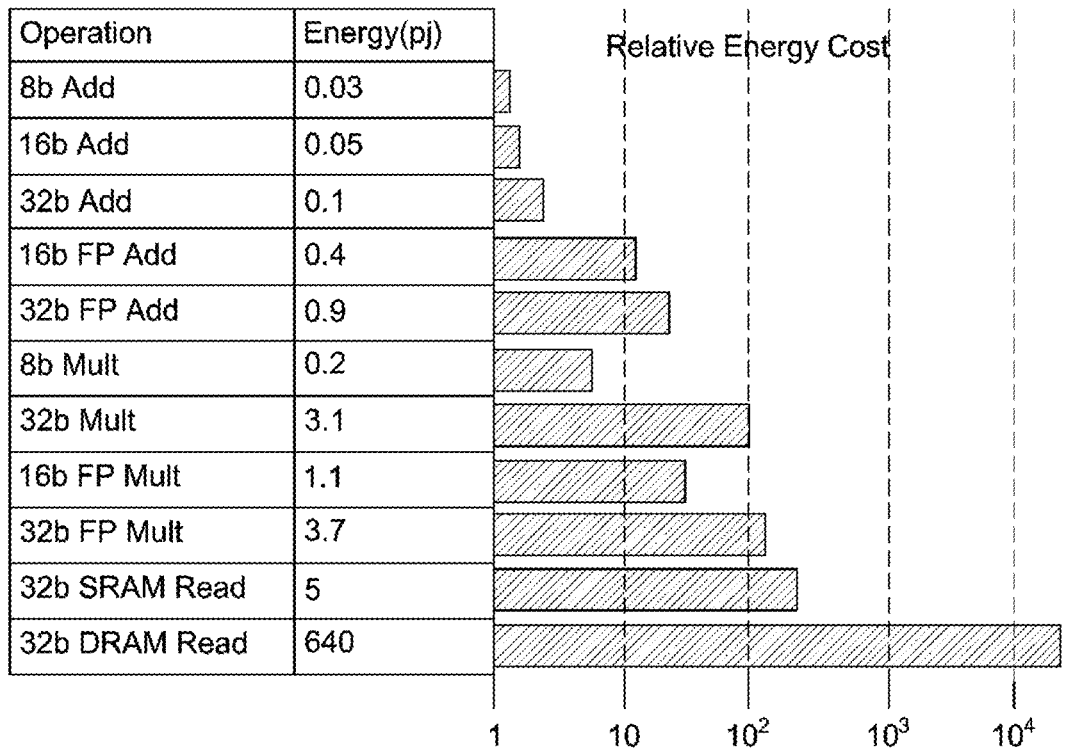
FIG. 7 is a diagram schematically illustrating the energy consumption per unit operation of a neural processing unit that can be applied to examples of the present disclosure.

The controller 110 can restrict the operation of the multiplier 1211 so that it does not operate (e.g., zero skipping operation) based on the fact that the operation result is 0 even if it does not operate when 0 is input to the first input unit or the second input unit of the multiplier 1211. For example, when 0 is input to the first input unit or the second input unit of the multiplier 1211 of the processing element 121, the multiplier 1211 can operate in a zero skipping manner. For zero skipping, each processing element 121 included in the processing core 120 can be activated or deactivated, respectively. The controller 110 can provide an activation or deactivation signal (CLOCK-GATING CONTROL) to each processing element 121 on a clock-by-clock basis. When the processing element 121 is deactivated, the multiplier 1211 is deactivated. Accordingly, the power consumed for the operation of the multiplier 1211 can be reduced. An example of the power consumption of the multiplier 1211 is shown in FIG. 7.

The processing element 121 may be designed to receive a control signal (CLOCK-GATING CONTROL) for zero skipping operation control (i.e., activation or deactivation) from the controller 110. Specifically, the multiplier 1211 of the processing element 121 may be designed to receive each control signal (CLOCK-GATING CONTROL) for zero skipping operation control from the controller 110. Alternatively, the adder 1212 of the processing element 121 may be modified to be designed to receive a control signal (CLOCK-GATING CONTROL) for zero skipping operation control from the controller 110. Alternatively, each of the multiplier 1211 and the adder 1212 of the processing element 121 may be modified to simultaneously receive each control signal (CLOCK-GATING CONTROL) for zero skipping operation control from the controller 110.

The controller 110 may improve the operation path by pre-reflecting the normalization coefficient included in the weights of the neural network model at the compile time to integrate it into the weights before the softmax operation is performed, and omitting the corresponding multiplication operation (FpMul) at runtime. This corresponds to a static optimization method for reducing operational efficiency and power consumption by eliminating unnecessary runtime multiplication operations.

In addition, the controller 110 may selectively control whether to execute the multiplication operation between the query vector and the key vector according to the type of operation request (e.g., attention operation, feedforward operation, etc.) or the operation timing (e.g., decoding stage, learning stage, etc.). This configuration can be implemented by controlling the clock supply of the processing element 121 including the multiplier 1211 or by bypassing the operation path itself to omit the operation.

This control may be processed inside the neural processing unit 100, or may be performed through an integrated controller in a system on chip (SoC) architecture including a plurality of arithmetic units. In this case, the controller 110 may be configured to dynamically adjust whether to activate the operation for each operation unit, including clock gating or power control signals for each unit.

Figure 5:
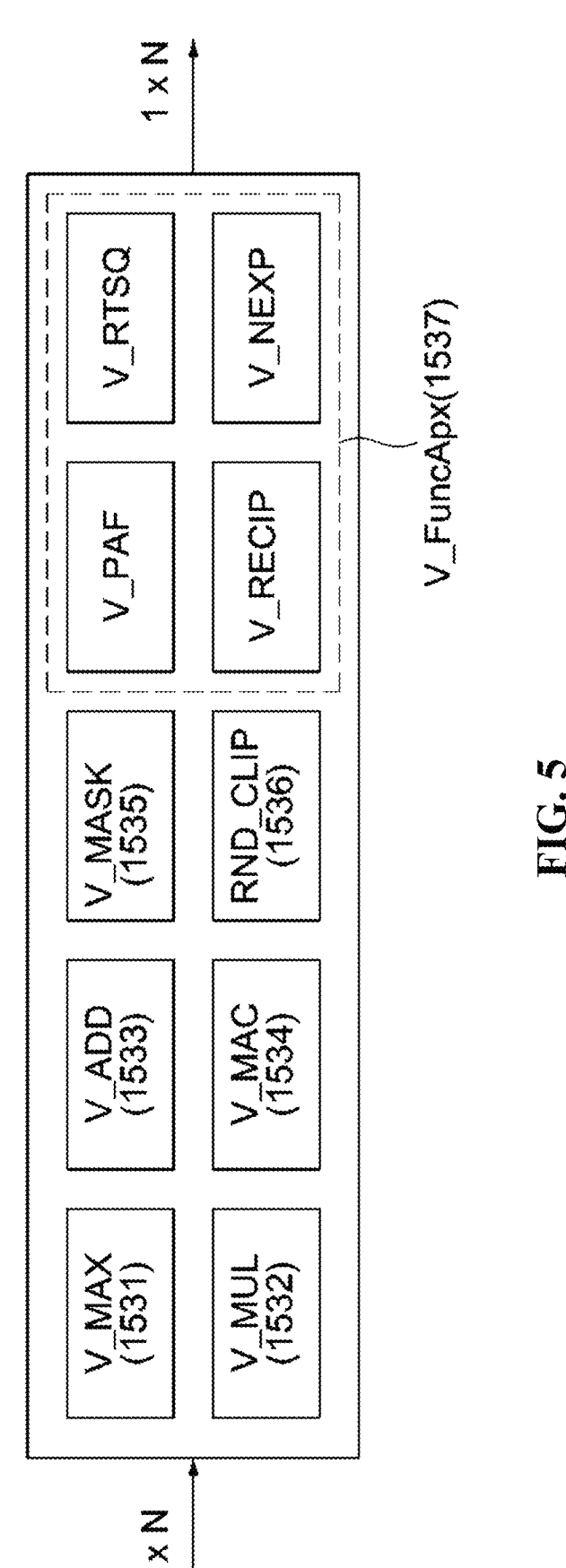
FIG. 5 is a block diagram illustrating a vector operation unit of a special function unit (SFU) that can be applied to examples of the present disclosure.

FIG. 5 is a block diagram illustrating a vector core of a special function unit, according to one embodiment.

The vector core 153 refers to a set of circuits that process a part of the operations of the remaining artificial intelligence model, excluding the matrix multiplication processed by the processing core 120. The vector core 153 is different from the processing core 120 in that it is composed of floating-point operator circuits. That is, the vector core 153 may be configured to receive floating-point parameters and output floating-point parameters. The vector core 153 may be designed to be pipelined with the processing core 120 and the scalar core 154 for operational efficiency with the processing core 120 and the scalar core 154. To elaborate, the vector core 153 is configured to exchange data with the processing core 120, the scalar core 154, the internal memory 140, and the main memory (not shown). The vector core 153 may be specially designed to efficiently process a part of the attention operation of a transformer-based neural network model. That is, the vector core 153 may include a plurality of specialized vector operation circuit units.

For example, the vector core 153 is designed to include a vector maximum value operation unit (V_MAX) 1531, a vector multiplication unit V_MUL 1532, a vector addition unit (V_ADD) 1533, a MAC operation unit (V_MAC) 1534, a mask unit (V_MASK) 1535, a rounding and clipping unit (RND_CLIP) 1536, and a vector function approximation unit V_FuncApx 1537. The vector maximum value operation unit 1531 is configured to include a circuit that processes the maximum value operation of the input tensor data. The vector multiplication unit 1532 is configured to include a circuit that processes the multiplication operation of the input tensor data. The vector addition unit 1533 is configured to include a circuit that processes the addition operation of the input tensor data. The MAC operation unit 1534 is configured to include a circuit that processes the multiply and accumulate (MAC) operation of the input tensor data. The mask unit 1535 is configured to include a circuit that processes the masking operation of the input tensor data. The rounding and clipping unit 1536 is configured to include a circuit that processes the rounding operation and clipping operation of the input tensor data. The vector function approximation unit 1537 is configured to include a circuit that processes the approximation operation of various functions, and can be applied to an exponential function operation performed during a softmax operation or a weighted sum operation in vector units. In particular, the vector core 153 may be configured to generate an input vector for a softmax operation by multiplying the inner product result between a query vector and a key vector by a normalization coefficient, create a stabilized softmax distribution by subtracting the maximum value from each element of the generated input vector, and output the final attention result by multiplying the softmax operation result by a value vector. Here, the normalization coefficient may be a constant value calculated at compile time and stored in memory. This operation flow can be implemented mainly with circuits such as the vector maximum value operation unit 1531, the vector multiplication unit 1532, the vector addition unit 1533, and the vector function approximation unit 1537, and can be configured in a pipelined and parallel processing manner considering operational efficiency. If necessary, a MAC operation unit 1534 for Multiply-And-Accumulate operations, a mask unit 1535 for masking processing, or a rounding and clipping unit 1536 for output precision correction may be further included to extend the auxiliary operation flow before and after the softmax operation.

Hereinafter, the vector function approximation unit 1537 will be described in more detail.

For example, the vector core 153 may be a circuit designed to simultaneously process M×1 size tensor data. The vector core 153 may be designed to receive M×1 size tensor data and output M×1 size tensor data. Here, M of the M×1 size tensor data received by the vector core 153 may be the same as M, which is the number of rows of the M×N size tensor data received by the processing core 120. That is, a pipeline circuit design can be implemented by matching the size of a specific dimension of the tensor data of each of the processing core 120 and the vector core 153. To elaborate, the vector core 153 may include a register file for storing 1D array data. Therefore, the vector core 153 can improve the operation processing efficiency by processing the tensor data output from the processing core 120 in units of a specific dimension. As described above, the vector core 153 is configured to process various function operations with a floating-point operator. Therefore, if the vector core 153 is designed to process the same tensor size as the processing core 120, the semiconductor chip size and power consumption of the neural processing unit 100 may increase. However, since the vector core 153 is designed to process data in a 1D array form, the increase in the semiconductor chip size of the neural processing unit 100 can be reduced, the power consumption can be reduced, and the bottleneck phenomenon of the neural network operation can be reduced by being pipelined with the processing core 120. In some examples, the vector core 153 may be designed to receive L×1 size tensor data. Here, L may be a power-of-two value within a specific range based on M. For example, when M is 64, L can be 8, 16, 32, 64, 128, or 256.

Figure 6:
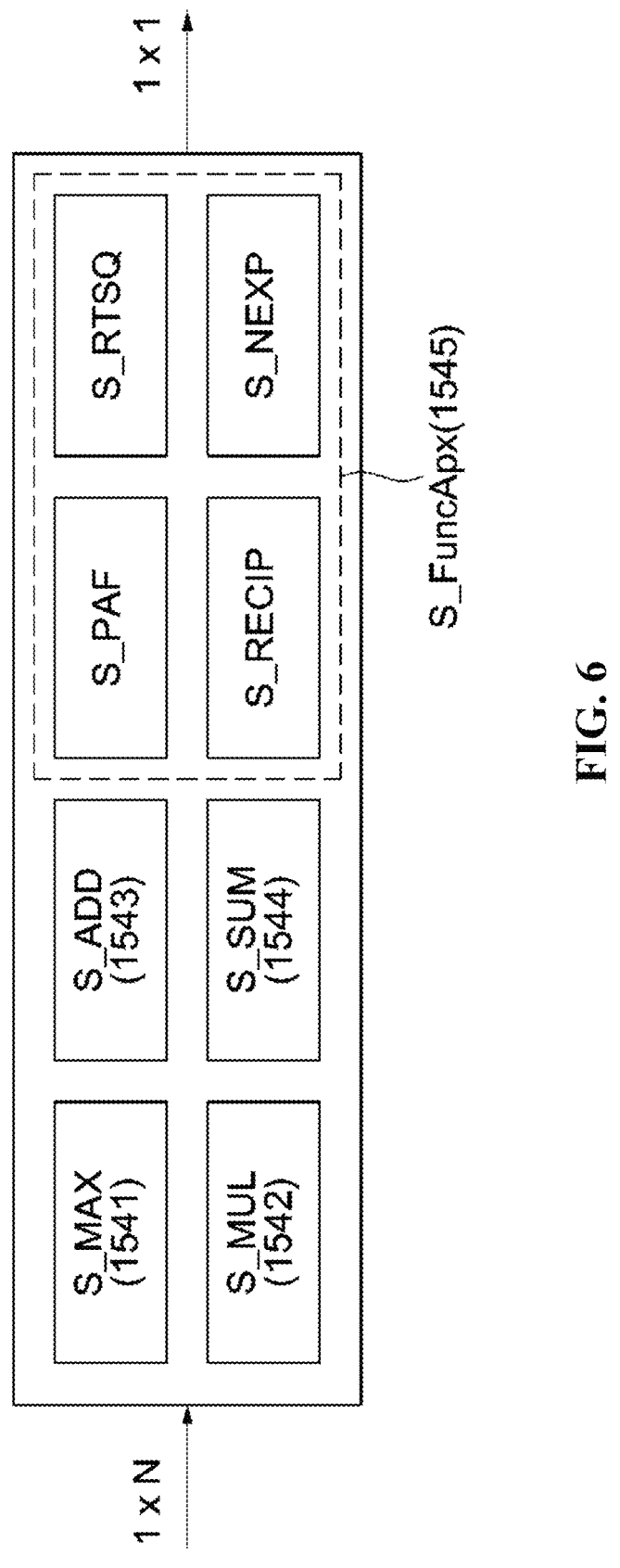
FIG. 6 is a block diagram illustrating a scalar operation unit of a special function unit that can be applied to examples of the present disclosure.

FIG. 6 is a block diagram illustrating a scalar core of a special function unit, according to one embodiment.

The scalar core 154 refers to a set of circuits that process a part of the operations of the remaining neural network model, excluding the operations processed by the processing core 120 and the vector core 153. The scalar core 154 is different from the processing core 120 in that it is composed of floating-point operator circuits. That is, the scalar core 154 may be configured to receive floating-point parameters and output floating-point parameters. The scalar core 154 may be designed to be pipelined with the processing core 120 and the vector core 153 for operational efficiency with the processing core 120 and the vector core 153. To elaborate, the scalar core 154 is configured to exchange data with the processing core 120, the vector core 153, the internal memory 140, and the main memory (not shown). To elaborate, the scalar core 154 may be specially designed to efficiently process a part of the attention operation of a transformer-based neural network model. That is, the scalar core 154 may include a plurality of specialized scalar operation circuit units.

For example, the scalar core 154 is designed to include a scalar maximum value operation unit 1541, a scalar multiplication unit 1542, a scalar addition unit (S_ADD) 1543, a scalar summation unit (S_SUM) 1544, and a scalar function approximation unit S_FuncApx 1545. The scalar maximum value operation unit 1541 is configured to include a circuit that processes the maximum value operation of the input tensor data. The scalar multiplication unit 1542 is configured to include a circuit that processes the multiplication operation of the input tensor data. The scalar addition unit 1543 is configured to include a circuit that processes the addition operation of the input tensor data. The scalar summation unit 1544 is configured to include a circuit that accumulates a plurality of input scalar values or performs an aggregation operation according to a certain range or condition. The scalar function approximation unit 1545 is configured to include a circuit that processes the approximation operation of various functions. This function approximation operation can be applied to the approximate calculation of the exponential function used in the softmax operation and the calculation of a correction coefficient such as a reciprocal operation for the total sum. In other words, the scalar core 154 may be configured to calculate the maximum value among the results of the multiplication operation between the normalized query vector and the key vector, calculate the total sum of the exponential function, and then calculate the reciprocal to calculate a correction coefficient for the softmax operation.

Hereinafter, the scalar function approximation unit 1545 will be described in more detail.

The scalar core 154 may be a circuit designed to simultaneously process M×1 size tensor data. The scalar core 154 may be designed to receive M×1 size tensor data and output 1×1 size tensor data. The scalar core 154 may be designed to receive M×1 size tensor data and output 1×1 size scalar data. The M×1 size of the tensor data received by the scalar core 154 may be the same as the M×1 size received by the vector core 153. That is, a pipeline circuit design can be implemented by matching the size of a specific dimension of the tensor data of each of the vector core 153 and the scalar core 154. To elaborate, the scalar core 154 may include a register file for storing 1D array data. Therefore, the scalar core 154 can improve the operation processing efficiency by processing the tensor data output from the vector core 153 in units of a specific dimension. As described above, the scalar core 154 is configured to process various function operations with a floating-point operator. Therefore, if the scalar core 154 is designed to process the same tensor size as the processing core 120, the semiconductor chip size and power consumption of the neural processing unit 100 may increase. However, since the scalar core 154 is designed to process data in a scalar form, the increase in the semiconductor chip size of the neural processing unit 100 can be reduced, the power consumption can be reduced, and the bottleneck phenomenon of the neural network operation can be reduced by being pipelined with the vector core 153. In some examples, the scalar core 154 may be designed to receive L×1 size tensor data. Here, L may be a power-of-two value within a specific range based on M. For example, when M is 64, L can be 8, 16, 32, 64, 128, 256.

In some embodiments, the vector core 153 shown in FIG. 5 and the scalar core 154 shown in FIG. 6 may be modified and implemented as a single integrated 'vector-scalar operation unit' that increases the degree of integration by sharing functionally overlapping circuits. This integrated architecture goes beyond simply placing the two units physically adjacent to each other and can maximize the efficiency of hardware resources by sharing operation circuits with similar functions. Referring to FIG. 5, the vector core 153 is designed to perform parallel operations on each element of a vector composed of a plurality of data elements (e.g., M). This can be conceptually understood as a structure in which M independent scalar operation lanes are arranged in parallel. On the other hand, the scalar core 154 of FIG. 6 processes a single data (1×1 scalar). Therefore, in this embodiment, based on the structural similarity, it may be configured to perform a scalar operation by selectively activating only some lanes of the vector operation circuit according to the control signal of the controller 110. According to the above-described configuration, the integrated vector-scalar operation unit can be implemented as a selective resource sharing architecture in which the existing vector operator replaces the scalar operators with redundant functions, sharing the circuit, and separately maintaining only the scalar operation units with specialized functions, such as reduction. This can reduce the total number of gates and the chip area of the special function unit (SFU) 150 while providing all the same functions, thereby greatly improving the power, performance, and area (PPA) ratio.

FIG. 7 is a diagram schematically illustrating the energy consumption per unit operation of a neural processing unit that can be applied to examples of the present disclosure.

Hereinafter, the power consumption of the processing core 120, the vector core 153, and the scalar core 154 of the neural processing unit 100 will be described with reference to FIG. 7.

FIG. 7 schematically illustrates the energy consumed per unit operation of various operators of the neural processing unit 100. For example, the energy consumption can be described by dividing it into an addition operation and a multiplication operation. However, the energy consumed per unit operation may vary depending on the foundry process technology of the semiconductor chip (e.g., 2 nm technology, 5 nm technology, 7 nm technology, 14 nm technology, 28 nm technology, etc.) or the technical capabilities of a specific foundry company.

The processing core 120 may be designed to operate on integer parameters of a specific bit width. "8b INT Add" in FIG. 7 means an 8-bit integer addition operation of the adder 1212 of the processing element 121. An 8-bit integer addition operation may consume 0.03 pJ of energy. "16b INT Add" means a 16-bit integer addition operation of the adder 1212 of the processing element 121. A 16-bit integer addition operation may consume 0.05 pJ of energy. "32b INT Add" means a 32-bit integer addition operation of the adder 1212 of the processing element 121. A 32-bit integer addition operation may consume 0.1 pJ of energy. "8b INT Mult" means an 8-bit integer multiplication operation of the multiplier 1211 of the processing element 121. An 8-bit integer multiplication operation may consume 0.2 pJ of energy. "32b INT Mult" means a 32-bit integer multiplication operation of the multiplier 1211 of the processing element 121. A 32-bit integer multiplication operation may consume 3.1 pJ of energy.

To elaborate, when the processing core 120 is composed of thousands to tens of thousands of processing elements designed as integer operators, the power consumption of the neural processing unit 100 can be significantly reduced compared to the case where the processing core is composed of the same number of processing elements designed as floating-point operators. In general, in the case of a generative artificial intelligence model, since most of the operations are processed by the processing core 120, the design of an operator with a specific integer bit width is important for the low-power design of the neural processing unit 100.

The vector core 153 and the scalar core 154 of the special function unit 150 may be designed to operate on floating-point parameters. "16b FP Add" means a 16-bit floating-point addition operation of the adder of the special function unit 150. A 16-bit floating-point addition operation may consume 0.4 pJ of energy. "32b FP Add" means a 32-bit floating-point addition operation of the adder of the special function unit 150. A 32-bit floating-point addition operation may consume 0.9 pJ of energy. "16b FP Mult" means a 16-bit floating-point multiplication operation of the multiplier of the special function unit 150. A 16-bit floating-point multiplication operation may consume 1.1 pJ of energy. "32b FP Mult" means a 32-bit floating-point multiplication operation of the multiplier of the special function unit 150. A 32-bit floating-point multiplication operation may consume 3.7 pJ of energy. To elaborate, when the special function unit 150 is designed with floating-point operators, it is advantageous in terms of the power consumption of the neural processing unit 100 and the miniaturization of the semiconductor chip size to design the number of operators of the special function unit 150 to be relatively smaller than the number of processing elements 121 of the processing core 120. Therefore, the number of floating-point operators of the special function unit 150 may be designed to be smaller than the number of integer operators of the processing core 120.

According to an embodiment, the operational efficiency of the neural processing unit 100 can be improved by implementing a data pipeline circuit design of the processing core 120, the vector core 153, and the scalar core 154 so that the array size of a specific dimension of the tensor data processed by the neural processing unit 100 is compatible with each other between the hardware components.

Figure 8:
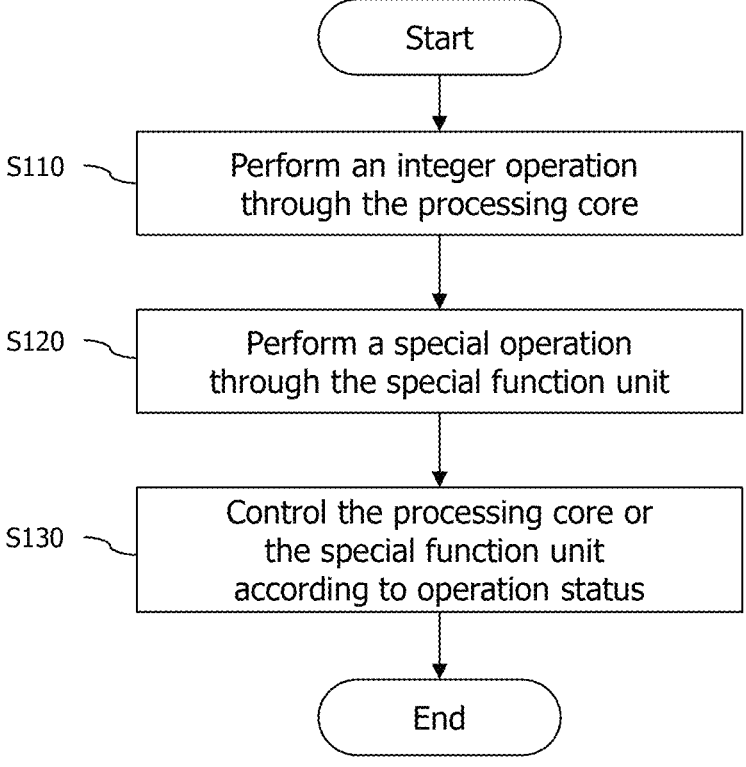
FIG. 8 is a flowchart illustrating a control method of a neural processing unit that can be applied to examples of the present disclosure.

FIG. 8 is a flowchart illustrating a control method of a neural processing unit that can be applied to examples of the present disclosure.

Referring to FIG. 8, in operation S110, the neural processing unit 100 performs an integer operation based on the input data through the processing core 120 according to the input neural network operation request. The integer operation may include, for example, operations such as a vector-matrix multiplication (MatMul) for quantized tensor data, a vector accumulation, or an integer-based activation function, which may be performed in parallel in a plurality of processing elements arranged inside the processing core 120 of FIG. 3. These operations are mainly performed in parallel in units of a plurality of processing elements inside the processing core 120, and by processing the input data and the neural network weights in an integer format (INT8, INT16, etc.), high speed and low power characteristics can be satisfied simultaneously.

Next, in operation S120, the neural processing unit 100 performs a special operation based on floating-point on the integer operation result performed by the processing core 120 in step S110 through the special function unit 150. The special function unit 150 may be configured to perform, for example, an activation function operation (ReLU, GELU, tanh, etc.), normalization, softmax, or other nonlinear function approximation operations on the integer operation result converted to floating-point.

As shown in FIG. 3, the special function unit 150 includes a quantization unit 151, a dequantization unit 152, a vector core 153, and a scalar core 154, wherein the dequantization unit 152 dequantizes integer data into a floating-point format such as FP16, BFLOAT, and the converted data is input to the nonlinear function operation. In addition, the vector core 153 performs operations such as softmax, normalization, ReLU, GELU, etc., in a high-speed parallel manner and is suitable for multi-dimensional tensor data. On the other hand, the scalar core 154 is used for conditional branching, precision function approximation, single-value-based calculations, etc., and may include an FSM-based control circuit for complex logic processing. These operations are suitable for high-precision calculations or nonlinear activation processing that are difficult to implement with integer-based operations, and contribute to ensuring the accuracy of the overall operation flow.

Next, the neural processing unit 100 checks the operation status of each of the integer operation by step S110 and the special operation by step S120 through the controller 110, and in operation S130, controls the operation of the processing core 120 or the special function unit 150 according to the operation status. As shown in FIG. 3, the controller 110 communicates with each module and can control the operating clock of each unit considering the operation load, operation priority, operation condition flags, etc., or readjust the operation order if necessary. For example, if the input data is all composed of 0s, the corresponding integer operation or floating-point operation can be omitted to perform clock gating or power gating, thereby reducing power consumption. In addition, to prevent resource conflicts or pipeline bottlenecks between operation modules, the operation scheduling can be enhanced based on the decoding information of the execution instruction.

As such, the control flow of FIG. 8 operates in close conjunction with each hardware component of FIG. 3, and is designed with a structure that can increase power efficiency along with improving operational performance.

Figure 9:
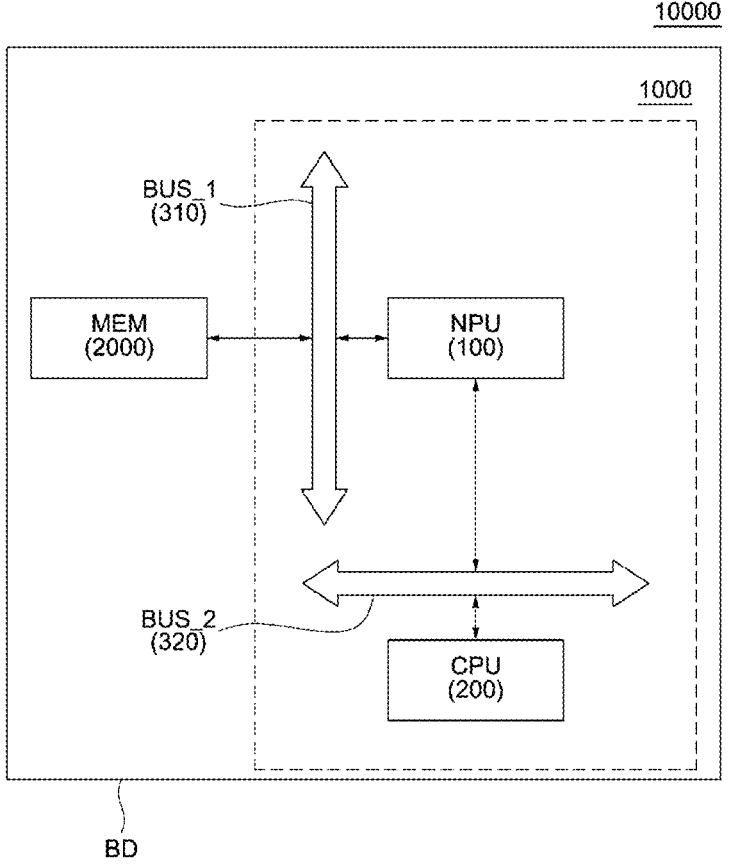
FIG. 9 is a block diagram illustrating a system on chip according to a first embodiment of a first example of the present disclosure.

FIG. 9 is a block diagram illustrating a system on chip according to a first embodiment of a first example of the present disclosure.

Referring to FIG. 9, a device 10000 according to the first embodiment of the first example of the present disclosure will be described. The device 10000 includes a circuit board BD (not shown), a memory 2000, and a system on chip 1000. The memory 2000 and the system on chip 1000 may be disposed on the circuit board BD. The system on chip 1000 is configured to include the neural processing unit 100, a central processing unit 200, a first bus (BUS_1) 310, and a second bus (BUS_2) 320. The memory 2000 is configured to be electrically connected to the first bus 310. Each example and each embodiment of the present disclosure may be combined with other examples and other embodiments of the present disclosure and implemented in a modified manner.

The system on chip 1000 may refer to a system manufactured on a single semiconductor substrate. The system on chip 1000 may be configured to further include a package (not shown) that protects the semiconductor substrate.

The neural processing unit 100 may be configured to communicate with the memory 2000. The first bus 310 may be provided between the neural processing unit 100 and the memory 2000. For example, the first bus 310 may be an Advanced Extensible Interface (AXI) bus. However, the examples of the present disclosure are not limited thereto. The first bus 310 may be configured to support a read and write address/control interface for the memory 2000 and the neural processing unit 100. The first bus 310 may be configured as an independent data communication channel to support high-speed data transmission through transaction processing in addition to memory control commands. The first bus 310 may be configured as a dedicated bus for transmitting input parameters, output parameters, and weight parameters of a neural network model, and it is desirable to appropriately design the bandwidth of the first bus 310 considering the parameter size of the neural network models to be processed.

The neural processing unit 100 may be configured to communicate with the central processing unit 200. The second bus 320 may be provided between the neural processing unit 100 and the central processing unit 200. For example, the second bus 320 may be an advanced high-performance Bus (AHB) bus. However, the examples of the present disclosure are not limited thereto. The second bus 320 may be provided for efficient communication between the neural processing unit 100, the central processing unit 200, and peripheral devices of the system on chip 1000. The second bus 320 may provide a master-slave architecture to improve data throughput. The second bus 320 may be configured to support burst transmission and pipeline operation tasks of the system on chip 1000. The second bus 320 may be configured to provide an on-the-fly function. The second bus 320 may be configured to allow the master of the second bus 320 to execute a new command on-the-fly without waiting while the central processing unit 200 or the neural processing unit 100 is reading or writing data in real time. Therefore, the real-time data processing of the neural processing unit 100 can be improved, and at least one core of the neural processing unit 100 can be configured to use the bus independently. Therefore, the second bus 320 can support the system on chip 1000 to execute various commands in real time.

To elaborate, the first bus 310 provides a higher memory bandwidth than the second bus 320, and the second bus 320 provides an on-the-fly function, allowing the central processing unit 200 to dynamically control the neural processing unit 100. Accordingly, the system on chip 1000 can dynamically process various input queries for a generative neural network model.

The neural processing unit 100 is described above with reference to FIG. 3 to FIG. 7. Accordingly, a duplicate description of the neural processing unit 100 may be omitted herein for the sake of brevity.

The central processing unit 200 may be configured to control the neural processing unit 100 based on the execution code of the artificial intelligence model. The execution code may be generated by a compiler (not shown). The central processing unit 200 can control the neural processing unit 100 by directly setting the register values of each circuit of the neural processing unit 100 based on the execution code. The execution code may include each register value. In addition, the central processing unit 200 can handle operations not processed by the neural processing unit 100 by off-loading them. In this case, the neural network model can be compiled to off-load a specific operation of the neural network model to the central processing unit 200 to obtain an execution code.

The memory 2000 may include a main memory located outside the system on chip 1000, but is not limited thereto. The memory 2000 may be electrically connected to the system on chip 1000 through the first bus 310. The memory 2000 of the device 10000 according to the first embodiment of the first example of the present disclosure may include at least one memory such as SRAM, LPDDR RAM, Resistive RAM, Magneto-resistive RAM, Phase-change RAM, Ferroelectric RAM, Flash Memory, HBM, and the like. The memory 2000 may be composed of at least one memory unit (e.g., a bank, etc.). The memory 2000 may be composed of a single (homogeneous) memory or a heterogeneous memory. It is desirable that the capacity of the memory 2000 be provided to be larger than the total size of the weight parameters of the neural network model. In this case, all of the weight parameters of the neural network model can be loaded into the memory 2000 at once and reside there. If the storage capacity of the memory 2000 is insufficient, only a part of the weight parameters can be loaded, which may make it difficult to quickly process the inference operation of the neural network model in real time. For example, the capacity of the memory 2000 may be one of 4 GBytes and 8 GBytes. That is, the capacity of the memory 2000 may be from 4 GBytes to 8 GBytes, and can be determined considering the parameter size of the neural network model to be driven on the system on chip 1000.

That is, the memory 2000 (e.g., the main memory) may be provided as a dedicated memory for the neural processing unit 100 and may be configured to sufficiently store and provide high-speed access to particular data, including not only the entire learned weights of the neural network model but also key activation values generated during the inference operation process and used in the next operation. Whereas in the past, for large-scale models, a part of the weights or activation values had to rely on external slow memory or a server, the present disclosure reduces data movement bottlenecks and eliminates external dependencies by having all operational data reside in the on-device main memory. This lays the foundation for completing the entire inference process of the neural network model on the device itself (server-independent operation) without data exchange with an external server, which provides a great advantage in terms of real-time responsiveness and data privacy. This memory structure supports the neural processing unit 100 to stably process complex models without delay. As a result, a true on-device AI environment can be realized.

The bandwidth of the first bus 310 can be determined according to the processing performance of the neural processing unit 100 (e.g., Tera Operations Per Second (TOPS) of the neural processing unit 100). For example, the memory 2000 bandwidth of 2 GB/s to 4 GB/s per 1 TOPS may be required. For example, the neural processing unit 100 (e.g., a 10 TOPS neural processing unit) may be configured with the memory 2000 to provide a bus bandwidth of 20 GB/s to 40 GB/s. The bandwidth of the first bus 310 can be determined according to the operating frequency of the memory 2000 and the number of communication channels. For example, to configure a memory bandwidth of 40 GB/s with LPDDR5, the following formula can be used.

$$\text{Memory Bandwidth (GB/s)}=\text{(Data Rate (Gbps per pin)} \times \text{Bus Width (bits)} \times \text{Number of Channels} \div 8).}$$

To elaborate, LPDDR5 generally supports a data rate of up to 6400 Mbps per pin. The bus width of an LPDDR channel is generally 16 bits (2 bytes). However, the number of channels cannot be a decimal point and is an integer. However, the examples of the present disclosure are not limited to the bandwidth of the first bus 310.

The device 10000 according to the first embodiment of the first example of the present disclosure may be configured to provide a low-power function for use on-device.

The low-power mode of the device 10000 according to the first embodiment of the first example of the present disclosure may be provided with, for example, a sleep mode, a deep sleep mode, a retention mode, and the like. In some examples, the low-power mode may be referred to as a standby mode, a hibernation mode, an idle mode, or the like.

The sleep mode may be implemented, for example, by applying clock gating to at least one of the processing core 120, the vector core 153, and the scalar core 154 of the neural processing unit 100.

The deep sleep mode may be implemented, for example, by applying power gating to at least one of the processing core 120, the vector core 153, the scalar core 154 of the neural processing unit 100, or the memory 2000.

The retention mode may be implemented by supplying a minimum retention voltage to the controller 110 of the neural processing unit 100 or the memory 2000.

For example, the neural processing unit 100 of the device 10000 according to the first embodiment of the first example of the present disclosure may be configured to provide power gating function, clock gating function, or register retention function. To elaborate, when the device 10000 enters the sleep mode, the neural processing unit 100 can activate the clock gating function. To elaborate, when the device 10000 enters the deep sleep mode, the neural processing unit 100 can activate the power gating function. To elaborate, when the device 10000 enters the retention mode, the supply voltage input to the neural processing unit 100 can be reduced or the operating frequency can be reduced.

For example, the memory MEM of the device 10000 according to the first embodiment of the first example of the present disclosure may provide deep sleep function, retention function, or maintain parameters function. To elaborate, when the device 10000 enters the deep sleep mode, the memory 2000 may be power-gated, and in the case of a volatile memory device, data may be lost. To elaborate, when the device 10000 enters the retention mode, the supply voltage input to the memory 2000 can be reduced or the operating frequency can be reduced, and in the case of a volatile memory device, data can be maintained. To elaborate, when the device 10000 enters the parameter maintenance mode, the supply voltage input to the memory 2000 can be reduced or the operating frequency can be reduced, and in the case of DRAM, the refresh period of the memory cells is increased, so that data can be maintained in the case of a volatile memory device.

The low-power mode may be activated if an input query for speculative decoding is not input to the device 10000 for a certain period of time or more. The certain period of time may be provided based on, for example, a timer, a counter value, or the like. The low-power mode may be activated based on a specific threshold time, and may be deactivated when an input query processed by speculative decoding is input to the device 10000. The state in which the low-power mode is deactivated may be referred to as a wake-up state.

The device 10000 according to the first embodiment of the first example of the present disclosure may be a device operable in a battery environment. Therefore, the neural processing unit 100 may be designed to be operable with a battery voltage.

The device 10000 according to the first embodiment of the first example of the present disclosure may be configured to provide at least one low-power mode and at the same time provide speculative decoding in an on-device environment. The device 10000 can enter a low-power mode based on a preset condition, and accordingly, the power consumption of the device 10000 can be reduced.

The system on chip 1000 according to the first embodiment of the first example of the present disclosure has the effect of being able to rapidly accelerate the inference operation of a generative neural network model with low power by the pipeline circuit structure of the processing core 120, the vector core 153, and the scalar core 154.

Figure 10:
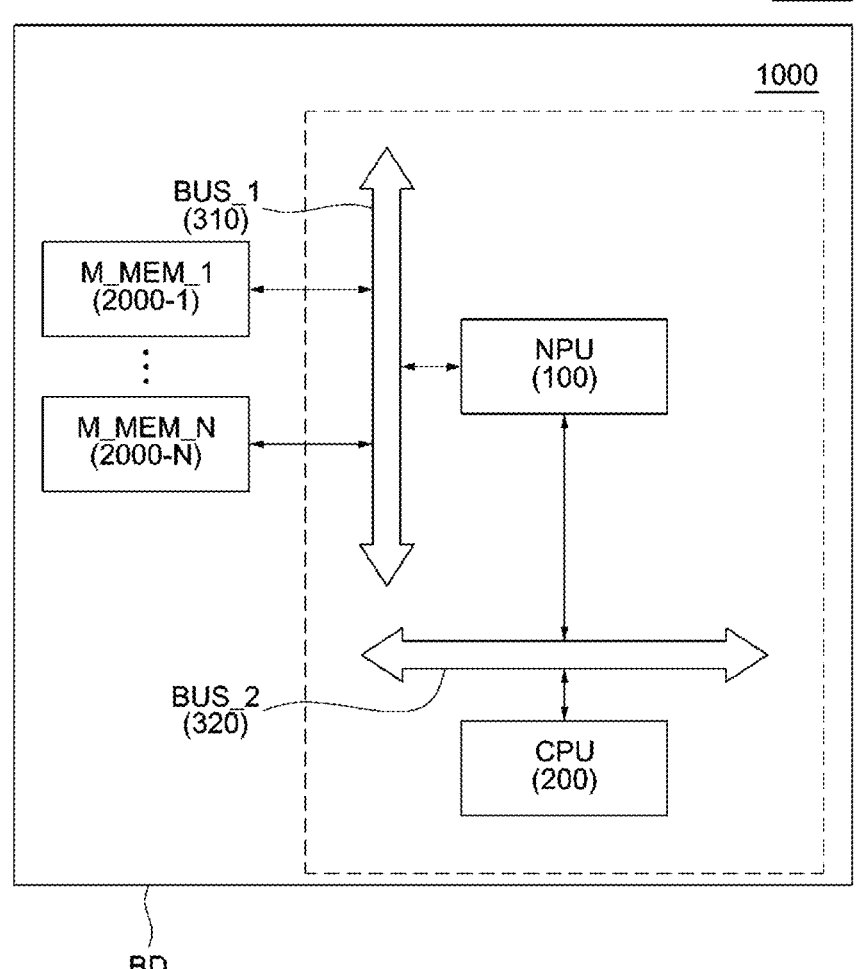
FIG. 10 is a block diagram illustrating a system on chip according to a second embodiment of the first example of the present disclosure.

FIG. 10 is a block diagram illustrating a system on chip according to a second embodiment of the first example of the present disclosure.

Referring to FIG. 10, the device 10000 according to the second embodiment of the first example of the present disclosure will be described. The device 10000 includes a circuit board BD, a plurality of main memories (M_MEM_1, ..., M_MEM_N) 2000-1, ..., 2000-N, and a system on chip 1000. In describing the device 10000 according to the second embodiment of the first example of the present disclosure, overlapping contents with the description with reference to FIG. 3 to FIG. 9 may be omitted for convenience of explanation. Each example and each embodiment of the present disclosure may be combined with other examples and other embodiments of the present disclosure and implemented in a modified manner.

The system on chip 1000 according to the second embodiment of the first example of the present disclosure includes the neural processing unit 100, the central processing unit 200, the first bus 310, and the second bus 320. The plurality of main memories 2000-1, ..., 2000-N are configured to be electrically connected to the first bus 310. The plurality of main memories 2000-1, ..., 2000-N are configured to include a plurality of semiconductor chips.

The first bus 310 may be provided between the neural processing unit 100 and the plurality of main memories 2000-1, ..., 2000-N. The second bus 320 may be provided between the neural processing unit 100 and the central processing unit 200.

Since the operation of the neural processing unit 100 has been described above with reference to FIG. 3 to FIG. 9, a detailed description of the operation of the neural processing unit 100 may be omitted. Since the operation of the central processing unit 200 has been described above with reference to FIG. 9, a detailed description of the operation of the central processing unit 200 may be omitted.

The plurality of main memories 2000-1, . . . , 2000-N may be composed of a plurality of memories located outside the system on chip 1000. However, the present disclosure is not limited thereto. The plurality of main memories 2000-1, . . . , 2000-N may each be electrically connected to the system on chip 1000 through the first bus 310. Each of the plurality of main memories 2000-1, . . . , 2000-N of the device 10000 according to the second embodiment of the first example of the present disclosure may include SRAM, LPDDR RAM, Resistive RAM, Magneto-resistive RAM, Phase-change RAM, Ferroelectric RAM, Flash Memory, or HBM. The plurality of main memories 2000-1, . . . , 2000-N may be composed of a single (homogeneous) memory or a heterogeneous memory.

It is desirable that the total capacity of the plurality of main memories 2000-1, . . . , 2000-N be provided to be larger than the total capacity occupied by the weight parameters of the artificial intelligence model. In this case, the weight parameters of the neural network model can be loaded onto the plurality of main memories 2000-1, . . . , 2000-N at once and reside there. If the storage capacity of the plurality of main memories 2000-1, . . . , 2000-N is insufficient, it may be difficult to quickly process the inference operation of the neural network model in real time. For example, the total capacity of the plurality of main memories 2000-1, . . . , 2000-N may be one of 8 GBytes, 16 GBytes, 32 GBytes, 64 GBytes, and 128 GBytes. That is, the total capacity of the plurality of main memories 2000-1, . . . , 2000-N may be from 8 GBytes to 128 GBytes, and can be determined considering the parameter size of at least one artificial intelligence model to be driven on the system on chip 1000. Therefore, by placing a plurality of main memories for loading and storing the parameters of the artificial intelligence model outside the system on chip 1000, the device 10000 can easily increase the capacity of the main memory while reducing the manufacturing cost of the system on chip 1000. If a plurality of main memories are placed inside the package that protects the system on chip 1000, the size of the package may increase, increasing the manufacturing cost, but it can satisfy the criteria of a specific form factor (e.g., M.2 2230, M.2 2242).

The bandwidth of the first bus 310 can be determined according to the processing performance of the neural processing unit 100 (e.g., Tera Operations Per Second (TOPS) of the neural processing unit 100). For example, for a 30 TOPS neural processing unit (N100), the plurality of main memories 2000-1, . . . , 2000-N may be configured to provide a bus bandwidth of 60 GB/s to 120 GB/s. The bandwidth of the first bus 310 can be determined according to the operating frequency of the plurality of main memories 2000-1, . . . , 2000-N and the number of communication channels. However, the examples of the present disclosure are not limited to the bandwidth of the first bus 310.

The device 10000 according to the second embodiment of the first example of the present disclosure provides a plurality of main memories 2000-1, . . . , 2000-N, and the total capacity of the main memories may be a capacity that can store all the parameters of at least one neural network model at once. In addition, according to the configuration of the second embodiment of the first example, the memory capacity can be expanded to correspond to the size of a generative neural network model with a significant weight parameter size. Therefore, the system on chip 1000 can process the neural network model in real time and at high speed. To elaborate, the plurality of main memories 2000-1, . . . , 2000-N of the device 10000 according to the embodiments of the present disclosure are configured as a dedicated memory for the system on chip 1000. If not all the parameters of the artificial intelligence model processed by the neural processing unit 100 are stored in the plurality of main memories 2000-1, . . . , 2000-N, especially if not all the weight parameters and attention scores can be stored in the plurality of main memories 2000-1, . . . , 2000-N, the parameters must be stored in a separate storage device, which causes a decrease in operation speed due to large-capacity memory operations.

Figure 11:
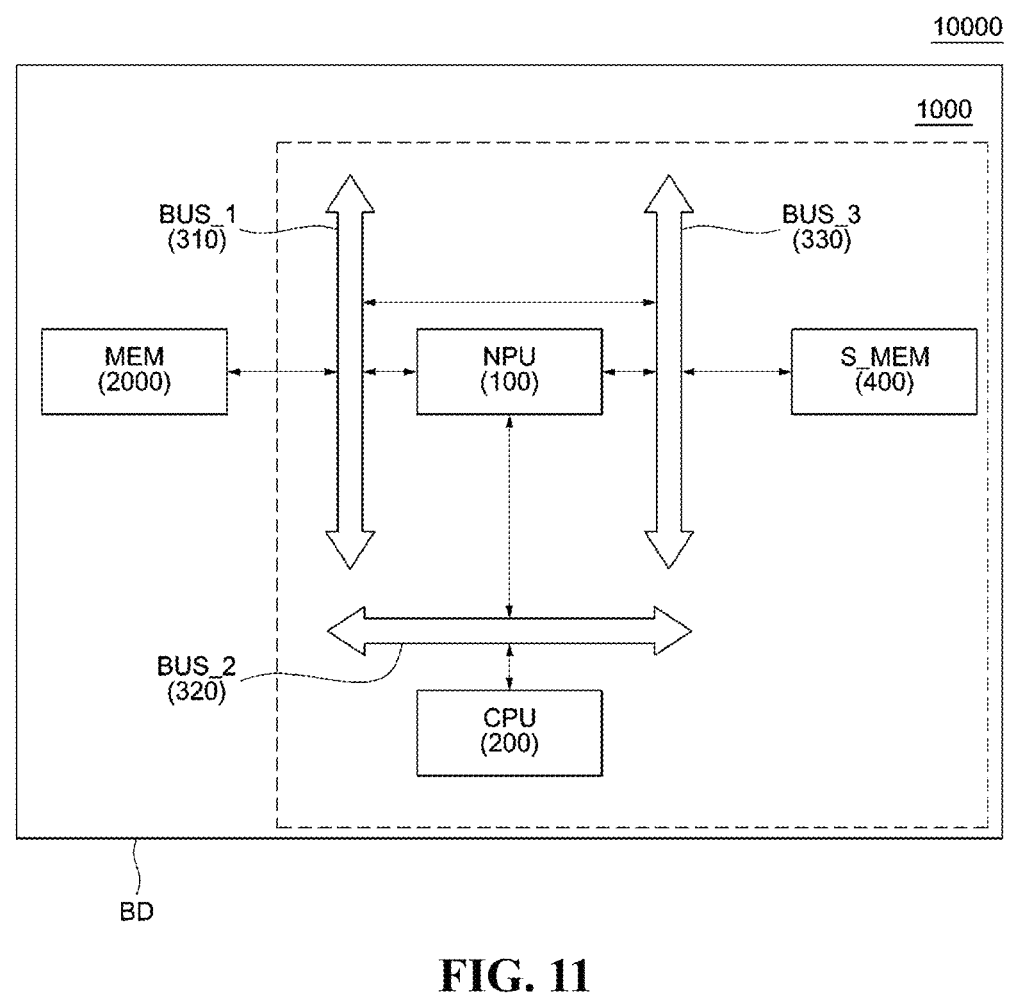

FIG. 11 is a block diagram illustrating a system on chip according to a third embodiment of the first example of the present disclosure.

Referring to FIG. 11, the device 10000 according to the third embodiment of the first example of the present disclosure will be described. The device 10000 includes the circuit board BD, the memory 2000 (e.g., a main memory), and the system on chip 1000. In describing the system on chip 1000 according to the third embodiment of the first example of the present disclosure, overlapping descriptions with those described with reference to FIG. 3 to FIG. 10 may be omitted for convenience of explanation. Each example and each embodiment of the present disclosure may be combined with other examples and other embodiments of the present disclosure and implemented in a modified manner.

The system on chip 1000 may refer to a system manufactured on a single semiconductor substrate. The system on chip 1000 may be configured to further include a package (not shown) that protects the semiconductor substrate.

The system on chip 1000 according to the third embodiment of the first example of the present disclosure includes the neural processing unit 100, the central processing unit 200, the first bus 310, the second bus 320, a third bus 330, and a shared memory (S_MEM) 400. The shared memory 400 is configured as an on-chip memory of the system on chip 1000. The memory 2000 (e.g., the main memory) is configured to be electrically connected to the first bus 310. The memory 2000 is configured to include at least one semiconductor chip. The shared memory 400 is configured to be electrically connected to the third bus 330.

The first bus 310 may be located between the neural processing unit 100 and the memory 2000. The second bus 320 may be located between the neural processing unit 100 and the central processing unit 200. The third bus 330 may be located between the neural processing unit 100 and the shared memory 400. For example, the third bus 330 may be an advanced extensible interface (AXI) bus. However, the examples of the present disclosure are not limited thereto. The third bus 330 may be configured to support a read and write address/control interface for the shared memory 400 and the neural processing unit 100. The third bus 330 may be configured as an independent data communication channel to support high-speed data transmission through transaction processing in addition to memory control commands. The third bus 330 may be configured as a dedicated bus for transmitting input parameters, output parameters, and weight parameters of a neural network model. Here, the first bus 310 and the third bus 330 are configured to be electrically connected. Accordingly, the shared memory 400 and the memory 2000 can transmit tensor data through the first bus 310 and the third bus 330.

Since the operation of the neural processing unit 100 has been described above with reference to FIG. 3 to FIG. 10, a detailed description may be omitted. Since the operation of the central processing unit 200 has been described above with reference to FIG. 9 to FIG. 10, a detailed description may be omitted.

The memory 2000 may be composed of at least one memory located outside the system on chip 1000. The memory 2000 may be composed of a single (homogeneous) memory or a heterogeneous memory. The capacity of the memory 2000 can be determined considering the parameter size of at least one neural network model to be driven on the system on chip 1000. The bandwidth of the first bus 310 can be determined based on the processing performance of the neural processing unit 100.

The shared memory 400 may be composed of at least one memory located inside the system on chip 1000. The shared memory 400 of the system on chip 1000 according to the third embodiment of the first example of the present disclosure may include at least one memory such as SRAM, LPDDR RAM, Resistive RAM, Magneto-resistive RAM, Phase-change RAM, Ferroelectric RAM, Flash Memory, HBM, and the like. The shared memory 400 may be composed of a single (homogeneous) memory or a heterogeneous memory. As a representative embodiment, the shared memory 400 may be implemented with SRAM. The capacity of the shared memory 400 is designed to be smaller than the capacity of the memory 2000. If the capacity of the shared memory 400 increases, the semiconductor manufacturing cost may increase rapidly. Therefore, the capacity of the shared memory 400 may be configured from 4 MBytes to 128 MBytes. Preferably, the capacity of the shared memory 400 may be configured from 16 MBytes to 64 MBytes. The capacity of the shared memory 400 may be larger than the capacity of the internal memory 140 of the neural processing unit 100.

The operation of the shared memory 400 and the memory 2000 will be described with reference to FIG. 7. "32b S_MEM Read" in FIG. 9 means a 32-bit data read operation of the memory 2000. Here, the memory 2000 may be LPDDR RAM. In this case, a 32-bit data read operation of the memory 2000 may consume 640 pJ of energy. "32b S_MEM Read" in FIG. 9 means a 32-bit data read operation of the shared memory 400. Here, the shared memory 400 may be SRAM. In this case, a 32-bit data read operation of the shared memory 400 may consume 5 pJ of energy. That is, when the neural processing unit 100 uses the shared memory 400 implemented with SRAM, the energy consumption of the device 10000 can be significantly reduced compared to the case of using only the memory 2000. However, since the manufacturing cost of the shared memory 400 is high, it is difficult to implement it in a large capacity. Therefore, when the compiler (not shown) generates the execution code of the neural network model to be processed by the system on chip 1000, it can set reusable input parameters, output parameters, and weight parameters to be preferentially stored in the shared memory 400 rather than the memory 2000. That is, the compiler (not shown) can provide a function of determining reusable parameters during a series of neural network model operations and storing them in the shared memory 400 for reuse.

The system on chip 1000 according to the third embodiment of the first example of the present disclosure can reduce the power consumption of the system on chip 1000 by providing the shared memory 400 and executing an execution code set to store reusable parameters in the shared memory 400.

Figure 12:
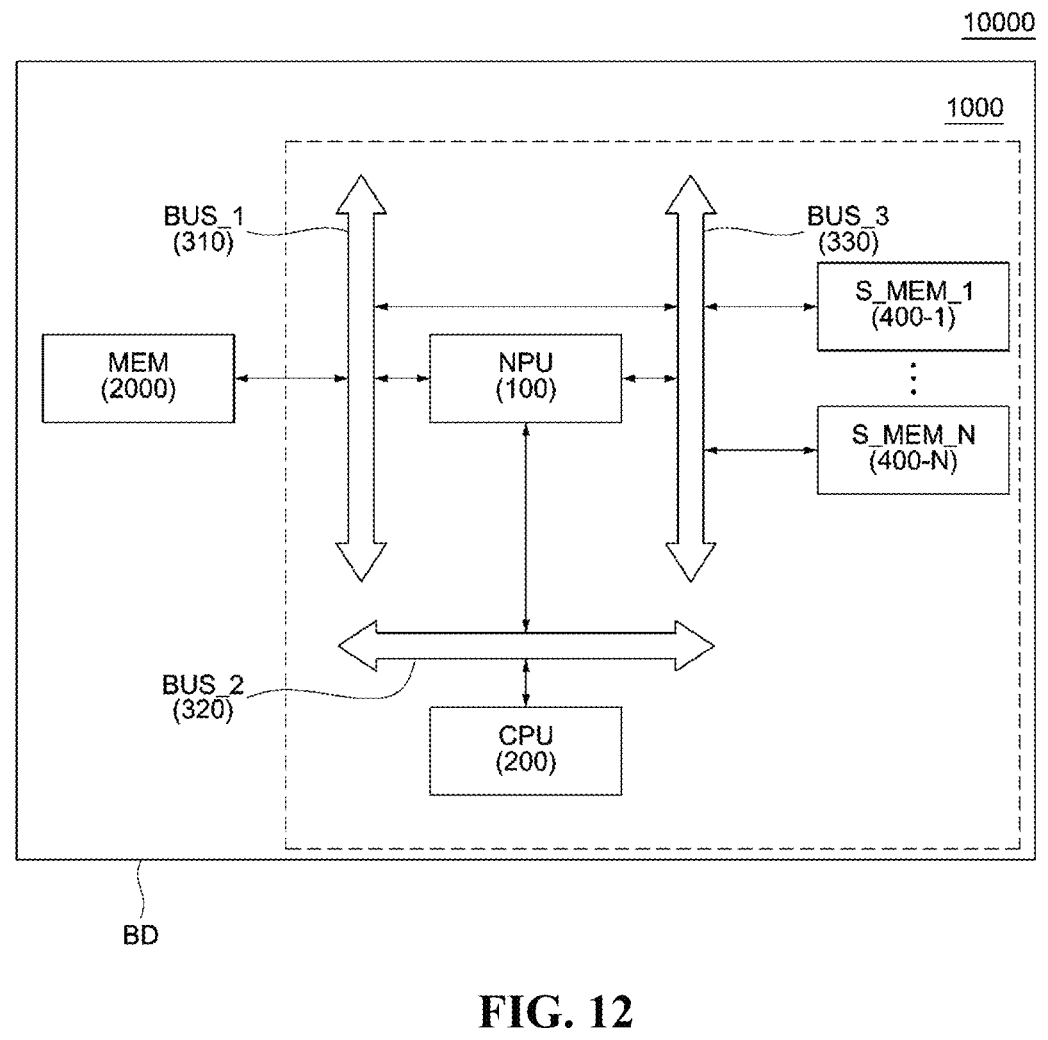

FIG. 12 is a block diagram illustrating a system on chip according to a fourth embodiment of the first example of the present disclosure.

Referring to FIG. 12, the device 10000 according to the fourth embodiment of the first example of the present disclosure will be described. The device 10000 includes the circuit board BD, the memory 2000 (e.g., the main memory), and the system on chip 1000. In describing the system on chip 1000 according to the fourth embodiment of the first example of the present disclosure, overlapping descriptions from FIG. 3 to FIG. 11 may be omitted for convenience of explanation. Each example and each embodiment of the present disclosure may be combined with other examples and other embodiments of the present disclosure and implemented in a modified manner.

The system on chip 1000 according to the fourth embodiment of the first example of the present disclosure is configured to include the neural processing unit 100, the central processing unit 200, the first bus 310, the second bus 320, the third bus 330, and a plurality of shared memories 400-1, . . . , 400-N. The plurality of shared memories 400-1, . . . , 400-N are configured as on-chip memories of the system on chip 1000. The memory 2000 is configured to be electrically connected to the first bus 310. The memory 2000 is configured to include at least one semiconductor chip. The plurality of shared memories 400-1, . . . , 400-N are configured to be electrically connected to the third bus 330.

The first bus 310 may be located between the neural processing unit 100 and the memory 2000. The second bus 320 may be located between the neural processing unit 100 and the central processing unit 200. The third bus 330 may be located between the neural processing unit 100 and the plurality of shared memories 400-1, . . . , 400-N. Here, the first bus 310 and the third bus 330 are configured to be electrically connected.

Since the operation of the neural processing unit 100 has been described with reference to FIG. 3 to FIG. 11, a duplicate description of the operation of the neural processing unit 100 may be omitted. Since the operation of the central processing unit 200 has been described with reference to FIG. 9 to FIG. 11, a duplicate description of the central processing unit 200 may be omitted.

The memory 2000 may be composed of at least one memory located outside the system on chip 1000. The memory 2000 may be composed of a single (homogeneous) memory or a heterogeneous memory. The capacity of the memory 2000 can be determined considering the parameter size of at least one neural network model to be driven on the system on chip 1000. The bandwidth of the first bus 310 can be determined according to the processing performance of the neural processing unit 100.

The plurality of shared memories 400-1, . . . , 400-N may be composed of a plurality of memories located inside the system on chip 1000. Each shared memory may be configured to operate independently of each other. The plurality of shared memories 400-1, . . . , 400-N of the system on chip 1000 according to the fourth embodiment of the first example of the present disclosure may include at least one memory such as SRAM, LPDDR RAM, Resistive RAM, Magneto-resistive RAM, Phase-change RAM, Ferroelectric RAM, Flash Memory, HBM, and the like. The plurality of shared memories 400-1, . . . , 400-N may be composed of a single (homogeneous) memory or a heterogeneous memory. Here, an example in which the plurality of shared memories 400-1, . . . , 400-N are implemented with SRAM will be described. The capacity of the plurality of shared memories 400-1, . . . , 400-N is designed to be smaller than the capacity of the memory 2000. If the capacity of the plurality of shared memories 400-1, . . . , 400-N increases, the semiconductor manufacturing cost may increase rapidly. Therefore, the total capacity of the plurality of shared memories 400-1, . . . , 400-N may be configured from 4 MBytes to 128 MBytes. Preferably, the total capacity of the plurality of shared memories 400-1, . . . , 400-N may be configured from 16 MBytes to 64 MBytes. The capacity of the plurality of shared memories 400-1, . . . , 400-N may be configured to be larger than the capacity of the internal memory 140 of the neural processing unit 100.

When the neural processing unit 100 uses the plurality of shared memories 400-1, . . . , 400-N implemented with SRAM, the energy consumption of the device 10000 can be significantly reduced compared to the case of using only the memory 2000. Therefore, when the compiler (not shown) generates the execution code of the neural network model to be processed by the system on chip 1000, it can set a data reuse command to preferentially store reusable input parameters, output parameters, and weight parameters in the plurality of shared memories 400-1, . . . , 400-N located inside the system on chip 1000 rather than the memory 2000.

The system on chip 1000 according to the fourth embodiment of the first example of the present disclosure can reduce the power consumption of the system on chip 1000 by providing a plurality of shared memories 400-1, . . . , 400-N and executing an execution code set to preferentially store reusable parameters in the plurality of shared memories 400-1, . . . , 400-N. In addition, by providing a plurality of independent shared memories for their respective domains (e.g., weight domain, attention score domain, etc.), the memory operation of each domain of the neural network model parameters (e.g., weights, input parameters, output parameters) can be easily processed.

The system on chip 1000 according to the fourth embodiment of the first example of the present disclosure can reduce the power consumption of the system on chip 1000 by providing the plurality of shared memories 400-1, . . . , 400-N and executing an execution code set to preferentially store reusable parameters in the plurality of shared memories 400-1, . . . , 400-N. In addition, by providing a plurality of independent shared memories, the memory operation of each domain of the neural network model parameters (e.g., weights, input parameters, output parameters) can be easily processed.

Figure 13:
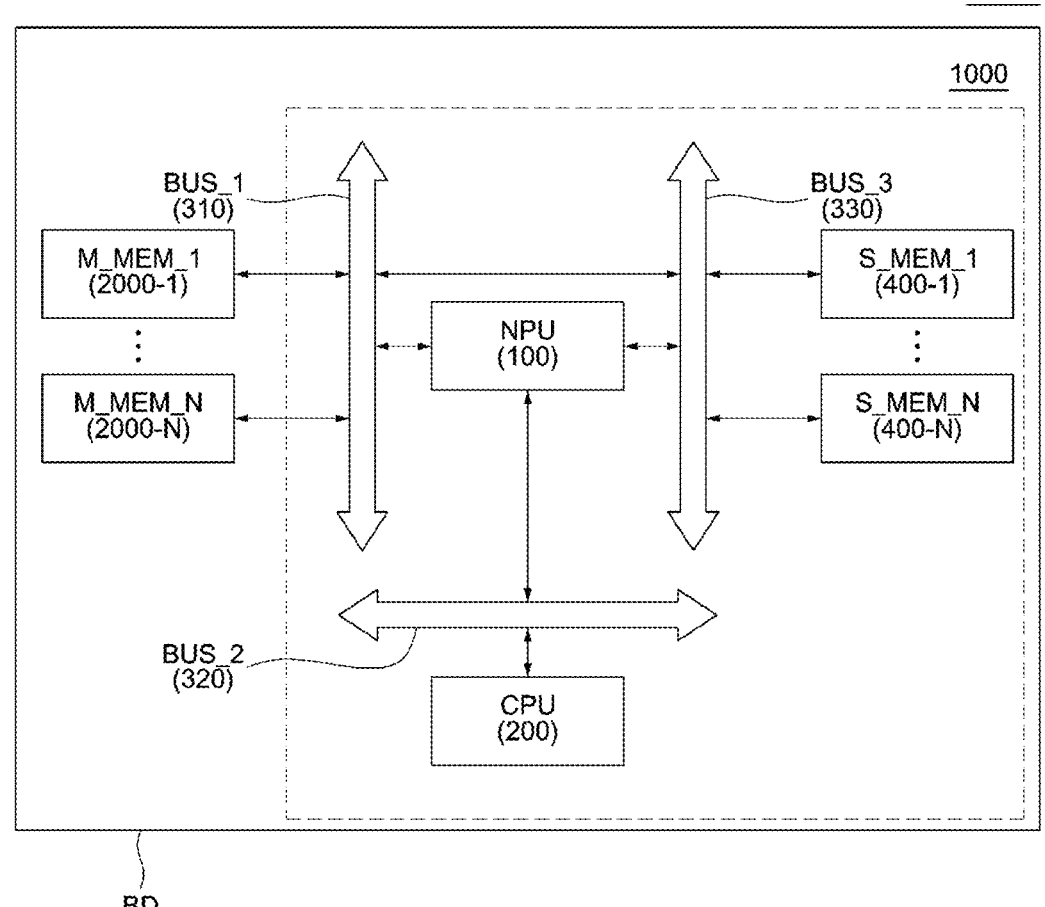
FIG. 13 is a block diagram illustrating a system on chip according to a fifth embodiment of the first example of the present disclosure.

FIG. 13 is a block diagram illustrating a system on chip according to a fifth embodiment of the first example of the present disclosure.

Referring to FIG. 13, the device 10000 according to the fifth embodiment of the first example of the present disclosure will be described. The device 10000 includes the circuit board BD, the plurality of main memories 2000-1, . . . , 2000-N, and the system on chip 1000. In describing the system on chip 1000 according to the fifth embodiment of the first example of the present disclosure, overlapping descriptions from FIG. 3 to FIG. 12 may be omitted for convenience of explanation. Each example and each embodiment of the present disclosure may be combined with other examples and other embodiments of the present disclosure and implemented in a modified manner.

The system on chip 1000 according to the fifth embodiment of the first example of the present disclosure is configured to include the neural processing unit 100, the central processing unit 200, the first bus 310, the second bus 320, the third bus 330, and the plurality of shared memories 400-1, . . . , 400-N. The plurality of shared memories 400-1, . . . , 400-N are configured as on-chip memories of the system on chip 1000. The plurality of main memories 2000-1, . . . , 2000-N are configured to be electrically connected to the first bus 310. The plurality of main memories 2000-1, . . . , 2000-N are configured to include at least one semiconductor chip. The plurality of shared memories 400-1, . . . , 400-N are configured to be electrically connected to the third bus 330.

The first bus 310 may be provided between the neural processing unit 100 and the plurality of main memories 2000-1, . . . , 2000-N. The second bus 320 may be provided between the neural processing unit 100 and the central processing unit 200. The third bus 330 may be provided between the neural processing unit 100 and the plurality of shared memories 400-1, . . . , 400-N. Here, the first bus 310 and the third bus 330 are configured to be electrically connected.

The description of the neural processing unit 100 is provided above with reference to FIG. 3 to FIG. 12. Accordingly, a duplicate description of the neural processing unit 100 may be omitted. The description of the central processing unit 200 is provided above with reference to FIG. 9 to FIG. 12. Accordingly, a duplicate description of the central processing unit 200 may be omitted. The description of the plurality of main memories 2000-1, . . . , 2000-N is provided above with reference to FIG. 10. Accordingly, a duplicate description of the plurality of main memories 2000-1, . . . , 2000-N may be omitted. The description of the plurality of shared memories 400-1, . . . , 400-N is provided above with reference to FIG. 12. Accordingly, a duplicate description of the plurality of shared memories 400-1, . . . , 400-N may be omitted.

The plurality of main memories 2000-1, . . . , 2000-N may be composed of a plurality of memories located outside the system on chip 1000. The total capacity of the plurality of main memories 2000-1, . . . , 2000-N can be determined considering the parameter size of at least one neural network model to be driven on the system on chip 1000. The total capacity of the plurality of main memories 2000-1, . . . , 2000-N may be configured to be larger than the total capacity of the plurality of shared memories 400-1, . . . , 400-N. Therefore, by providing a plurality of main memories outside the system on chip 1000, the manufacturing cost of the system on chip 1000 can be reduced.

The plurality of shared memories 400-1, . . . , 400-N may be composed of a plurality of memories located inside the system on chip 1000. The total capacity of the plurality of shared memories 400-1, . . . , 400-N may be configured to be larger than the capacity of the internal memory 140 of the neural processing unit 100. Therefore, by placing reusable parameters in the plurality of shared memories 400-1, . . . , 400-N, the data read from or transmitted from the plurality of main memories 2000-1, . . . , 2000-N can be reduced, thereby reducing the power consumption of the device 10000.

The compiler (not shown) can set reusable input parameters, output parameters, and weight parameters to be preferentially stored in the plurality of shared memories 400-1, . . . , 400-N rather than the plurality of main memories 2000-1, . . . , 2000-N when generating the execution code of the neural network model to be processed by the system on chip 1000.

The device 10000 according to the fifth embodiment of the first example of the present disclosure can support a generative neural network model with a large number of parameters and improve data reuse by combining the features of the second embodiment and the fourth embodiment of the first example of the present disclosure, with a scalable main memory and a scalable shared memory.

Figure 14:
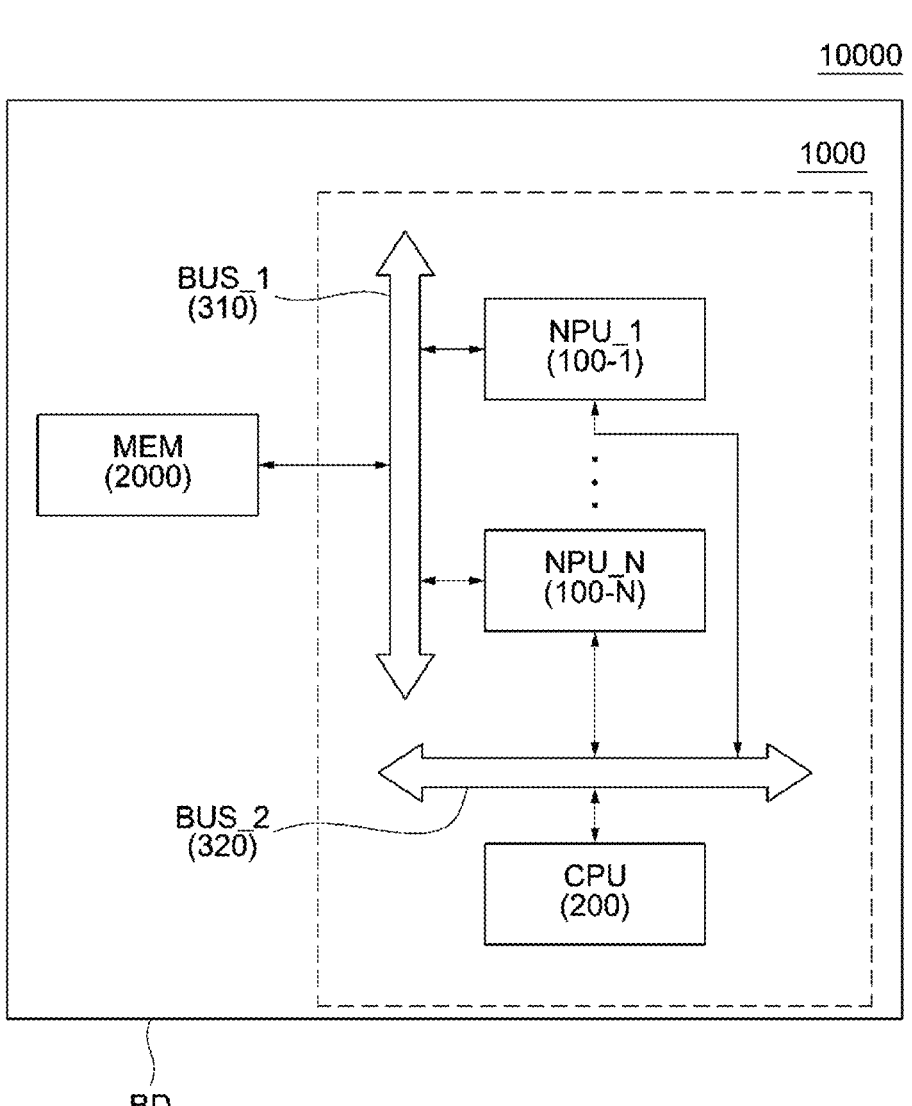
FIG. 14 is a block diagram illustrating a system on chip according to a sixth embodiment of the first example of the present disclosure.

FIG. 14 is a block diagram illustrating a system on chip according to a sixth embodiment of the first example of the present disclosure.

Referring to FIG. 14, the device 10000 according to the sixth embodiment of the first example of the present disclosure will be described. The device 10000 includes the circuit board BD, the memory 2000, and the system on chip 1000. In describing the system on chip 1000 according to the sixth embodiment of the first example of the present disclosure, overlapping descriptions from FIG. 3 to FIG. 13 may be omitted for convenience of explanation. Each example and each embodiment of the present disclosure may be combined with other examples and other embodiments of the present disclosure and implemented in a modified manner.

The system on chip 1000 according to the sixth embodiment of the first example of the present disclosure is configured to include a plurality of neural processing units (NPU_1, . . . , NPU_N) 100-1, . . . , 100-N, the central processing unit 200, the first bus 310, and the second bus 320. The memory 2000 is configured to be electrically connected to the first bus 310.

Each of the plurality of neural processing units 100-1, . . . , 100-N may be configured to communicate with the memory 2000. The first bus 310 may be provided between the plurality of neural processing units 100-1, . . . , 100-N and the memory 2000.

Each of the plurality of neural processing units 100-1, . . . , 100-N may be configured to communicate with the central processing unit 200. The second bus 320 may be provided between the plurality of neural processing units 100-1, . . . , 100-N and the central processing unit 200.

The description of the plurality of neural processing units 100-1, . . . , 100-N is provided above with reference to FIG. 3 to FIG. 13. Accordingly, a duplicate description of the neural processing unit 100 may be omitted.

The processing performance (TOPS) of each of the plurality of neural processing units 100-1, . . . , 100-N may be the same or different from each other. Each of the plurality of neural processing units 100-1, . . . , 100-N may be configured to operate independently. Each of the plurality of neural processing units 100-1, . . . , 100-N may be configured to process the operations of a specific neural network model in parallel.

The description of the central processing unit 200 is provided above with reference to FIG. 9 to FIG. 13. Accordingly, a duplicate description of the central processing unit 200 may be omitted.

The central processing unit 200 may be configured to control each of the plurality of neural processing units 100-1, . . . , 100-N based on the execution code of the neural network model. Here, the compiler (not shown) may be configured to generate each execution code corresponding to each of the plurality of neural processing units 100-1, . . . , 100-N. The central processing unit 200 may be configured to control the plurality of neural processing units 100-1, . . . , 100-N by directly setting the register values of the circuits of each of the plurality of neural processing units 100-1, . . . , 100-N based on each execution code.

The memory 2000 may be composed of a main memory located outside the system on chip 1000. The memory 2000 may be composed of a single (homogeneous) memory or a heterogeneous memory. The capacity of the memory 2000 can be determined considering the parameter size of at least one neural network model to be driven on the system on chip 1000. The bandwidth of the first bus 310 can be determined according to the processing performance of the plurality of neural processing units 100-1, . . . , 100-N.

The bandwidth of the first bus 310 can be determined according to the processing performance of the plurality of neural processing units 100-1, . . . , 100-N (e.g., Tera Operations Per Second (TOPS) of the neural processing unit 100). For example, the memory 2000 bandwidth of 2 GB/s to 4 GB/s per 1 TOPS may be required. For example, if there are two neural processing units 100 (e.g., 10 TOPS neural processing units), the memory 2000 may be configured to provide a bus bandwidth of 40 GB/s to 80 GB/s. The bandwidth of the first bus 310 can be determined according to the operating frequency of the memory 2000 and the number of communication channels.

The system on chip 1000 according to the sixth embodiment of the first example of the present disclosure has the effect of being able to generate a response to an input query more quickly by improving the parallel processing performance of the neural network model by providing a plurality of neural processing units 100-1, . . . , 100-N.

Figure 15:
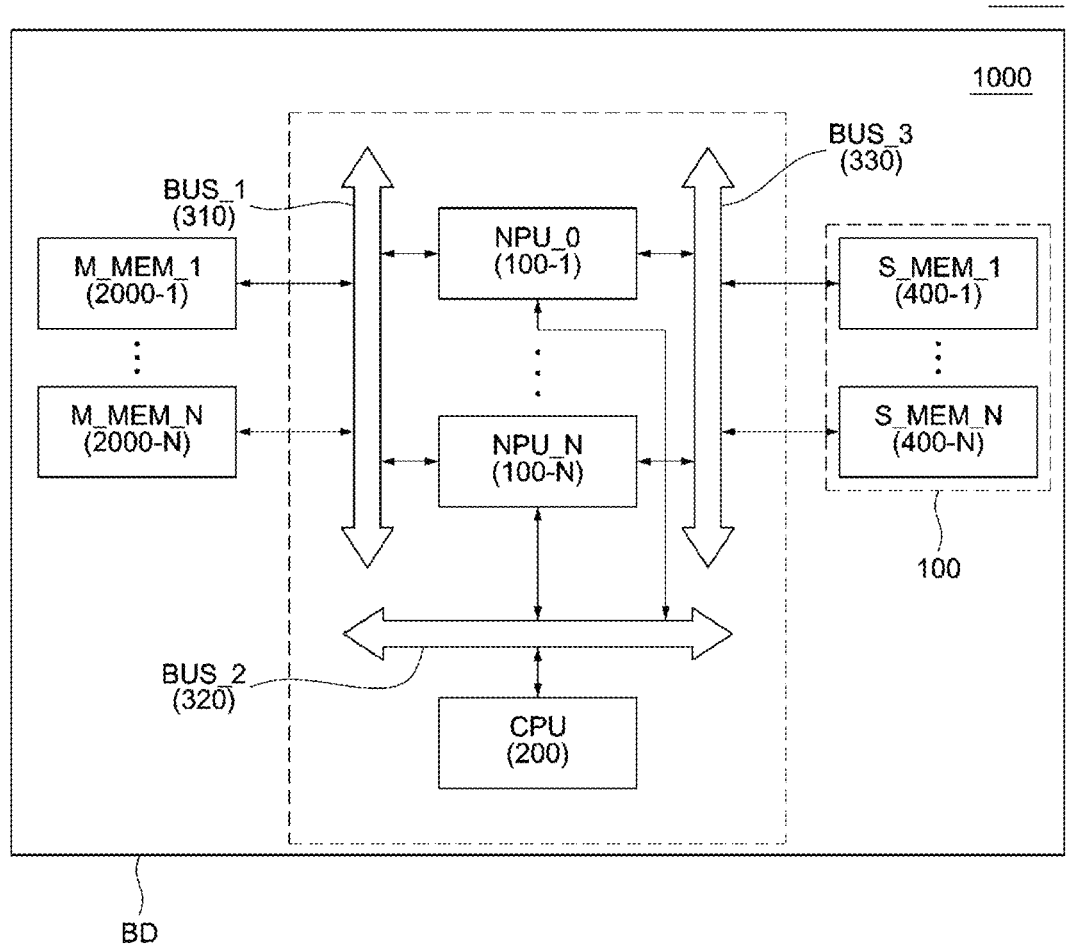
FIG. 15 is a block diagram illustrating a system on chip according to a seventh embodiment of the first example of the present disclosure.

FIG. 15 is a block diagram illustrating a system on chip according to a seventh embodiment of the first example of the present disclosure.

Referring to FIG. 15, the device 10000 according to the seventh embodiment of the first example of the present disclosure will be described. The device 10000 includes the circuit board BD, the plurality of main memories 2000-1, . . . , 2000-N, and the system on chip 1000. In describing the system on chip 1000 according to the seventh embodiment of the first example of the present disclosure, overlapping descriptions from FIG. 3 to FIG. 14 may be omitted for convenience of explanation. Each example and each embodiment of the present disclosure may be combined with other examples and other embodiments of the present disclosure and implemented in a modified manner.

The system on chip 1000 according to the seventh embodiment of the first example of the present disclosure is configured to include the plurality of neural processing units 100-1, . . . , 100-N, the central processing unit 200, the first bus 310, the second bus 320, the third bus 330, and the plurality of shared memories 400-1, . . . , 400-N. The plurality of shared memories 400-1, . . . , 400-N are configured as on-chip memories of the system on chip 1000. The plurality of main memories 2000-1, . . . , 2000-N are configured to be electrically connected to the first bus 310. The plurality of main memories 2000-1, . . . , 2000-N are configured to include at least one semiconductor chip. The plurality of shared memories 400-1, . . . , 400-N are configured to be electrically connected to the third bus 330.

The first bus 310 may be provided between the neural processing unit 100 and the plurality of main memories 2000-1, . . . , 2000-N. The second bus 320 may be provided between the neural processing unit 100 and the central processing unit 200. The third bus 330 may be provided between the neural processing unit 100 and the plurality of shared memories 400-1, . . . , 400-N. Here, the first bus 310 and the third bus 330 are configured to be electrically connected.

The description of the neural processing unit 100 is provided above with reference to FIG. 3 to FIG. 14. Accordingly, a duplicate description of the neural processing unit 100 may be omitted. The description of the central processing unit 200 is provided above with reference to FIG. 9 to FIG. 14. Accordingly, a duplicate description of the central processing unit 200 may be omitted. The description of the plurality of main memories 2000-1, . . . , 2000-N is provided above with reference to FIG. 10. Accordingly, a duplicate description of the plurality of main memories 2000-1, . . . , 2000-N may be omitted. The description of the plurality of shared memories 400-1, . . . , 400-N is provided above with reference to FIG. 12. Accordingly, a duplicate description of the plurality of shared memories 400-1, . . . , 400-N may be omitted. The description of the plurality of neural processing units 100-1, . . . , 100-N is provided above with reference to FIG. 14. Accordingly, a duplicate description of the plurality of neural processing units 100-1, . . . , 100-N may be omitted.

The plurality of main memories 2000-1, . . . , 2000-N may be composed of a plurality of memories located outside the system on chip 1000. The total capacity of the plurality of main memories 2000-1, . . . , 2000-N can be determined considering the parameter size of at least one neural network model to be driven on the system on chip 1000. The total capacity of the plurality of main memories 2000-1, . . . , 2000-N may be configured to be larger than the total capacity of the plurality of shared memories 400-1, . . . , 400-N. Therefore, by providing a plurality of main memories outside the system on chip 1000, the manufacturing cost of the system on chip 1000 can be reduced.

The plurality of shared memories 400-1, . . . , 400-N may be composed of a plurality of memories located inside the system on chip 1000. The total capacity of the plurality of shared memories 400-1, . . . , 400-N may be configured to be larger than the capacity of the internal memory 140 of the neural processing unit 100. Therefore, by placing reusable parameters in the plurality of shared memories 400-1, . . . , 400-N, the data read from or transmitted from the plurality of main memories 2000-1, . . . , 2000-N can be reduced, thereby reducing the power consumption of the device 10000.

The compiler (not shown) can set reusable input parameters, output parameters, and weight parameters to be preferentially stored in the plurality of shared memories 400-1, . . . , 400-N rather than the plurality of main memories 2000-1, . . . , 2000-N when generating the execution code of the neural network model to be processed by the system on chip 1000.

The device 10000 according to the seventh embodiment of the first example of the present disclosure provides a plurality of neural processing units, a scalable main memory, and a scalable shared memory by combining the features of the fifth embodiment and the sixth embodiment of the first example of the present disclosure. Accordingly, a generative neural network model with a large number of parameters can be supported by parallel processing of a plurality of neural processing units while improving data reuse.

Figure 16:
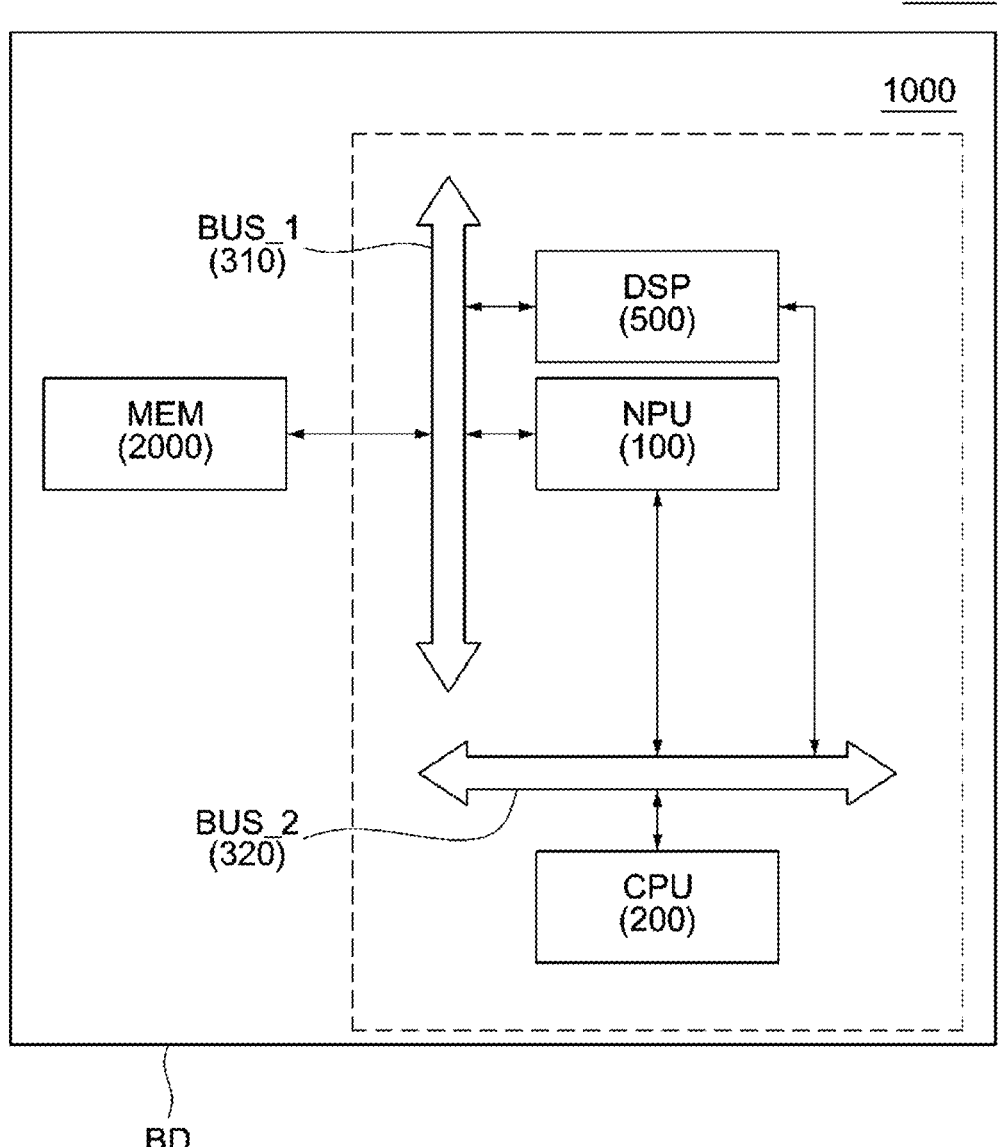
FIG. 16 is a block diagram illustrating a system on chip according to an eighth embodiment of the first example of the present disclosure.

FIG. 16 is a block diagram illustrating a system on chip according to an eighth embodiment of the first example of the present disclosure.

Referring to FIG. 16, the system on chip 1000 according to the eighth embodiment of the first example of the present disclosure will be described. In describing the system on chip 1000 according to the eighth embodiment of the first example of the present disclosure, overlapping descriptions from FIG. 3 to FIG. 15 may be omitted for convenience of explanation. Each example and each embodiment of the present disclosure may be combined with other examples and other embodiments of the present disclosure and implemented in a modified manner.

The system on chip 1000 according to the eighth embodiment of the first example of the present disclosure is configured to include the neural processing unit 100, the central processing unit 200, the first bus 310, and the second bus 320. Here, the system on chip 1000 according to the eighth embodiment of the first example of the present disclosure is configured to further include a digital signal processing unit 500. The memory 2000 is configured to be electrically connected to the first bus 310. The memory 2000 is configured to include at least one semiconductor chip.

The first bus 310 may be provided between the neural processing unit 100 and the memory 2000. The first bus 310 may be provided between the digital signal processing unit 500 and the memory 2000. The second bus 320 may be provided between the neural processing unit 100 and the central processing unit 200. The second bus 320 may be provided between the digital signal processing unit 500 and the central processing unit 200.

The description of the neural processing unit 100 is provided above with reference to FIG. 3 to FIG. 15. Accordingly, a duplicate description of the neural processing unit 100 may be omitted. The description of the central processing unit 200 is provided above with reference to FIG. 9 to FIG. 15. Accordingly, a duplicate description of the central processing unit 200 may be omitted. The description of the memory 2000 is provided above with reference to FIG. 9 to FIG. 15. Accordingly, a duplicate description of the memory 2000 may be omitted.

The digital signal processing unit 500 may be configured to process at least a part of the operations of the neural network model that are inefficient to be processed by the neural processing unit 100. The digital signal processing unit 500 includes at least one vector processor (not shown) and at least one scalar processor (not shown).

The system on chip 1000 according to the eighth embodiment of the first example of the present disclosure can further provide a digital signal processing unit 500 to offload specific operations of the neural network model that are inefficient to be processed by the neural processing unit 100. Therefore, the system on chip 1000 can process the neural network model in real time and at high speed.

In some examples, to improve the transmission speed of parameters or operational data between the shared memory S and the neural processing unit 100, a dedicated bus or a high-speed bus interface that operates separately from the system bus may be further included. Here, the system bus may be configured to support communication between modules such as the neural processing unit, the central processing unit, and the on-chip memory as a common data transmission path inside the system on chip 1000, including the second bus 320, the third bus 330, and the like. On the other hand, the dedicated bus can play a role in mitigating the data transmission bottleneck phenomenon and enabling high-speed access by connecting the model parameters of a specific domain stored in the shared memory to a plurality of neural processing units in parallel. This separate bus configuration is designed to reduce the load on the main bus (e.g., the first bus 310) and at the same time improved the operation path for accessing the shared memory.

The various system on chip (SoC) embodiments according to the first example of the present disclosure (see FIG. 9 to FIG. 16) provide a hardware foundation for implementing a scalable on-device AI acceleration platform with high parallel processing capability and flexibility, and this platform may selectively or in combination include the following key features:

First, according to various examples, a multi-NPU core architecture that maximizes parallel operation processing capability by integrating a plurality of NPU cores (each NPU including an integer operation-centric processing core P_CORE and a special function unit SFU for processing floating-point (FP) operations) with improved power, performance, and area (PPA) on a single chip may be provided.

(e.g., see the sixth embodiment (FIG. 14) and the seventh embodiment (FIG. 15) of the first example).

Second, a hierarchical/distributed memory system may be provided, which is composed of a plurality of independent on-chip shared memory (SRAM) banks that can be allocated to each NPU core or NPU core group to increase data locality, and a multi-channel main memory (external DRAM) system that is accessible by all of these NPU cores and provides a high total bandwidth. (e.g., see the third, fourth, fifth, and seventh embodiments (FIG. 11, FIG. 12, FIG. 13, FIG. 15) of the first example). This efficiently manages complex data flows and reduces memory bottleneck phenomena.

Third, the special function unit SFU in the NPU core may include a programmable function approximation (Piecewise Affine Function, PAF) unit. (e.g., see the configuration of the SFU 150 in the NPU 100 of FIG. 3 and the fourth example (FIG. 24, FIG. 25, and FIG. 27)). This allows for the software support of various current and future activation functions and nonlinear operations without separate hardware changes, thereby securing the flexibility and future scalability of the system.

Fourth, in the system configuration according to the first example of the present disclosure (e.g., FIG. 9 to FIG. 16), a digital signal processing device (DSP) 500 for offloading data processing before and after neural network operations (e.g., sensor data preprocessing, post-processing) or specific operations that are inefficient to be processed by the NPU may be selectively integrated (FIG. 16 illustrates an example of such a DSP integration). This allows the NPU to focus on core AI operations, thereby improving the efficiency of the entire system.

The organic combination of the above-described components creates a powerful synergistic effect. The multi-NPU core and the distributed/hierarchical memory structure provide extreme parallelism and high data supply capability, enabling the processing of complex or multiple AI models simultaneously or very quickly in an on-device environment. When a programmable SFU is combined with this, it can provide flexibility that is not limited to a specific model or operation and adaptability to new AI algorithms of the future in an on-device environment. The selective integration of a DSP further expands the application range of this platform.

In summary, a scalable on-device artificial intelligence (AI) acceleration system according to the present disclosure may include: one or a plurality of neural processing unit (NPU) cores, each including an integer operation processing core and a floating-point special function unit (SFU); (optionally) one or more on-chip shared memories associated with each of the NPU cores or a group of NPU cores to provide data locality; a high-bandwidth main memory interface shared by the NPU cores for large-capacity data storage; and an integrated controller that distributes AI operations to the NPU cores and (optionally) the DSP, and controls the data flow through the on-chip shared memory and the main memory interface. The floating-point special function unit (SFU) may include a programmable function approximation PAF circuit that approximates various nonlinear functions according to input parameters. In addition, a digital signal processing device (DSP) that performs specific signal processing operations independently of the operations of the NPU cores may be selectively provided. This enables the parallel and flexible acceleration of various AI models and workloads in an on-device environment, making it possible to realize high-performance AI applications.

The various system on chip (SoC) embodiments according to the first example of the present disclosure (see FIG. 9 to FIG. 16), when combined with the unique architecture of the neural processing unit 100 described above, can create an integrated synergistic effect that goes beyond the simple parallel arrangement of hardware. This is a core feature of the present disclosure that solves the technical challenges of implementing high-performance on-device AI, which can be specified as follows.

For example, an intelligent linkage between a hierarchical/distributed memory system and a hybrid function approximation unit can be implemented. As shown in FIG. 11, FIG. 13, FIG. 15, etc., the system according to the first example of the present disclosure may adopt a hierarchical memory structure composed of the memory 2000 (e.g., a large-capacity external main memory) and the high-speed on-chip shared memory 400. The effect of this memory system can be enhanced when it operates in conjunction with the hybrid structure of the special function unit 150, which combines a programmable method and a dedicated hardware method to process various nonlinear functions. Specifically, the controller 110 or the compiler can improved the data placement so that the vast size of the neural network weights are stored in the memory 2000, while key parameters such as the programmable operation coefficients that the function approximation unit FuncApx repeatedly uses to approximate activation functions such as GELU and SiLU are made resident in the high-speed on-chip shared memory 400 or the internal memory 140 of the neural processing unit (NPU) 100. Since the coefficients are loaded directly from the on-chip memory without needing to access the external memory for each activation function operation, the memory bottleneck phenomenon of the system can be greatly mitigated, and the power consumption associated with data movement can be reduced.

For example, an operation pipeline through NPU-DSP heterogeneous computing can be implemented. As shown in FIG. 16, the system according to the present disclosure can implement a highly specialized heterogeneous computing architecture by integrating a digital signal processing device (DSP) 500 along with the neural processing unit 100. This can improve the processing efficiency by decomposing the entire AI inference process into the following 3-stage specialized pipeline. Signal pre/post-processing (DSP dedicated): Traditional signal processing operations, such as sensor data filtering and fast Fourier transform (FFT), can be configured to be handled exclusively by the DSP 500. Large-scale integer matrix operations (P_CORE dedicated): Matrix multiplication (MatMul), which accounts for most of the neural network computation, can be configured to be processed by the integer operation-based processing core (P_CORE) 120, which is specialized for low power. High-precision nonlinear function operations (SFU/FuncApx dedicated): Complex nonlinear functions that require the precision of floating-point (FP), such as Softmax, negative exponential, and reciprocal, can be configured to be processed at ultra-high speed by the function approximation unit FuncApx in a special function unit (SFU) 150, which performs autonomous pipeline operations with a single instruction. This division of roles can improve the overall processing performance and energy efficiency of the system by allocating hardware improved for each operation.

Figure 17:
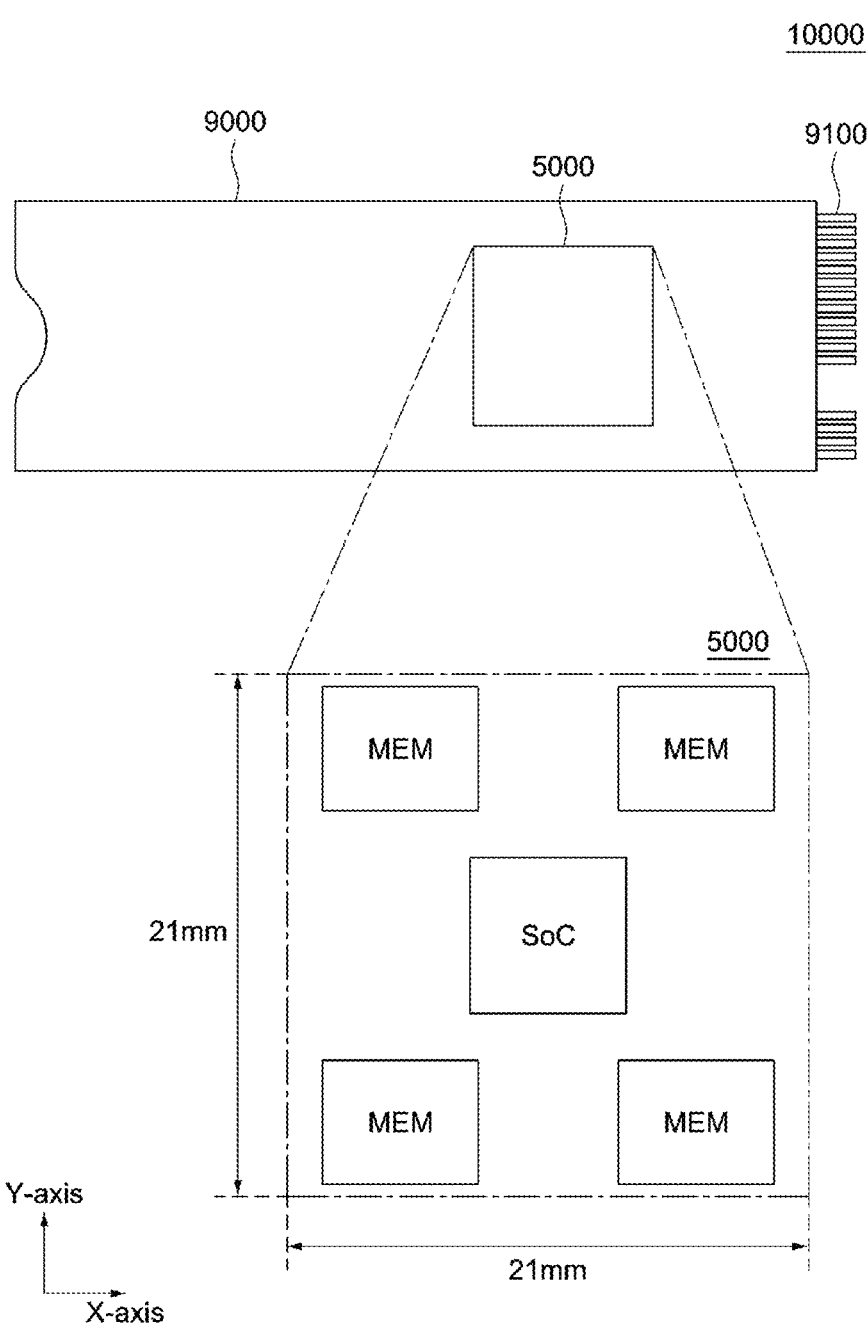
FIG. 17 is a diagram illustrating a device according to a first embodiment of a second example of the present disclosure.

FIG. 17 illustrates the device 10000 according to a first embodiment of a second example of the present disclosure.

The device 10000 shown in FIG. 17 may be a plan view of the device 10000 as viewed from above, but is not limited thereto. The size of each of the hardware components described with reference to FIG. 17 may refer to the width (X-axis length) and depth (Y-axis length).

The device 10000 according to the first embodiment of the second example of the present disclosure includes a circuit board 9000 and a package 5000. The circuit board 9000 may further include a slot 9100 (e.g., an M.2 slot). The device 10000 according to the first embodiment of the second example of the present disclosure may correspond to the device 10000 according to the embodiments of the first example of the present disclosure. The circuit board 9000 according to the first embodiment of the second example of the present disclosure may correspond to the circuit board BD according to the embodiments of the first example of the present disclosure. The package 5000 according to the first embodiment of the second example of the present disclosure may correspond to the package (not shown) in the embodiments of the first example of the present disclosure. Overlapping descriptions made with reference to FIG. 3 to FIG. 16 are omitted.

The device 10000 according to the first embodiment of the second example of the present disclosure may be configured as a system on chip SoC. The system on chip SoC refers to a semiconductor package that integrates one or more of the neural processing unit 100 and various electronic system components. The system on chip SoC can integrate digital circuits, analog circuits, mixed-signal, and radio frequency processing circuits in a single package. For example, the system on chip SoC may further include a central processing unit (CPU), a digital signal processor (DSP), an image signal processor (ISP), or a graphics processing unit in addition to the neural processing unit NPU. The system on chip SoC may include at least one memory MEM. The system on chip SoC may include a high-speed data bus for efficient communication between the various circuits included in the system on chip SoC. The system on chip SoC may include at least one interface, such as PCIe, USB, I2C, SPI, UART, or GPIO, for connection with external devices and sensors. The system on chip SoC may include an on-chip power management device that regulates the voltage and power distribution of the semiconductor package. The system on chip SoC may include a communication interface that integrates wired or wireless communication protocols, such as Ethernet, Wi-Fi, Bluetooth, and cellular connectivity, for data transmission.

Referring to FIG. 17, the device 10000 is an example implemented in an M.2 form factor. In the first embodiment of the second example of the present disclosure, the width of the circuit board 9000 is 22 mm and the depth may be 42 mm, 60 mm, 80 mm, or 110 mm, but is not limited thereto.

The M.2 board is a next-generation interface standard for high-speed data transmission, providing high speed and high efficiency, and is designed in a compact size, being adopted in various devices, such as laptops, desktops, and mini PCs. In particular, a small form factor such as M.2 is easy to apply on-device.

The package 5000 mounted on the device 10000 may include a system on chip SoC and at least one memory MEM. The system on chip SoC according to the first embodiment of the second example of the present disclosure may correspond to the system on chip 1000 according to the embodiments of the first example of the present disclosure. The memory MEM of FIG. 17 may correspond to the memory MEM or the main memory (M_MEM) described above with reference to FIG. 9 to FIG. 16.

The physical size of the system on chip SoC may be, for example, 4.50 mm×4.85 mm. However, the present disclosure is not limited thereto. Considering the minimum separation distance between the system on chip SoC and the memories MEMs, the physical size of each memory MEM may be limited to 6.43 mm×5.30 mm. However, the present disclosure is not limited to the size or dimensions of each component.

Meanwhile, the maximum number of memories MEM in the package 5000 can be determined considering the processing capability of the system on chip SoC (e.g., TOPS), or the size of a package that is smaller than a certain size that satisfies the size of a specific form factor applied to the system on chip SoC.

According to an embodiment, the process node of the semiconductor manufacturing process of the memory MEM may be lower than the process node of the semiconductor manufacturing process of the system on chip SoC. For example, the memory MEM may be manufactured by a 14 nm semiconductor manufacturing process, and the process of the system on chip SoC may be manufactured by a 7 nm semiconductor manufacturing process. For example, the memory MEM may be manufactured by a 5 nm semiconductor manufacturing process and the system on chip SoC may be manufactured by a 7 nm semiconductor manufacturing process. For example, the memory MEM may be manufactured by a 2 nm semiconductor manufacturing process, and the system on chip SoC may be manufactured by a 5 nm semiconductor manufacturing process. According to the above-described configuration, the size of the system on chip SoC can be reduced to be suitable for the specification of a specific form factor (e.g., M.2). In particular, in the case of on-device, if the size of the system on chip SoC is large, it can be an obstacle to commercialization.

Referring to FIG. 17, the package 5000 may include a maximum of four memories MEMs. Each memory MEM may be a Low Power Double Data Rate 5 (LPDDR5). If the number of bus channels between the system on chip SoC and the memories MEMs is increased to correspond to the number of memories MEMs, the memory bandwidth of the first bus 310 of the embodiments of the first example of the present disclosure can be increased. For example, if the system on chip SoC and the four memories MEMs of the package 5000 are placed closest to each other, the size of the package 5000 may be 21 mm×31 mm. In this embodiment, the package 5000 can be mounted on the device 10000 having a width of 22 mm and a depth of 42 mm.

However, the package 5000 of FIG. 17 cannot be mounted on the circuit board 9000 having a depth of 30 mm. Therefore, in FIG. 18, an embodiment in which the package 5000 including the system on chip SoC and four memories MEMs can be mounted on the circuit board 9000 having a depth of 30 mm will be described.

The package 5000 may include at least one semiconductor chip to which a fan-in semiconductor package, a fan-out semiconductor package, a package on package (PoP), and/or a 2.5D package method is applied. In addition, the technical features of the different examples of the present disclosure may be combined with each other and implemented in a modified manner.

Figure 18:
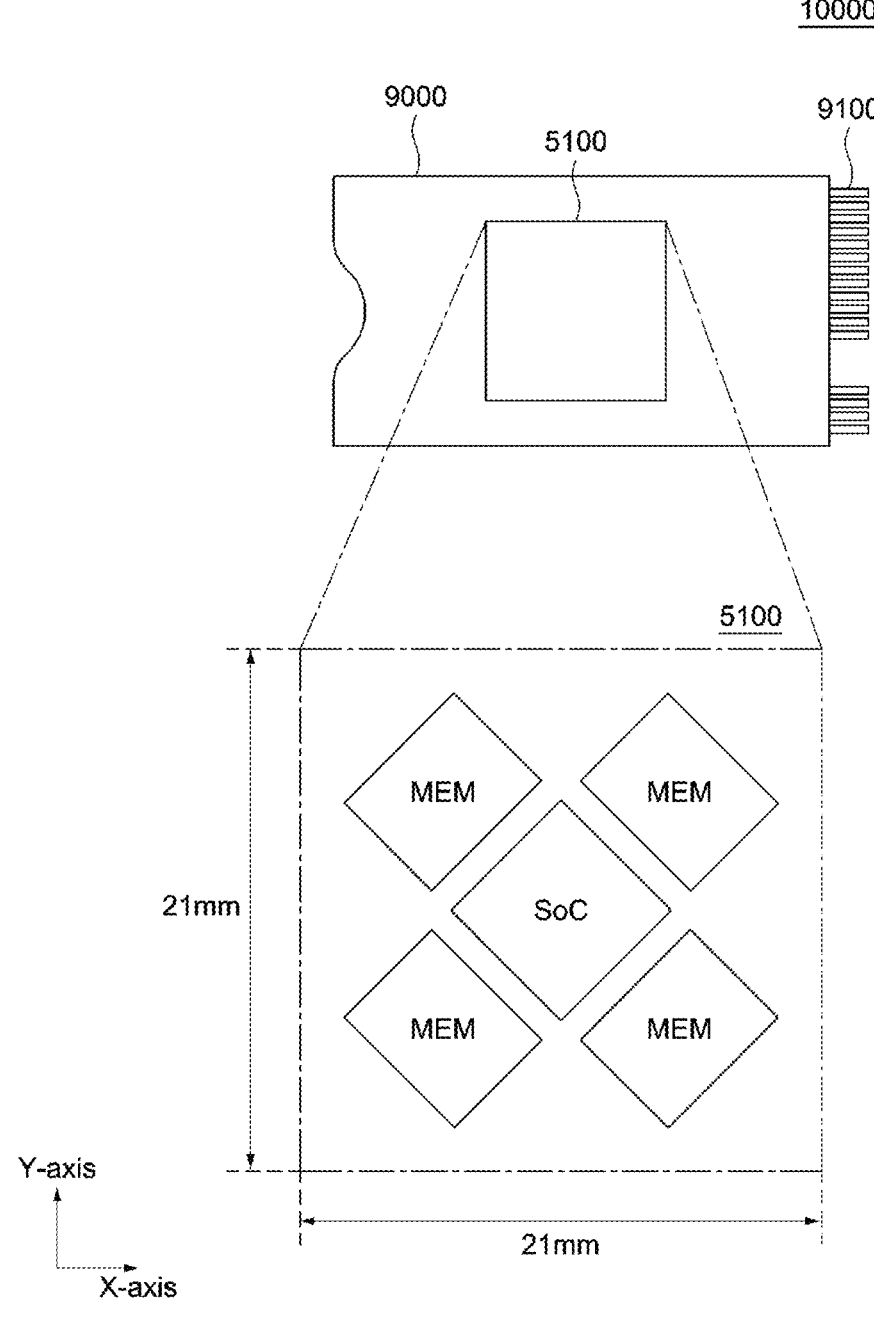
FIG. 18 is a diagram illustrating a device according to a second embodiment of the second example of the present disclosure.

FIG. 18 illustrates the device 10000 according to a second embodiment of a second example of the present disclosure.

The device 10000 shown in FIG. 18 may be a plan view of the device 10000 as viewed from above, but is not limited thereto. The size of each of the hardware components described with reference to FIG. 18 may refer to the width (X-axis length) and depth (Y-axis length).

The device 10000 according to the second embodiment of the second example of the present disclosure includes the circuit board 9000 and the package 5100. The circuit board 9000 may further include a slot 9100 (e.g., an M.2 slot). The device 10000 according to the second embodiment of the second example of the present disclosure may correspond to the device 10000 according to the embodiments of the first example of the present disclosure. The circuit board 9000 according to the second embodiment of the second example of the present disclosure may correspond to the circuit board BD according to the embodiments of the first example of the present disclosure. The package 5100 according to the second embodiment of the second example of the present disclosure may correspond to the package (not shown) in the embodiments of the first example of the present disclosure. Overlapping contents described with reference to FIG. 3 to FIG. 17 are omitted. In addition, in describing the second embodiment of the second example of the present disclosure, overlapping descriptions with the first embodiment of the second example may be omitted for convenience of explanation.

Referring to FIG. 18, the device 10000 is an example implemented in an M.2 form factor. In the second embodiment of the second example of the present disclosure, the width of the circuit board 9000 may be 22 mm and the depth may be 30 mm, but is not limited thereto.

The package 5100 mounted on the device 10000 may include a system on chip SoC and at least one memory MEM. The system on chip SoC according to the second embodiment of the second example of the present disclosure may correspond to the system on chip 1000 according to the embodiments of the first example of the present disclosure. The memory MEM of FIG. 18 may correspond to the memory MEM or the main memory (M_MEM) described above with reference to FIG. 10 to FIG. 17.

The width of the circuit board 9000 shown in FIG. 18 may be 22 mm, and the depth may be 30 mm. In order to mount the package 5100 within such a constrained size, the arrangement of the system on chip SoC and the plurality of memories MEMs in the package 5100 must be improved.

The physical size of the system on chip SoC may be 4.50 mm×4.85 mm, and the physical size of each memory MEM may be 6.43 mm×5.30 mm.

According to an embodiment, the process node of the semiconductor manufacturing process of the memory MEM may be lower than the process node of the semiconductor manufacturing process of the system on chip SoC. For example, the memory MEM may be manufactured by a 14 nm semiconductor manufacturing process, and the process of the system on chip SoC may be manufactured by a 7 nm semiconductor manufacturing process. For example, the memory MEM may be manufactured by a 5 nm semiconductor manufacturing process and the system on chip SoC may be manufactured by a 7 nm semiconductor manufacturing process. For example, the memory MEM may be manufactured by a 2 nm semiconductor manufacturing process, and the system on chip SoC may be manufactured by a 5 nm semiconductor manufacturing process. According to the above-described configuration, the size of the system on chip SoC can be reduced to be suitable for the specification of a specific form factor (e.g., M.2).

Referring to FIG. 18, the system on chip SoC and the plurality of memories MEMs of the package 5100 may be arranged in a diagonal direction. In this case, the size of the package 5100 can be reduced to 21 mm×21 mm. To elaborate, the configuration of the plurality of semiconductor chips arranged inside the package 5100 may be referred to as a "rotated multi-chip substrate layout." The package 5100 of the rotated multi-chip substrate layout has the effect of being able to reduce the size of the package 5100 due to the arrangement of each semiconductor chip rotated at a specific angle. That is, the X-axis of the system on chip SoC and the X-axis of the package 5100 may not be parallel. The Y-axis of the system on chip SoC and the Y-axis of the package 5100 may not be parallel. The X-axis of the memory MEM and the X-axis of the package 5100 may not be parallel. The Y-axis of the memory MEM and the Y-axis of the package 5100 may not be parallel.

Meanwhile, the number of memories MEMs in the package 5100 can be changed according to the processing capability of the system on chip SoC (e.g., TOPS), the size of a specific form factor, and the size that can be placed in a package smaller than the specific form factor.

The package 5100 may be configured to include at least one semiconductor chip to which a fan-in semiconductor package, a fan-out semiconductor package, a package on package (PoP), and/or a 2.5D package method is applied. In addition, the technical features of the different examples of the present disclosure may be combined with each other and implemented in a modified manner.

That is, the package 5100 may include a semiconductor package substrate, a system on chip SoC rotated at a first angle with respect to one side of the semiconductor package substrate on a planar basis and disposed on the semiconductor package substrate, and one or a plurality of memories MEMs rotated at a second angle with respect to one side of the semiconductor package substrate on a planar basis and disposed on the semiconductor package substrate adjacent to the system on chip SoC. Here, the first angle and the second angle can be determined so that the size of the package 5100 is smaller than the size of a specific form factor.

That is, according to the device 10000 of the second embodiment of the second example of the present disclosure, a 'rotated multi-chip substrate layout' for mounting a system on chip SoC and a plurality of memories MEMs on a very limited form factor such as M.2 2230 is exemplified. In order to efficiently implement sophisticated and computationally intensive artificial intelligence (AI) operations in such a small device with extremely limited physical space, a customized hardware foundation may be beneficial. The various embodiments of the present disclosure can provide such hardware support, and some of its features are as follows.

First, a neural processing unit (NPU) core with highly improved power, performance, and area (PPA) can be provided. This NPU core includes an integer operation-centric processing core P_CORE and a special function unit SFU for processing efficient floating-point (FP) operations, and in particular, an area-efficient function approximation (Piecewise Affine Function, PAF) method is adopted in the SFU to support complex activation function processing.

Second, a packaging technology that integrates the NPU chip and the memory (e.g., LPDDR series) at high density to facilitate mounting on a standard small form factor such as an M.2 card can be applied. As exemplified in FIG. 18, the overall module size can be reduced through an efficient space layout such as rotating and arranging the system on chip SoC and the memory chip in the package.

Third, a main memory of sufficient capacity, placed very close to the package or on the main board, can be provided to store the weights and operational data of the target AI model and to exchange data with the NPU at high speed. This reduces the need for memory expansion through an external large printed circuit board (PCB), contributing to the miniaturization of the entire system.

As such, the organic combination of a PPA-improved NPU core, high-density integrated packaging technology (see FIG. 18), and a proximate memory configuration creates a significant synergistic effect. This enables the effective implementation of sophisticated on-device AI functions (e.g., advanced operations such as speculative decoding) even in mobile devices, wearable devices, or small embedded systems with extremely limited space and power budgets, where it was previously difficult to mount an AI accelerator.

In conclusion, a small form factor AI acceleration device according to the present disclosure may include an NPU die including an integer operation processing core and a floating-point special function unit (SFU) customized for power, performance, and area, and one or more memory dies electrically connected to the NPU die to store the weights and operational data of an AI model. The NPU die and the memory die are integrated at high density in a single semiconductor package that can be mounted on a standard small form factor substrate such as the M.2 specification as shown in FIG. 18, and the relative positions and orientations of the dies in the package can be configured to reduce the total package area. In addition, the SFU may include a programmable function approximation circuit to implement various activation functions in an area-efficient manner. Through this, the AI acceleration device of the present disclosure can be successfully integrated into portable or embedded devices with extreme constraints on physical size and power consumption, and can support the efficient performance of advanced AI operations (e.g., operations such as speculative decoding) in an on-device environment.

Figure 19:
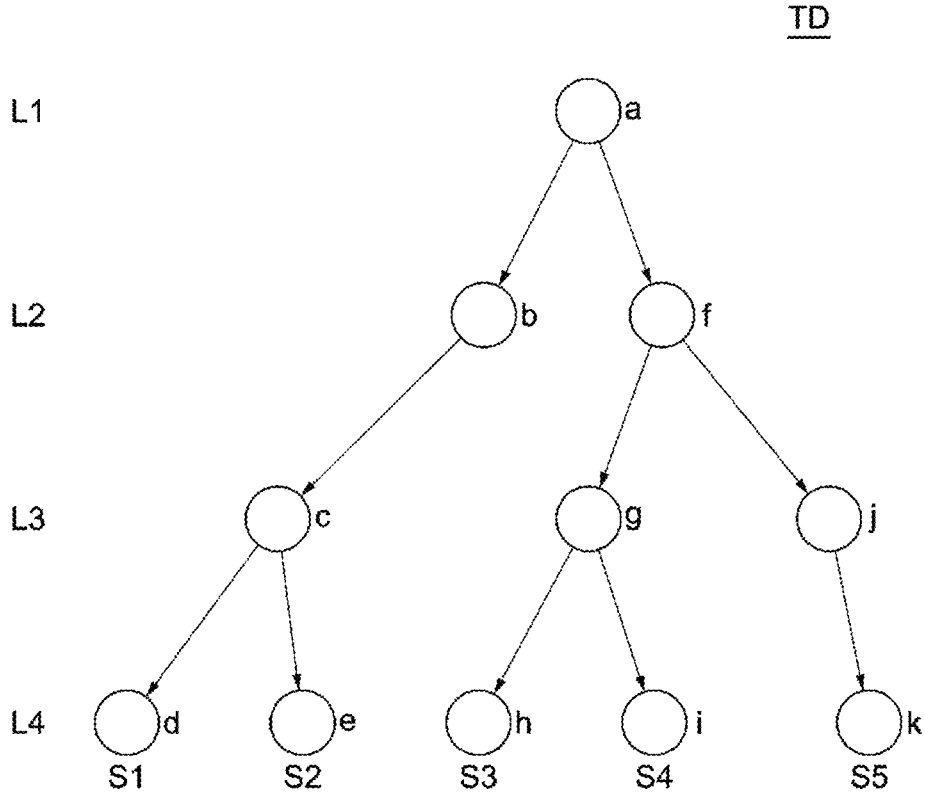
FIG. 19 is a diagram illustrating a tree for explaining speculative decoding according to a third example of the present disclosure.

FIG. 19 is a tree diagram illustrating speculative decoding according to a third example of the present disclosure.

The speculative decoding method according to the third example of the present disclosure may be performed in the device 10000 described with reference to FIG. 3 to FIG. 18. Accordingly, in describing the third example of the present disclosure, overlapping descriptions with the first and second examples may be omitted for convenience of explanation.

A transformer-based generative artificial intelligence model can receive a query and generate a response. For example, a language model can receive a query in text form to obtain an input token, and generate an output token from the input token. Subsequently, the query and the generated output token can be input back into the language model to generate a subsequent next output token. This token generation operation may be repeated several times until the response to the query is complete. A token may correspond to a word or a part of a word. A response may include an output token. The final response generated by the language model for the input query data may include a series of output tokens generated by re-inputting the output tokens generated as part of the response generated by the language model back into the language model.

The larger the number of parameters of a language model, the higher the cost for generating a response from the language model. Therefore, using a language model with a large number of parameters increases the computational cost required to generate a response. Reducing the number of parameters of a language model can lower the computational cost and improve the response speed, but the accuracy of the response may be degraded. That is, there is a trade-off relationship between the number of parameters and accuracy (or quality) of a language model and the time required for a processor to perform the language model's operations. In particular, to generate a response of a certain level of quality or higher, the number of parameters of the language model must be quite large.

Meanwhile, providing a commercial service by processing a language model on the device itself has difficulties when considering the hardware resource limitations of the device (e.g., energy consumption, battery capacity, memory capacity, AI processing capability, etc.).

Accordingly, the third example of the present disclosure describes speculative decoding for driving heterogeneous language models using the limited hardware resources of the device 10000.

Speculative decoding is a technique in which a plurality of language models each perform a prediction, and then the results are combined to generate the most reliable answer. For example, a first language model selects candidates that can come as the next token and calculates a probability representing the suitability for each candidate token. Afterward, a second language model can finally select one of the candidate tokens proposed by the first language model, considering the context. Since the second language model must select one of the candidate tokens reflecting a broader context, it may be a model with a larger number of parameters and better performance than the first language model.

The device 10000 according to the examples of the present disclosure can drive heterogeneous language models based on at least one system on chip 1000. That is, in an on-device method, to accelerate the token generation speed of a language model, speculative decoding can utilize heterogeneous language models. In at least one device 10000, a speculative decoding technique in which heterogeneous language models cooperate with each other to generate a response to an input query can be utilized.

The heterogeneous language models according to the third example of the present disclosure may include a first language model and a second language model. Here, the number of parameters of the first language model is smaller than the number of parameters of the second language model. That is, the number of parameters of the heterogeneous language models is different from each other. A language model with a relatively small number of parameters and a language model with a large number of parameters can be defined as an upper model and a lower model, respectively. That is, the first language model is defined as a lower model of the second language model, and the second language model may be defined as an upper model of the first language model. For example, the number of parameters of the upper model may be 7 billion, and the number of parameters of the lower model may be 1 billion.

The lower model according to the third example of the present disclosure can generate probabilities used for sampling the additional tokens, based on the speculatively generated additional tokens and the currently accepted token set. The upper model according to the third example of the present disclosure generates output tokens using the candidate tokens generated by the lower model. The upper model can accept or reject the candidate tokens by sampling the additional tokens speculatively generated by the lower model. Here, the acceptance or rejection by the upper model can be determined by comparing the probability generated by the upper model corresponding to each token with the probability generated by the lower model corresponding to each token. The candidate token accepted by the upper model is the output token included in the response.

According to the speculative decoding of the third example of the present disclosure, the lower model can generate one or more candidate token sets to generate a response corresponding to the query input to the lower model. A candidate token set is a set including one or more candidate tokens.

TABLE 1

| Candidate Token | Candidate Token Set |
|---|---|
| apple, is, red, banana, yellow, car, fast | set1 : [apple, is, red] set2 : [banana, is, yellow] set3 : [car, is, fast] |

The upper model can accept or reject the corresponding candidate token set by sampling for each of one or more candidate token sets. Here, when the device 10000 samples for each candidate token set, the device 10000 can generate more tokens more quickly than when sampling for each token. In addition, the probability distributions of the lower model and the upper model can also be maintained similarly. Here, the token generation speed may be referred to as tokens per second (TPS).

The speculative decoding according to the third example of the present disclosure may operate in an auto-regressive token generation manner. The auto-regressive token generation method generates a token by re-inputting a series of tokens generated from the lower model back into the lower model. The lower model generates one token for each auto-regression. Therefore, if the lower model performs N inferences, N series of tokens are generated. The lower model generates a conditional probability distribution related to the N series of tokens. Subsequently, the upper model processes the N series of tokens generated from the lower model and the conditional probability distribution related to the N series of tokens to generate a probability distribution of the upper model. Therefore, the upper model can accept or reject the token generated by the lower model by comparing the probability distribution generated by the upper model with the conditional probability distribution generated by the lower model. The upper model can accept a token based on a threshold value. When the similarity between the probability distribution value of the upper model and the conditional probability distribution value of the lower model is equal to or greater than the threshold value, the corresponding token is accepted, and when the similarity is less than the threshold value, the corresponding token may be rejected.

The upper model can accept or reject a series of tokens generated by the lower model based on a threshold value. If a specific token among the series of tokens is rejected, the tokens up to the one before the rejected token become the final output tokens. For example, the lower model of speculative decoding can generate tokens in units of sets. In this case, the upper model can accept or reject for each of a plurality of token sets generated from the lower model. When the lower model generates candidate tokens in units of sets, the acceptance or rejection judgment in the upper model can also be performed in units of sets, which can improve the token generation speed of the speculative decoding of the device 10000. In addition, as the number of token sets generated by the lower model increases, the probability that the upper model will accept a token set may increase.

The lower model generates one or more candidate token sets in response to an input query. Each candidate token set includes a series of tokens, and the lower model can select a series of tokens with a high probability in the probability distribution as a candidate token set. Each candidate token set can be selected in various ways. For example, each candidate token set may be generated by selecting tokens with the highest probability within the probability distribution, but the present disclosure is not limited thereto. In order for the upper model to accept one candidate token set, the probabilities of the tokens included in each candidate token set may be summed. Therefore, the upper model can accept or reject the entire candidate token set based on the summed probability of the candidate token set, not the probability of each token. To elaborate, when using the probability of each token, it may be difficult to match the probability of each token generated from the lower model and the upper model, so the rejection probability of the upper model increases. When using the summed probability of a token set, the matching of the summed probabilities of the token sets generated from the lower model and the upper model may be more similar, so the acceptance probability of the upper model increases.

The lower model can generate one or more candidate token sets in response to an input query. The one or more candidate token sets may be generated statically or dynamically. For example, the sequence length of each candidate token set may be preset. The lower model can generate one or more candidate token sets and generate tree data by combining each candidate token set. The tree data includes a node at each branch point.

FIG. 19 illustrates tree data TD including one or more token sets generated from a lower model, according to an embodiment. Referring to FIG. 19, a first token set S1, a second token set S2, a third token set S3, a fourth token set S4, and a fifth token set S5 are displayed below the leaf nodes of the tree.

The first candidate token set S1 may include four tokens (a, b, c, d). The second candidate token set S2 may include four tokens (a, b, c, e). The third candidate token set S3 may include four tokens (a, f, g, h). The fourth candidate token set S4 may include four tokens (a, f, g, i). The fifth candidate token set S5 may include four tokens (a, f, j, k). Each of the candidate token sets may be selected or rejected by the upper model.

The token length of each candidate token set may be set. For example, the sentence length of each token set may be set to 4. However, the present disclosure is not limited thereto, and the length of the token set may be dynamically changed.

Each token may have an order level. The order level may correspond to the sentence length. To be more specific, a first order level L1 corresponds to the token (a). A second order level L2 corresponds to the tokens (b, f). A third order level L3 corresponds to the tokens (c, g, j). A fourth order level L4 corresponds to the tokens (d, e, h, i, k). In the example where the sentence length is set to 4, the maximum order level is set to 4. The order of the tokens in each token set may be arranged according to the corresponding order level. To be more specific, the first token (a) among the tokens (a, b, c, d) of the first token set S1 corresponds to the first order level L1. The second token (b) among the tokens (a, b, c, d) of the first token set S1 corresponds to the second order level L2. The third token (c) among the tokens (a, b, c, d) of the first token set S1 corresponds to the third order level L3. The fourth token (d) among the tokens (a, b, c, d) of the first token set S1 corresponds to the fourth order level L4.

Each token is defined as a node of the tree data TD. For example, the token (g) may be a branch node of the third token set S3 and the fourth token set S4 at the third order level L3. Each node includes branch information.

That is, the tree data TD generated by the lower model may include all or at least a part of one or more token sets S1 to S5, order levels L1 to L4, node information of each token (a, b, c, d, e, f, g, h, i, j, k), and the selection probability of each candidate token set (e.g., the summed probability of the token set). The upper model can accept or reject at least one token of the tree data TD.

Speculative decoding may also be implemented as hybrid speculative decoding. Hybrid speculative decoding may set a threshold value a that determines whether a token is approved or rejected by comparing the probability distributions of the lower model and the upper model, after the previously speculatively generated token is verified by the upper model.

Speculative decoding may also be implemented as group speculative decoding. Group speculative decoding is configured to generate several tokens in a group unit from the lower model and have them verified by the upper model, and can provide a high level of efficiency.

Figure 20:
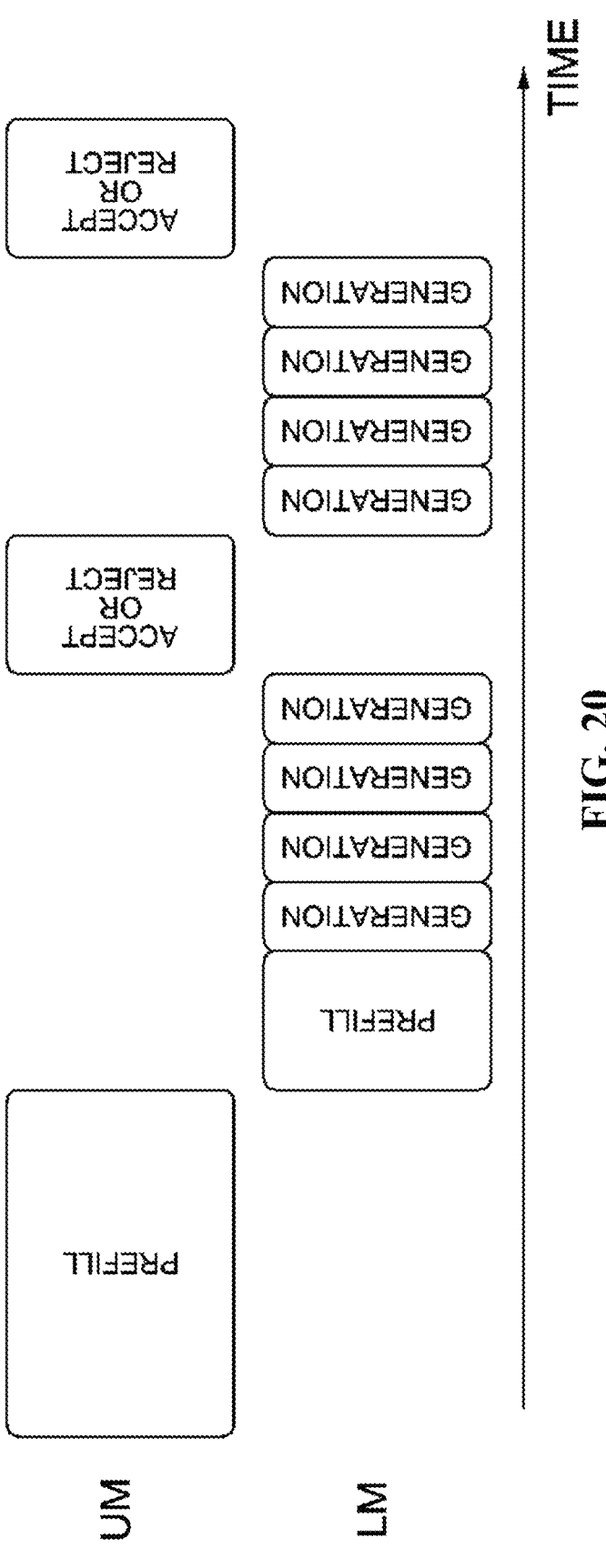
FIG. 20 is a diagram schematically illustrating a speculative decoding operation according to the third example of the present disclosure.

FIG. 20 schematically illustrates a speculative decoding operation according to a third example of the present disclosure.

Referring to FIG. 20, a lower model LM and an upper model UM are shown. The device 10000 according to the third example of the present disclosure may be configured to sequentially process the lower model LM and the upper model UM for speculative decoding.

A transformer-based artificial intelligence model can perform predetermined operation steps (e.g., a prefill step and a generation step) to generate a response to an input query. A transformer is an artificial intelligence model based on an attention mechanism. A transformer utilizes a large number of matrix multiplication operations. A transformer can obtain an attention score (Q, K, V), which is an output value, using an input value and parameters such as a query (Q), a key (K), and a value (V). A transformer can process various inference operations based on the output value (i.e., attention (Q, K, V)). A transformer is actively utilized in generative language models.

A tensor refers to a multi-dimensional matrix parameter processed in an artificial intelligence model (e.g., an artificial neural network). A tensor may refer to various neural network model parameters such as weights, input parameters, output parameters, and attention parameters.

The prefill step is an initial step of processing and interpreting an input (e.g., a prompt input by a user). The prefill step may include a tokenization step, a context embedding step, a processing step through layers, and a preparation step for decoding. The prefill step may be processed by one or more neural processing units. In the tokenization step, the input text is converted into tokens (sub-words, words, or characters), which are numerical representations used in the artificial intelligence model. In the context embedding step, the tokens can be mapped to a high-density embedding vector that encodes semantic and syntactic information. In the prefill step, the embeddings are processed through several layers of the neural network model (e.g., transformer blocks) to generate a contextual representation of the input tokens. In the preparation step for decoding, the artificial intelligence model calculates the probability for each entire token that can be the next output token based on the input context, but does not yet finally generate the next token. Instead, it can set the context for the generation step.

In the generation step, one or more neural processing units can sequentially generate one or more output tokens based on the context provided by the artificial intelligence model in the prefill step and the previously generated output tokens. The generation step includes an initial prediction step, an auto-regressive processing step, and a stopping condition. The generation step may be processed by one or a plurality of neural processing units. In the initial prediction step, the first token is generated by sampling from the probability distribution calculated in the prefill step. In the autoregressive processing step, each subsequent token is generated by integrating the previous token (including the generated token) into the context of the neural network model. The generation process continues until a stopping condition is met, such as reaching a maximum token limit, encountering a special end of sequence (EOS) token, or achieving a specific semantic goal. The series of tokens generated in the generation step may correspond to the tree data TD of FIG. 19. The tree data may include at least one token set.

Referring again to FIG. 20, a third example illustrating the steps of speculative decoding over time is shown. The speculative decoding according to the examples of the present disclosure may be processed sequentially or in parallel by one or more neural processing units. In speculative decoding, the upper model UM and the lower model LM cooperate with each other to generate a response to an input query. The longer the horizontal length of the block representing each step, the more processing time is required.

To be more specific, in speculative decoding, the upper model UM first performs a prefill operation. Subsequently, the lower model LM performs a prefill operation. Subsequently, the lower model LM continuously performs generation steps, and each token is generated in each generation step. Next, the upper model UM accepts or rejects the tokens generated from the lower model LM. The upper model UM can accept or reject some or all of the tokens generated from the lower model LM. The lower model LM receives the accepted tokens as an input query again, and the lower model LM continuously performs generation steps to generate each token corresponding to each generation step. Next, the upper model UM accepts or rejects the tokens generated from the lower model LM. These steps are repeated until a stopping condition is met.

The number of parameters of the upper model UM is larger than the number of parameters of the lower model LM, so the processing time is longer. Therefore, the processing time of the prefill step of the upper model UM is longer than the processing time of the prefill step of the lower model LM. The processing time of the acceptance or rejection step of the upper model UM is longer than the processing time of the generation step of the lower model LM. Therefore, in generating a token to generate a response, the token generation speed of the system can be improved by configuring the lower model to generate as many tokens as possible and the upper model to perform only selective judgment.

The number of parameters of each of the lower model LM and the upper model UM can be determined considering the hardware resource limitations of the device 10000 (e.g., the processing performance of the system on chip SoC and the bandwidth of the memory MEM). The upper model UM can utilize a language model in which the number of parameters is determined considering the hardware resource limitations of the device being processed.

In some examples, the lower model LM may be a model obtained by pruning the parameters of the upper model UM. In this case, the parameters of the pruned neural network model can be lightweight, and the required memory bandwidth may be smaller than that of the upper model UM.

According to the third example of the present disclosure, the device 10000 may be configured to process a prefill operation using the upper model UM to process speculative decoding. Subsequently, the device 10000 may process a prefill operation and a generation operation using the lower model LM to process speculative decoding.

The device 10000 according to the third example of the present disclosure may include at least one interface (not shown). The interface can input and/or output data. The device 10000 can receive an input query through the interface (not shown). The interface may be an electronic circuit capable of receiving an input query such as a prompt, a gesture, a voice, or the like. The input and/or output interface may include, for example, a mouse, a keyboard, a touch pad, a touch screen, a microphone, a wireless communication device, a wired communication device, a camera, a speaker, and the like.

The system on chip SoC of the device 10000 according to the third example of the present disclosure can perform inference operations on the upper model UM and the lower model LM. The upper model UM and the lower model LM can cooperate with each other to process speculative decoding. The neural processing unit NPU of the system on chip SoC of the device 10000 according to the third example of the present disclosure can process the upper model UM and the lower model LM alternately. That is, the neural processing unit NPU operates to sequentially process the upper model UM and the lower model LM. In other words, the neural processing unit NPU operates to process the upper model UM and the lower model LM in a time-division manner. Therefore, the upper model UM and the lower model LM can be sequentially processed while increasing the utilization rate of the arithmetic circuits of the neural processing unit NPU.

According to the disclosed embodiment, speculative decoding is performed by sequentially processing the upper model UM and the lower model LM in the neural processing unit NPU of the device 10000, and the bottleneck phenomenon due to the speculative decoding operation can be reduced by having the parameters of the upper model UM and the lower model LM reside in the memory MEM.

The memory MEM of the device 10000 according to the third example of the present disclosure is configured to store all the weight parameters of the upper model UM and the lower model LM when the device 10000 operates. By storing both the first weight parameters of the upper model UM and the second weight parameters of the lower model LM in the memory MEM, the device 10000 can efficiently process speculative decoding. The memory MEM of the device 10000 according to the third example of the present disclosure can provide the parameters of the upper model UM to the neural processing unit NPU when the neural processing unit NPU infers the upper model UM, and can provide the parameters of the lower model LM to the neural processing unit NPU when it infers the lower model LM.

For example, during the speculative decoding operation, the device 10000 can set the address map of the memory MEM to allocate a memory bank where the weight parameters of the upper model UM and the lower model LM will be stored. Therefore, during the speculative decoding operation, the weight parameters of both the upper model UM and the lower model LM can reside in the memory MEM. That is, the capacity of the memory MEM of the device 10000 according to the third example of the present disclosure may be larger than the total capacity occupied by the first weight parameters of the upper model UM and the second weight parameters of the lower model LM. If the memory MEM of the device 10000 does not have the memory capacity to store the upper model UM and the lower model LM, it may be difficult to quickly process speculative decoding in real time. That is, the capacity of the memory MEM can be determined considering the size of the parameters of the upper model UM and the lower model LM to be driven on the device

10000. If not all the parameters of the upper model UM and the lower model LM are stored in the memory MEM, a conventional device must read the weight parameters of each model from an external storage device for speculative decoding. In this embodiment, the conventional device must command unnecessary memory read and memory write operations for speculative decoding, so the token generation speed may be lower than the token generation speed of the device 10000 according to the third example of the present disclosure.

The first memory MEM1 of the device 10000 according to the second embodiment of the first example of the present disclosure is configured to store the weight parameters of the upper model UM and the tokens generated from the upper model UM when the device 10000 operates.

The second memory MEM2 of the device 10000 according to the second embodiment of the first example of the present disclosure is configured to store the weight parameters of the lower model LM and the tokens generated from the lower model when the device 10000 operates. If all the weight parameters of the upper model UM and the lower model LM are stored in the first memory MEM1 and the second memory MEM2, the device 10000 can efficiently process speculative decoding. To elaborate, the size of the weight parameters of the upper model UM and the lower model LM can be quite large, and it may be difficult to store them all in a single memory chip. In this case, the device 10000 can increase the memory capacity by configuring a plurality of memories.

The first memory MEM1 of the device 10000 according to the second embodiment of the first example of the present disclosure is configured to provide the parameters of the upper model UM to the neural processing unit NPU when the neural processing unit NPU infers the upper model UM, and the second memory MEM2 is configured to provide the parameters of the lower model LM to the neural processing unit NPU when it infers the lower model LM.

For example, during the speculative decoding operation, the device 10000 can set the address map of each of the first memory MEM1 and the second memory MEM2 to allocate a memory bank where the weight parameters of the upper model UM and the lower model LM will be stored. Therefore, during the speculative decoding operation, the weight parameters of both the upper model UM and the lower model LM can reside in the first memory MEM1 and the second memory MEM2.

Accordingly, the capacity of the plurality of memories (MEM1, MEM2) of the device 10000 according to the second embodiment of the first example of the present disclosure is configured to be larger than the total capacity occupied by the weight parameters of the upper model UM and the lower model LM. Therefore, the weight parameters of the upper model UM and the lower model LM can reside in the plurality of memories (MEM1, MEM2). If the capacity of the plurality of memories (MEM1, MME2) of the device 10000 is insufficient for the upper model UM and the lower model LM, it may be difficult to efficiently process speculative decoding.

If not all the parameters of the upper model UM and the lower model LM are stored in the plurality of memories (MEM1, MEM2), a conventional device must read the weight parameters of each model from an external storage device for speculative decoding. Accordingly, the conventional device commands unnecessary memory read and memory write operations for speculative decoding. Accordingly, the token generation speed of the conventional device is lower than the token generation speed of the device 10000 according to the second embodiment of the first example of the present disclosure.

In summary, FIG. 19 and FIG. 20 explain the speculative decoding according to the third example of the present disclosure. The speculative decoding method according to the third example of the present disclosure may be performed in the device 10000 described with reference to FIG. 3 to FIG. 18. To support such efficient on-device speculative decoding, the device 10000 according to the present disclosure can lay the foundation through the following improved hardware architecture and system configuration.

That is, the device 10000 according to the present disclosure includes a low-power NPU (e.g., neural processing unit, see 100 in FIG. 3) core architecture, and the low-power NPU core architecture has a separate structure of an integer operation-centric processing core (see the P_CORE 120 in FIG. 3) and a special function unit (see the SFU 150 in FIG. 3) for floating-point operations and complex function processing. The special function unit (SFU) 150 is configured to include dedicated hardware accelerators (e.g., NEXP (see FIG. 30), RECIP (see FIG. 28) circuits included in the vector function approximation unit (V_FuncApx, see 1537 in FIG. 5) or the scalar function approximation unit (S_FuncApx, see 1545 in FIG. 6)) for functions, such as Exponential and Reciprocal, which are beneficial for Softmax and attention operations, and a programmable function approximation PAF unit (e.g., the function approximation circuit included in the function approximation unit (see FIG. 24, FIG. 25)) that supports various activation functions.

Accordingly, the device 10000 includes a large-capacity on-device memory system, and the memory system includes a main memory (e.g., external DRAM, see 2000 in FIG. 9 or 2000-1-2000-N in FIG. 10) of sufficient capacity to store the entire weights of the LLM and the weights of an auxiliary model that can be used for Speculative Decoding, and an on-chip shared memory (e.g., SRAM, see 400 in FIG. 11 or 400-1-400-N in FIG. 12) of sufficient capacity for high-speed access and reuse of frequently used weights and intermediate activation values. Accordingly, the memory system may have a hierarchical structure.

Therefore, NPU acceleration-based speculative decoding can be effectively implemented through the improved hardware configuration of this NPU core and memory system. According to the above-described configuration, it is not a simple sum of individual technologies, but the improved NPU core is organically combined with a large-capacity memory system (e.g., 2000, 400) and a speculative decoding algorithm, providing a synergistic effect that enables the execution of large-scale language models, which previously required server-level computing power, in a completely on-device form without response delay while reducing energy consumption. This enables the implementation of a practical server-independent AI agent.

In summary, a low-power on-device large language model (LLM) inference system according to the present disclosure can achieve the above effects by including the following components: the processing core 120 that performs integer-based matrix operations on input data; the special function unit (SFU) 150 that performs special operations based on floating-point (including exponential, reciprocal, and programmable function approximation) on the integer operation result, wherein the special operations are improved for attention and activation function processing of the LLM; the main memory 2000 that stores the entire weights of the LLM and the weights of at least one auxiliary model for speculative decoding; the on-chip shared memory 400 that temporarily stores data frequently accessed by the processing core 120 or the SFU 150 to increase data reusability; and a controller (e.g., the controller 110 in the NPU 100 or a system-level controller including it) that controls the processing core 120, the SFU 150, the main memory 2000, and the on-chip shared memory 400 to perform a speculative decoding operation including candidate token generation using the auxiliary model and candidate token verification using the LLM. Through this system configuration, it is possible to complete the inference of the LLM with low power without the help of an external server.

Hereinafter, a fourth example of the present disclosure will be described. The fourth example of the present disclosure describes the circuit configuration and operating method of the vector function approximation unit V_FuncApx and the scalar function approximation unit S_FuncApx shown in FIG. 5 and FIG. 6.

Figure 21:
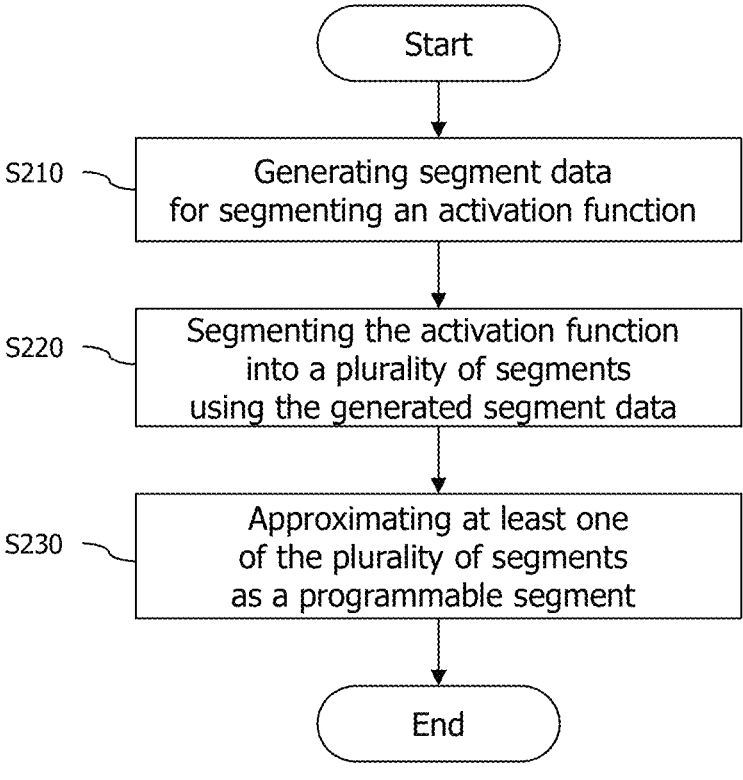
FIG. 21 is a flowchart illustrating an activation function programming method according to a first embodiment of a fourth example of the present disclosure.

FIG. 21 is a flowchart illustrating an activation function programming method according to a first embodiment of a fourth example of the present disclosure.

Referring to FIG. 21, the operation of the vector function approximation unit 1537 and the scalar function approximation unit 1545 will be described. The vector function approximation unit 1537 and the scalar function approximation unit 1545 are configured to process a programmed activation function to be described later.

In a neural network model, whether elements of outputs from a layer of the neural network model are activated may be determined according to the strengths of the output elements generated by an activation function in the corresponding layer. The inference accuracy of a neural network model may vary depending on the activation function implemented in the neural processing unit 100 according to the fourth example of the present disclosure. That is, the inference accuracy and efficiency of a neural network model may vary depending on the hardware implementation characteristics of the processing circuit of the activation function of the neural processing unit 100.

Accordingly, the activation function programming method according to the first embodiment of the fourth example of the present disclosure includes a step of generating segment data for segmenting an activation function, as illustrated in operation S210, a step of segmenting the activation function into a plurality of segments using the generated segment data, as illustrated in operation S220, and a step of approximating at least one of the plurality of segments as a programmable segment, as illustrated in operation S230.

The activation function programming method may be performed by an activation function conversion program (not shown). The activation function conversion program (not shown) may be a computer program, software, firmware, an application, or an execution code stored in a recording medium. The activation function conversion program (not shown) may be a computer program configured to perform a command to convert an activation function into a programmed activation function expressed as programmable parameters (i.e., operation coefficients). The activation function conversion program (not shown) may be stored in a computer-readable recording medium. The activation function conversion program (not shown) may be included in a compiler (not shown).

In operation S210, segment data is generated. The segment data is data generated to segment a specific activation function into a plurality of segments. The segment data will be described later.

In operation S220, the activation function is segmented into a plurality of segments using the generated segment data. In the present disclosure, the term 'segment' refers to a part of an activation function divided into a plurality of sections, and is distinguished from 'candidate segment' or 'programmable segment', which are terms related to the approximation of an activation function.

The operation S220 may include a step of determining the number and width of the plurality of segments based on the segment data. In operation S220, the number of a plurality of segments for segmenting the activation function to be converted and the width of each of the plurality of segments can be determined using the segment data. At least one of the plurality of segments may have the same or a different width as another segment.

The section of the plurality of segments may also be expressed by the coordinates of the start point and end point of the X-axis. On the other hand, if the number of the plurality of segments and the width of each of the plurality of segments are determined, the coordinates of the section of the plurality of segments can be obtained using the number and width of the plurality of segments.

In operation S230, at least one of the plurality of segments is approximated as a programmable segment. The programmable segment can be programmed according to the circuit design of the vector function approximation unit 1537 and the scalar function approximation unit 1545. That is, the activation function conversion program (not shown) may program the activation function of the neural processing unit 100 based on the hardware configuration of the vector function approximation unit 1537 and the scalar function approximation unit 1545. Programmable parameters may be data generated in step S230. The programmable parameters may have a form compatible with the circuits of the vector function approximation unit 1537 and the scalar function approximation unit 1545 of the neural processing unit 100. For example, each of the vector function approximation unit 1537 and the scalar function approximation unit 1545 may have hardware configured to operate each programmable segment with a specific slope and a specific offset. The activation function conversion program (not shown) may be provided with the configuration information of the vector function approximation unit 1537 and the scalar function approximation unit 1545.

The activation function conversion program (not shown) can program the programmable segment to represent a linear function having a slope and an offset as its parameters, or a quadratic function of a higher degree than the linear function. For example, the programmable segment may be approximated as a linear function according to a specific determination criterion. In this case, the activation function conversion program (not shown) can generate a programmable segment expressed in the form of "(slope a)*(input value x)+(offset b)." The specific slope and specific offset mentioned above may be programmable parameters. In the case of a programmable segment determined to be approximated by a linear function, the operation S230 may include a step of approximating the one selected segment with a specific slope and a specific offset value.

The operations S220 and S230 may be performed as a single step. This is because the step of segmenting a segment and the step of generating a programmable parameter of the corresponding programmable segment can be performed simultaneously. To elaborate, the operations S220 and step S230 may be modified into a step of segmenting an activation function into a plurality of segments using the generated segment data, and approximating at least one of the plurality of segments as a programmable segment.

Meanwhile, the activation function programming method, particularly the process of generating desirable segment data (e.g., the boundary value and width of a segment) and deriving corresponding programmable parameters to approximate each segment, may be performed in a systematic and automated manner by replacing it with a deep learning model's learning problem, according to another embodiment of the present disclosure.

Conventionally, the process of finding desirable approximation parameters relied on empirical or complex numerical analysis, making it difficult to guarantee desirable approximations for all nonlinear functions. However, the present disclosure utilizes a small-scale artificial neural network that represents a piecewise linear function. Through this artificial neural network, learning can be conducted to better imitate the target activation function to be approximated.

Figure 23:
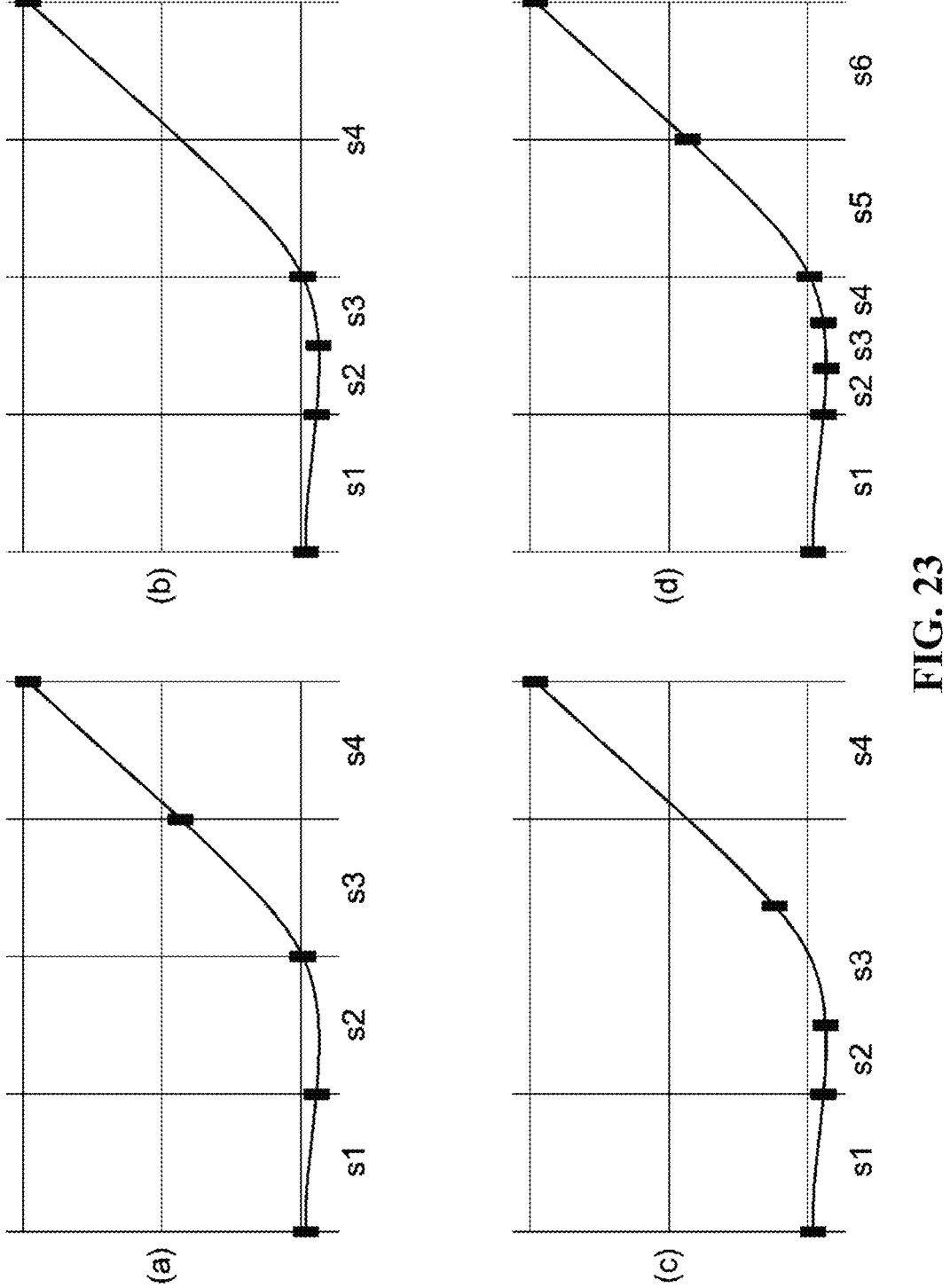
FIG. 23 is a graph illustrating various cases of segmenting an activation function into a plurality of segments by the activation function programming method according to the first embodiment of the fourth example of the present disclosure.

During the learning process, the artificial neural network updates its internal weights and biases in an iterative manner to reduce a loss function, and in this process, the optimal division points (inflection points) that better represent the nonlinear characteristics of the target function and the linear relationship of each section are automatically determined. Once learning is complete, a set of programmable parameters, including segment boundary values SB, the slope A and offset B of each segment, etc., in a form suitable for use by the programmable function approximation circuit PAF, may be extracted from the parameters of the updated artificial neural network. Through this deep learning-based approach, desirable segmentation with the segments of various widths and a preferred number of segments may be obtained according to the characteristics of the function, as shown in FIG. 23. In this way, more accurate approximation parameters may be obtained.

Figure 22:
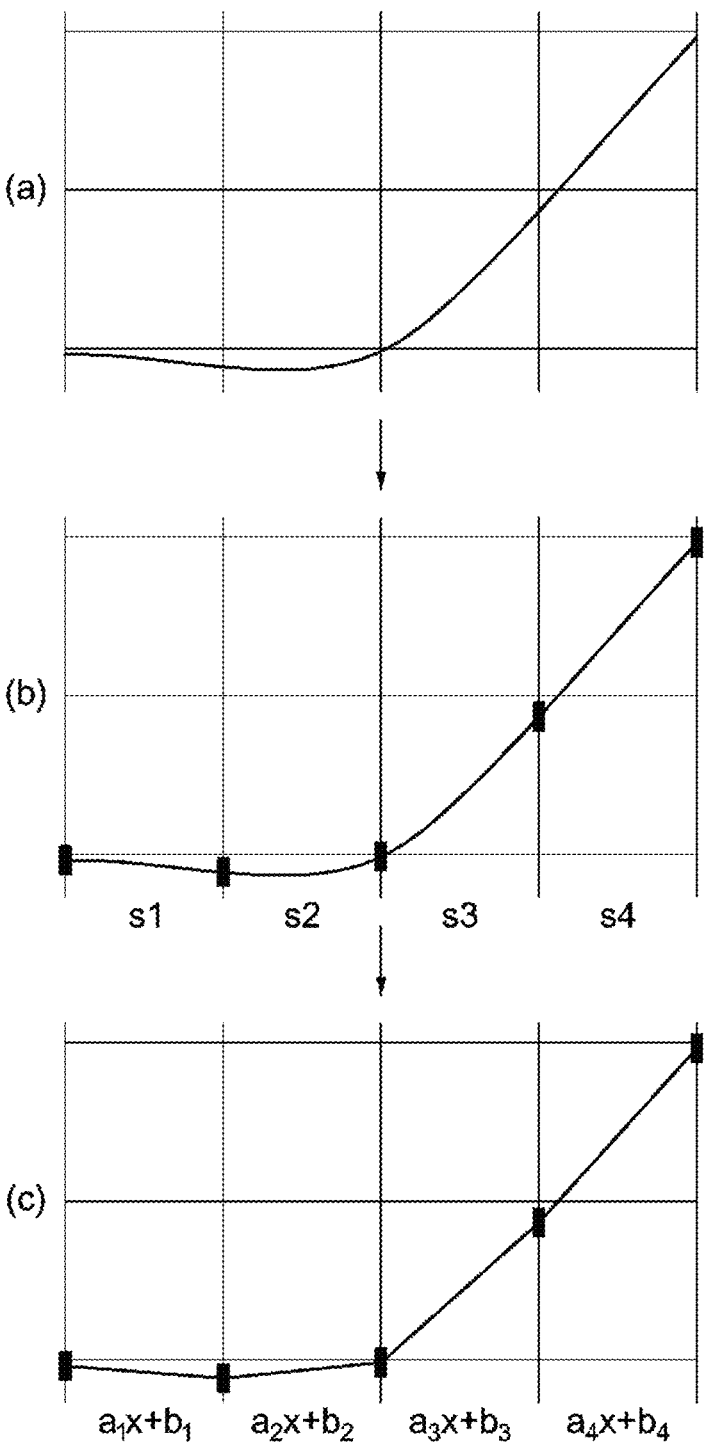
FIG. 22 is a graph illustrating a process in which an activation function is approximated by the activation function programming method according to the first embodiment of the fourth example of the present disclosure.

FIG. 22 is a graph illustrating a process in which an activation function is approximated by the activation function programming method according to the first embodiment of the fourth example of the present disclosure.

The activation function shown in (a) of FIG. 22 is segmented into a plurality of segments s1, s2, s3, and s4 using segment data, as shown in (b) of FIG. 22. The plurality of segments s1, s2, s3, and s4 are approximated as programmable segments $a1x+b1$, $a2x+b2$, $a3x+b3$, and $a4x+b4$, as shown in (c) of FIG. 22. An example is described in which the activation function conversion program (not shown) generates programmable parameters so that all programmable segments correspond to a linear function.

Each programmable segment includes a corresponding programmable parameter. In (c) of FIG. 22, all of the plurality of segments are approximated as programmable segments in the form of a linear function. However, in various examples, some of the plurality of segments may be approximated as programmable segments of other forms. For example, the activation function conversion program (not shown) can program each programmable segment in the form of a linear function, a quadratic function, a cubic function, a logarithmic function, or the like.

For example, only the segments s1, s3, and s4 may be approximated as programmable segments, and the segment s2 may be approximated using various methods available in the device where the activation function will be processed. Specifically, if a lookup table, a nonlinear approximation formula, etc., predetermined and stored in the section of the segment s2 are available in the hardware, the segment s2 can be approximated using such a predetermined and stored lookup table, a nonlinear approximation formula, or the like.

In other words, the activation function conversion program (not shown) may be configured to program each of the segments s1, s2, s3, and s4 independently. The activation function conversion program (not shown) may be provided with the hardware configuration information of the vector function approximation unit 1537 and the scalar function approximation unit 1545. The activation function conversion program (not shown) may be configured to independently determine the approximation method for each of the segments s1, s2, s3, and s4 based on the hardware configuration information of the vector function approximation unit 1537 and the scalar function approximation unit 1545.

For example, each of the vector function approximation unit 1537 and the scalar function approximation unit 1545 may be designed to include at least one of a linear function approximation circuit, a quadratic function approximation circuit, a reciprocal function approximation circuit, a root mean square function approximation circuit, and a negative exponential function approximation circuit. In this case, the activation function conversion program (not shown) can selectively program at least one of each of the segments s1, s2, s3, and s4 into the form of a linear function, a quadratic function, a reciprocal function, a root mean square function, and a negative exponential function.

For example, if each of the vector function approximation unit 1537 and the scalar function approximation unit 1545 is configured to include a circuit configured to support at least one specific function operation, the activation function conversion program (not shown) can program each of the segments s1, s2, s3, and s4 into the form of a corresponding specific function.

For example, the vector function approximation unit 1537 and the scalar function approximation unit 1545 may be configured to include at least one of a linear function operation circuit, a quadratic function operation circuit, a reciprocal function operation circuit, a root mean square function operation circuit, and a negative exponential function operation circuit, or a similar function operation circuit designed in hardware.

For example, the activation function conversion program (not shown) can program the same activation function in different ways.

For example, the activation function conversion program (not shown) can program a specific activation function only as a linear function.

For example, the activation function conversion program (not shown) can program a specific activation function only as a quadratic function.

For example, the activation function conversion program (not shown) can program a specific activation function only as a reciprocal function.

For example, the activation function conversion program (not shown) can program a specific activation function only as a root mean square function.

For example, the activation function conversion program (not shown) can program a specific activation function only as a negative exponential function.

For example, the activation function conversion program (not shown) can program each of a plurality of segments of a specific activation function as a corresponding approximation function.

For example, the activation function conversion program (not shown) can program a plurality of segments of a specific activation function as a set of approximation functions of different formulas.

For example, the activation function programmed to be processed in the vector function approximation unit 1537 and the scalar function approximation unit 1545 according to the first embodiment of the fourth example of the present disclosure may include Swish, Mish, Sigmoid, Hyperbolic Tangent (Tanh), Scaled Exponential Linear Unit (SELU), Gaussian Error Linear Unit (GELU), Softplus, Rectified Linear Unit (ReLU), Leaky ReLU, Maxout, Exponential Linear Unit (ELU), Hard Sigmoid, Hard Tanh, Bent Identity, ArcTan, Softsign, Sinusoidal Activation, S-shaped Rectified Linear Unit (SReLU), Parametric Rectified Linear Unit (PReLU), Logistic Activation, Radial Basis Function (RBF), Binary Step, Reciprocal, Root mean square, or Negative exponential. Each programmed activation function can be converted into a programmable parameter and provided to the neural processing unit 100.

FIG. 23 is a graph illustrating various cases of segmenting an activation function into a plurality of segments by the activation function programming method according to the first embodiment of the fourth example of the present disclosure.

Referring to (a) of FIG. 23, a specific activation function may be segmented to have four segments and a uniform width.

Referring to (b) of FIG. 23, a specific activation function may be segmented to have four segments and different widths.

Referring to (c) of FIG. 23, a specific activation function may be segmented to have four segments and different widths.

Referring to (d) of FIG. 23, a specific activation function may be segmented to have six segments and different widths.

The number of the plurality of segments and the width of each of the plurality of segments can be determined using the segment data.

The activation function conversion program (not shown) may be configured to analyze the nonlinearity of the activation function and segment the plurality of segments with different widths. However, the present disclosure is not limited thereto.

The activation function conversion program (not shown) may be configured to analyze the nonlinearity of the activation function and segment each of the plurality of segments with an optimal width. However, the present disclosure is not limited thereto.

In the present disclosure, an activation function may be implemented in various forms including characteristic sections. When segmenting an activation function into a plurality of segments, the number and width of the plurality of segments can be determined in various ways according to the various forms that the activation function has.

For example, various activation functions, such as a swish function, a Mish function, a sigmoid function, a hyperbolic tangent (tanh) function, an SELU function, a Gaussian Error Linear Unit (GELU) function, a SOFTPLUS function, a ReLU function, a Leaky ReLU function, a Maxout function, an ELU function, and the like, have various forms that are divided into a plurality of characteristic sections including a (substantially) linear section and/or a nonlinear section. Accordingly, when approximating a nonlinear activation function to be processable in hardware, if segmentation is performed considering these characteristic sections, that is, if the number and width of the segments are determined considering the (substantially) linear section, the nonlinear section, etc., the activation function can be more efficiently approximated corresponding to the characteristics of each activation function.

Figure 24:
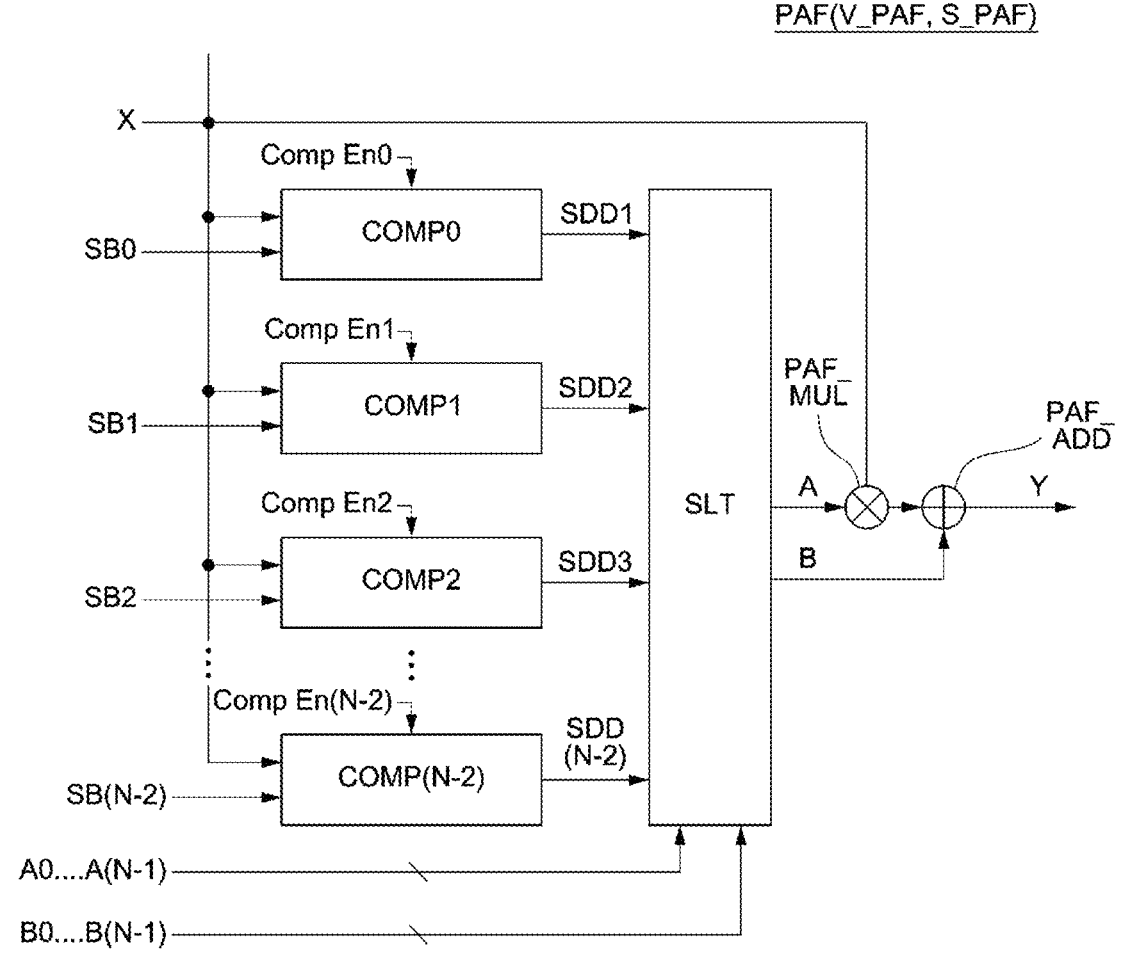
FIG. 24 is a diagram illustrating a function approximation circuit of a neural processing unit configured to process a programmed activation function according to a second embodiment of the fourth example of the present disclosure.

FIG. 24 is a diagram illustrating a function approximation circuit of a neural processing unit configured to process a programmed activation function according to a second embodiment of the fourth example of the present disclosure.

The programmable function approximation circuit PAF according to the second embodiment of the fourth example of the present disclosure shown in FIG. 24 may correspond to the vector function approximation circuit V_PAF of the vector function approximation unit 1537 of FIG. 5 and the scalar function approximation circuit S_PAF of the scalar function approximation unit 1545 of FIG. 6. For convenience of explanation, the vector function approximation circuit V_PAF and the scalar function approximation circuit S_PAF are collectively referred to as the programmable function approximation circuit PAF to describe the second embodiment of the fourth example of the present disclosure.

Specifically, the programmable function approximation circuit PAF according to the second embodiment of the fourth example of the present disclosure shown in FIG. 24 is an example of a circuit configured to process an activation function programmed as a linear function.

The programmable function approximation circuit PAF configured to process an activation function programmed as a linear function may be configured to include a plurality of comparators (COMP0 to COMP(N−2)), a selector SLT, a multiplier PAF_MUL, and an adder PAF_ADD. However, the present disclosure is not limited thereto, and it is also possible to configure the circuit in various ways to distinguish the regions of each segment. It is also possible for the programmable function approximation circuit PAF to be modified to further include an additional circuit configuration to process an activation function by a programming method other than a linear function.

The coordinates of the start and end points of the sections of the plurality of segments are defined as segment boundary values SB. That is, by the segment boundary values (SB0 to SB(N−2)), the sections of the plurality of segments can be respectively determined. For example, to define the sections of N segments, N−1 segment boundary values (SB0 to SB(N−2)) may be used.

Each of the plurality of comparators (COMP0 to COMP(N−2)) compares an input value X with each of the plurality of segment boundary values (SB0 to SB(N−2)). Accordingly, through the comparison value output from each of the plurality of comparators (COMP0 to COMP(N−2)), the section of the segment to which the input value X among the sections of the plurality of segments can be determined. The output value output from each of the plurality of comparators (COMP0 to COMP(N−2)) described above may be referred to as section determination data SDD. The selector SLT outputs a slope A for the programmable segment corresponding to the section of the segment to which the input value X belongs among a plurality of slopes (AG to A(N−1)) for the plurality of programmable segments, according to the section determination data (SDD0 to SDD(N−2)). The selector SLT outputs an offset B for the programmable segment corresponding to the section of the segment to which the input value X belongs among a plurality of offsets (B0 to B(N−1)) for the plurality of programmable segments, according to the section determination data (SDD0 to SDD(N−2)).

When a specific segment is determined based on the section determination data SDD, the slope A and offset B of the determined segment can be output from the selector SLT. That is, the programmable parameter includes a slope A and an offset B for each of the programmable segments. The slope A is multiplied by the input value X in the multiplier PAF_MUL, and the offset B is added to the output value of the multiplier PAF_MUL in the adder PAF_ADD. That is, the output of the multiplier PAF_MUL can be expressed as A×X, and the output of the adder PAF_ADD can be expressed as A×X+B.

Meanwhile, the operation status of each of the plurality of comparators (COMP0 to COMP(N−2)) can be determined by each of a plurality of comparator enable signals (Comp En 1 to Comp En (N−2)). For example, even when the activation function conversion program (not shown) programs the same activation function, a first programmed activation function may be programmed to have 10 segments, and a second programmed activation function may be programmed to have 5 segments. Therefore, the programmable function approximation circuit PAF can control the number of comparators activated in the programmable function approximation circuit PAF differently according to each programmed activation function data, even for the same activation function. Therefore, the accuracy of the artificial neural network operation and the power consumption of the neural processing unit 100 can also vary depending on the programming. That is, it is also possible to provide a high-performance activation function operation function or a low-power activation function operation function, even for the same activation function, according to the user's requirements.

Meanwhile, depending on the maximum number of segment boundary values SB, the number of a plurality of comparators that receive them as input must also vary. For example, if the maximum number of segment boundary values SB is 10, at least 10 or more comparators may need to be provided. That is, the minimum number of comparators may be the maximum number of segment boundary values.

Accordingly, each of the plurality of comparators (COMP0 to COMP(N−2)) can determine its operation status by each of a plurality of comparator enable signals (Comp En 1 to Comp En (N−2)). Therefore, the power consumption of the neural processing unit 100 can be reduced by controlling the operation of unnecessary comparators according to the number of a plurality of segments. However, due to hardware limitations, the number of comparators may be limited. Accordingly, the number of a plurality of segments for segmenting an activation function may be limited according to the number of comparators of the programmable function approximation circuit PAF.

Meanwhile, according to the first embodiment of the fourth example of the present disclosure, it is possible to distinguish between the linear section and the nonlinear section of an activation function, and it is possible to reduce the number of segments by providing a variable segment width while reducing the error value. Therefore, there is an advantage of being able to reduce the number of gates counts of the hardware of the programmable function approximation circuit PAF of the neural processing unit 100 by reducing the number of comparators.

In addition, the activation function programming method according to the first embodiment of the fourth example of the present disclosure may be configured to program a specific activation function based on the information of the maximum number of supportable comparators.

Meanwhile, the selector SLT may be a multiplexer composed of a plurality of switching elements, but the configuration of the selector SLT may be variously changed. The programmed activation function operation unit of the programmable function approximation circuit PAF may refer to a circuit unit configured to operate on an output value Y by receiving an input value X, a slope A, and an offset B. The programmed activation function operation unit of the programmable function approximation circuit PAF may be configured to include at least one multiplier PAF_MUL and an adder PAF_ADD. The programmed activation function operation unit of the programmable function approximation circuit PAF may be a hard-wired circuit. In particular, if the programmable function approximation circuit PAF is a hard-wired circuit, the programmable function approximation circuit PAF can process the approximation operation on a clock-by-clock basis by simply inputting the programmable parameters without complex instructions.

Meanwhile, the configuration in which the programmable function approximation circuit PAF according to the present disclosure stores programmable parameters (A, B, C, etc.) and uses them through the selector SLT may appear similar to the conventional lookup table (LUT) method.

However, the parameter storage and utilization method of the present disclosure has the following differences from the conventional LUT method in its technical idea and operating principle.

First, the nature of the stored data is different. A conventional LUT stores the 'final approximation result value' or 'representative value for interpolation' for a specific input section. This is a passive data table for the purpose of looking up and retrieving a pre-calculated result value according to an input address. On the other hand, the programmable parameter stored in the present disclosure is not a result value, but a 'coefficient' (i.e., a programmable parameter) for controlling a hard-wired operation unit in real time.

Second, the role and operation method of the data are different. The conventional LUT method is a 'lookup-centric' operation that reads a value from memory. In contrast, the present disclosure is a 'computation-centric' architecture that directly performs a polynomial operation such as Ax+B by supplying the operation coefficients selected through the selector SLT to a 'Direct Computation Engine' composed of a multiplier (PAF_MUL) and an adder PAF_ADD in real time. That is, the parameter storage unit of the present disclosure functions as an active 'Coefficient Register File' that dynamically configures the operation circuit, which is one of the core technical features of the present disclosure that is distinguished from the conventional LUT.

In particular, the programmable parameters (A0 . . . A(N−1), B0 . . . B(N−1), etc.) have an important technical feature in that they are constant values pre-generated off-line through the deep learning-based improvement method described above.

That is, these parameters, which are finally determined through learning, are not changed at the runtime when the neural processing unit NPU performs the actual inference operation, and are pre-stored in a designated memory or a coefficient register in the programmable function approximation circuit PAF. Therefore, when performing an operation, the NPU immediately loads and processes these pre-determined constant values without a complex calculation process, thereby eliminating additional operation overhead and maximizing the speed of the function approximation operation.

In addition, the function approximation unit FuncApx of the present disclosure has a structure that can reuse one programmable function approximation circuit PAF for the approximation of several different types of dedicated functions (e.g., reciprocal, square root reciprocal, negative exponential, etc.). The effect of this structure can be maximized when combined with the learning-based parameter generation method. The hardware is equipped with only a single area-efficient programmable function approximation circuit PAF, and by selectively loading and using a pre-learned optimal constant parameter set (i.e., a programmable parameter set) according to the function to be processed, it eliminates the inefficiency of designing a separate approximation circuit for each function and increases the utilization of hardware resources while securing high accuracy and flexibility at the same time.

Meanwhile, the means for storing the programmable parameters (slope A, offset B, etc.) used by the PAF circuit of the present disclosure has a difference from a conventional lookup table (LUT) in its purpose and operation method.

A conventional LUT stores a 'final approximation result value' for a specific input section and is a passive memory table that looks up the corresponding result value according to an input address. In contrast, the means for storing parameters in the present disclosure functions as an active Coefficient Register File or an equivalent on-chip memory.

That is, the value stored here is not a final result value, but a 'coefficient' for controlling a hard-wired operation unit (multiplier, adder) in real time. The selector SLT reads the operation coefficients corresponding to the determined segment from this register file and supplies them to a 'Direct Computation Engine'. Therefore, this circuit is a 'computation-centric' architecture that directly calculates a result by performing an arithmetic operation such as Ax+B on an input value, which is clearly distinguished from the conventional 'lookup-centric' LUT method.

Figure 25:
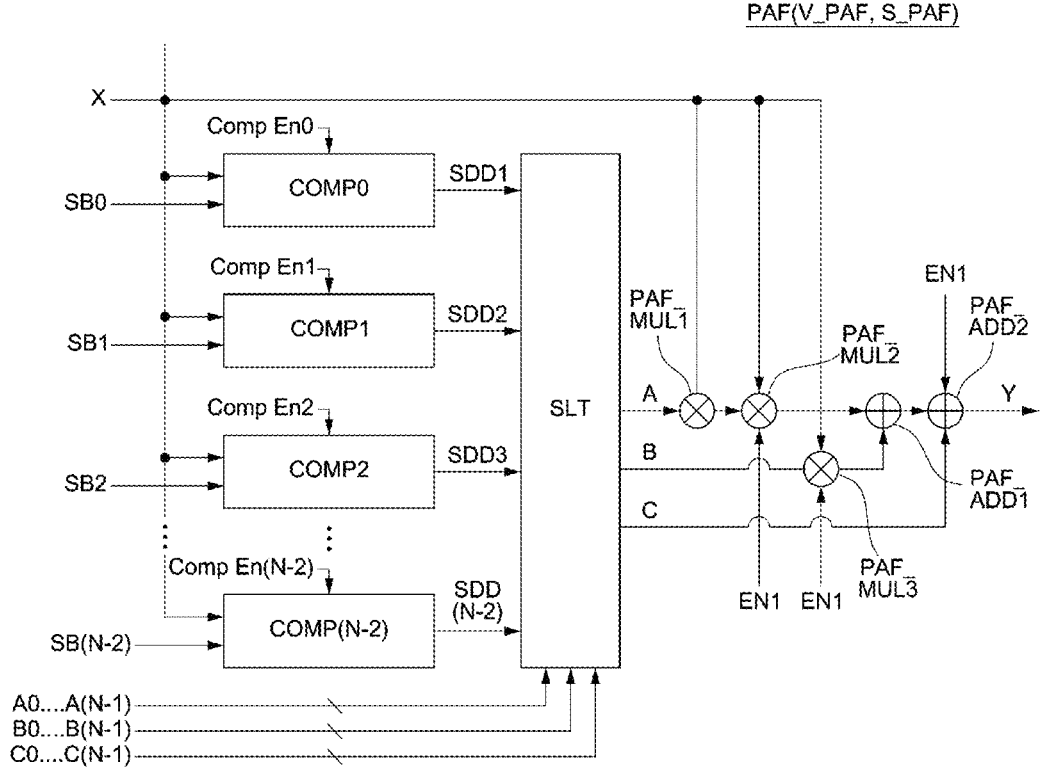
FIG. 25 is a diagram illustrating a function approximation circuit of a neural processing unit configured to process a programmed activation function according to a third embodiment of the fourth example of the present disclosure.

FIG. 25 is a diagram illustrating a function approximation circuit of a neural processing unit configured to process a programmed activation function according to a third embodiment of the fourth example of the present disclosure.

The programmable function approximation circuit PAF according to the third embodiment of the fourth example of the present disclosure shown in FIG. 25 may correspond to the vector function approximation circuit V_PAF of the vector function approximation unit 1537 of FIG. 5 and the scalar function approximation circuit S_PAF of the scalar function approximation unit 1545 of FIG. 6. Hereinafter, for convenience of explanation, the vector function approximation circuit V_PAF and the scalar function approximation circuit S_PAF are collectively referred to as the programmable function approximation circuit PAF to describe the third embodiment of the fourth example of the present disclosure.

In describing the programmable function approximation circuit PAF of FIG. 25, overlapping descriptions with the programmable function approximation circuit PAF of FIG. 24 may be omitted for convenience of explanation.

Specifically, the programmable function approximation circuit PAF according to the third embodiment of the fourth example of the present disclosure shown in FIG. 25 is an example of a circuit configured to process an activation function programmed as a quadratic function.

Accordingly, the coefficients (A, B, C) for the above-described programmable segment may include a coefficient of a quadratic term A, a coefficient of a linear term B, and an offset C.

The programmable function approximation circuit PAF according to the third embodiment of the fourth example of the present disclosure may be configured to include a plurality of comparators (COMP0 to COMP(N−2)), a selector SLT, a plurality of multipliers (PAF_MUL1, PAF_MUL2, PAF_MUL3), and a plurality of adders (PAF_ADD1, PAF_ADD2).

Each of the plurality of comparators (COMP0 to COMP (N−2)) compares an input value X calculated by at least one processing core P_CORE with each of a plurality of segment boundary values (SB0 to SB(N−2)).

Accordingly, the section of the segment to which the input value X belongs among the sections of the plurality of segments can be determined through the output value output from each of the plurality of comparators (COMP0 to COMP(N−2)).

Meanwhile, the operation status of each of the plurality of comparators (COMP0 to COMP(N−2)) can be determined by each of a plurality of comparator enable signals (Comp En 1 to Comp En (N−2)).

The selector SLT outputs coefficients (A, B, C) for the programmable segment corresponding to the section of the segment to which the input value X belongs among the coefficients (A0 to A(N−1), (B0 to B(N−1)), (CO to C(N−1)) for the plurality of programmable segments, according to the section determination data (SDD0 to SDD(N−2)).

Specifically, a pre-stored coefficient set or coefficient register provides the coefficient of the quadratic term (A0 to A(N−1)), the coefficient of the linear term (B0 to B(N−1)), and the offset (CO to C(N−1)) for each of the plurality of programmable segments to the selector SLT.

The selector SLT can determine the section of the segment to which the input value X belongs among the sections of the plurality of segments according to the section determination data (SDD0 to SDD(N−2)) output from each of the plurality of comparators (COMP0 to COMP(N−2)).

The selector SLT can output the coefficient of the quadratic term A, the coefficient of the linear term B, and the offset C for the programmable segment corresponding to the section of the determined segment among the coefficient of the quadratic term (A0 to A(N−1)), the coefficient of the linear term (B0 to B(N−1)), and the offset (CO to C(N−1)) for the plurality of programmable segments.

Accordingly, the selector SLT can output the coefficient of the quadratic term A, the coefficient of the linear term B, and the offset C for the programmable segment corresponding to the section of the segment to which the input value X belongs.

The programmed activation function operation unit of the programmable function approximation circuit PAF may refer to a circuit unit configured to operate on an output value Y by receiving an input value X, a coefficient of a quadratic term A, a coefficient of a linear term B, and an offset C.

The programmed activation function operation unit of the programmable function approximation circuit PAF may be configured to include a plurality of multipliers (PAF_MUL1, PAF_MUL2, PAF_MUL3) and a plurality of adders (PAF_ADD1, PAF_ADD2) to process a quadratic function or a linear function.

The programmed activation function operation unit of the programmable function approximation circuit PAF may be a hard-wired circuit.

The plurality of multipliers of the programmed activation function operation unit may include a first multiplier PAF_MUL1, a second multiplier PAF_MUL2, and a third multiplier PAF_MUL3.

The first multiplier PAF_MUL1 multiplies the coefficient of the quadratic term A for the programmable segment corresponding to the section of the segment to which the input value X belongs by the input value X.

Specifically, the first multiplier PAF_MUL1 multiplies the input value X calculated by at least one processing core P_CORE by the coefficient of the quadratic term A for the programmable segment output from the selector SLT.

Accordingly, the first multiplier PAF_MUL1 can output the result of multiplying the coefficient of the quadratic term A for the programmable segment by the input value X. That is, the output of the first multiplier PAF_MUL1 can be expressed as A×X.

The second multiplier PAF_MUL2 multiplies the output value output from the first multiplier PAF_MUL1 by the input value X.

Specifically, the second multiplier PAF_MUL2 multiplies the input value X calculated by at least one processing core P_CORE by the output value output from the second multiplier PAF_MUL2.

Accordingly, the output of the second multiplier PAF_MUL2 can be expressed as $A \times X^2$. However, the above-described configuration is only an example for implementing $A \times X^2$, and it is also possible to implement it in a modified manner through various circuit combinations.

The third multiplier PAF_MUL3 multiplies the coefficient of the linear term B for the programmable segment corresponding to the section of the segment to which the input value X belongs by the input value X.

Specifically, the third multiplier PAF_MUL3 multiplies the input value X calculated by at least one processing core P_CORE by the coefficient of the linear term B for the programmable segment output from the selector SLT.

Accordingly, the third multiplier PAF_MUL3 can output the result of multiplying the coefficient of the linear term B for the programmable segment by the input value X. That is, the output of the third multiplier PAF_MUL3 can be expressed as B×X.

The plurality of adders may include a first adder PAF_ADD1 and a second adder PAF_ADD2.

The first adder PAF_ADD1 adds the output value of the second multiplier PAF_MUL2 to the output value of the third multiplier PAF_MUL3.

Specifically, the first adder PAF_ADD1 can output the sum of the quadratic term and the linear term of each of a plurality of programmable segments composed of a quadratic term. That is, the output of the first adder PAF_ADD1 can be expressed as $A \times X^2 + B \times X$.

The second adder PAF_ADD2 adds the offset C for the programmable segment corresponding to the section of the segment to which the input value X belongs to the output value of the first adder PAF_ADD1.

Specifically, the adder PAF_ADD adds the offset C for the programmable segment to the sum of the quadratic term and the linear term of the programmable segment composed of a quadratic term. That is, the output of the second adder PAF_ADD2 can be expressed as $A \times X^2 + B \times X + C$.

Accordingly, the adder PAF_ADD can output an activation value to which an activation function programmed as a quadratic function is applied to the operation value that is the input value X.

According to the above-described configuration, the programmable function approximation circuit PAF operates to be able to process a quadratic polynomial.

Meanwhile, the operation of the second multiplier PAF_MUL2, the third multiplier PAF_MUL3, and the second adder PAF_ADD2 can be controlled by a first enable signal EN1.

Specifically, when the second multiplier PAF_MUL2, the third multiplier PAF_MUL3, and the second adder PAF_ADD2 do not operate due to the first enable signal EN1, the operation is as described below.

The first multiplier PAF_MUL1 multiplies the coefficient of the quadratic term A for the programmable segment corresponding to the section of the segment to which the input value X belongs by the input value X.

Specifically, the first multiplier PAF_MUL1 multiplies the input value X calculated by at least one processing core 120 by the coefficient of the quadratic term A for the programmable segment output from the selector SLT.

Accordingly, the first multiplier PAF_MUL1 can output the result of multiplying the coefficient of the quadratic term A for the programmable segment by the input value X. That is, the output of the first multiplier PAF_MUL1 can be expressed as A×X.

And, since the second multiplier PAF_MUL2 and the third multiplier PAF_MUL3 do not operate, the output of the first multiplier PAF_MUL1 is input to the first adder PAF_ADD1 as it is. That is, the operator deactivated by the first enable signal EN1 can be bypassed.

The first adder PAF_ADD1 adds the coefficient of the linear term B for the programmable segment corresponding to the section of the segment to which the input value X belongs to the output value of the first multiplier PAF_MUL1.

Specifically, the first adder PAF_ADD1 adds the coefficient of the linear term B for the programmable segment to the value obtained by multiplying the coefficient of the quadratic term A for the programmable segment by the input value X. That is, the output of the first adder PAF_ADD1 can be expressed as A×X+B.

Since the second adder PAF_ADD2 does not operate, the output of the first adder PAF_ADD1 is output as it is. That is, the operator deactivated by the first enable signal EN1 can be bypassed.

That is, the first adder PAF_ADD1 can output an activation value to which an activation function programmed as a linear function is applied to the operation value that is the input value X.

According to the above-described configuration, the programmable function approximation circuit PAF operates to be able to process a linear polynomial.

As described above, some configurations of the plurality of multipliers and the plurality of adders can be controlled by the first enable signal EN1. Accordingly, according to the first enable signal EN1, the programmable function approximation circuit PAF can be driven not only when each of the programmable segments is a quadratic polynomial, but also when each of the programmable segments is a linear polynomial.

To elaborate, the programmable function approximation circuit PAF pipelined with at least one processing core 120 according to an example of the present disclosure may also be configured as a hard-wired circuit configured to implement both activation functions programmed as a quadratic function and a linear function.

Therefore, there is an advantage of being able to process various cases of PAF with a single programmable function approximation circuit PAF.

Meanwhile, the programmable function approximation circuit PAF may include a plurality of comparators (COMP0 to COMP(N–2)), a selector SLT, a plurality of multipliers (PAF_MUL1, PAF_MUL2, PAF_MUL3), and a plurality of adders (PAF_ADD1, PAF_ADD2), as well as a logarithmic operator.

Figure 26:
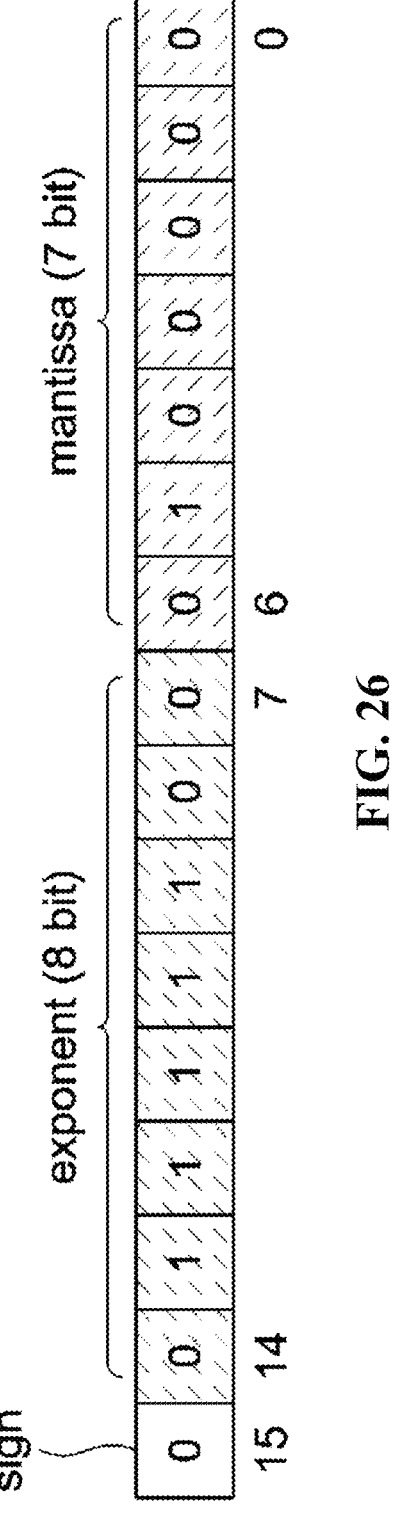
FIG. 26 is a diagram illustrating an example of a number system processed in a special function unit of a neural processing unit, according to one embodiment.

FIG. 26 is a diagram illustrating an example of a number system processed in a special function unit of a neural processing unit that can be applied to examples of the present disclosure.

The special function unit 150 of the neural processing unit 100 according to the examples of the present disclosure is designed to be processed with at least one floating-point number system.

For example, the special function unit 150 may be designed to process floating-point numbers. Referring to FIG. 26, the floating-point number is represented in the brain floating 16 format. Referring to FIG. 26, the BF16 format floating-point number system includes a sign bit S, exponent bits E, and mantissa bits M.

However, the number system of the special function unit 150 according to the examples of the present disclosure can also use the IEEE standard 754, and other number systems may be applied for the operational efficiency of the special function unit 150, reduction of memory usage, reduction of power consumption, and the like. However, the examples of the present disclosure are not limited thereto, and Dynamic Floating-Point, Variable Precision Floating-Point (VPFP), Custom Floating-Point (CFP), Flexible Floating-Point (FFP), and the like may be applied. Therefore, the bit width allocation of the exponent part and the bit width allocation of the mantissa part can be varied according to the number system supported by the special function unit 150 of the neural processing unit 100.

For example, when the special function unit 150 according to the examples of the present disclosure is configured to use the FP32 number system, the special function unit 150 is configured to recognize the $31^{st}$ bit of the weight parameters, input parameters, and output parameters as the sign bit S, the $23^{rd}$ bit to the 30th bit as the exponent bits E, and the 0th bit to the $22^{nd}$ bit as the mantissa bits M.

For example, when the special function unit 150 according to the examples of the present disclosure is configured to use the FP16 number system, the special function unit 150 is configured to recognize the $15^{th}$ bit of the weight parameters, input parameters, and output parameters as the sign bit S, the $10^{th}$ bit to the $14^{th}$ bit as the exponent bits E, and the $0^{th}$ bit to the $9^{th}$ bit as the mantissa bits M.

For example, when the special function unit 150 according to the examples of the present disclosure is configured to use the Brain Floating 16 (BF16) number system, the special function unit 150 is configured to recognize the 15th bit of the weight parameters, input parameters, and output parameters as the sign bit S, the 7th bit to the 14th bit as the exponent bits E, and the 0th bit to the 6th bit as the mantissa bits M.

This can be expressed by the formula as shown in Equation 5.

$$x=(-1)^s \times m \times 2^e \qquad \text{Equation 5}$$

where x is the input in floating-point format, s means the sign of the input x, e means the exponent part of the input x, and m denotes the mantissa part of the input x. The bias of BF16 is 127, and the range of the actual value of the exponent part is –126 to 127. The actual exponent value can be derived by subtracting the bias from the stored exponent.

Figure 27:
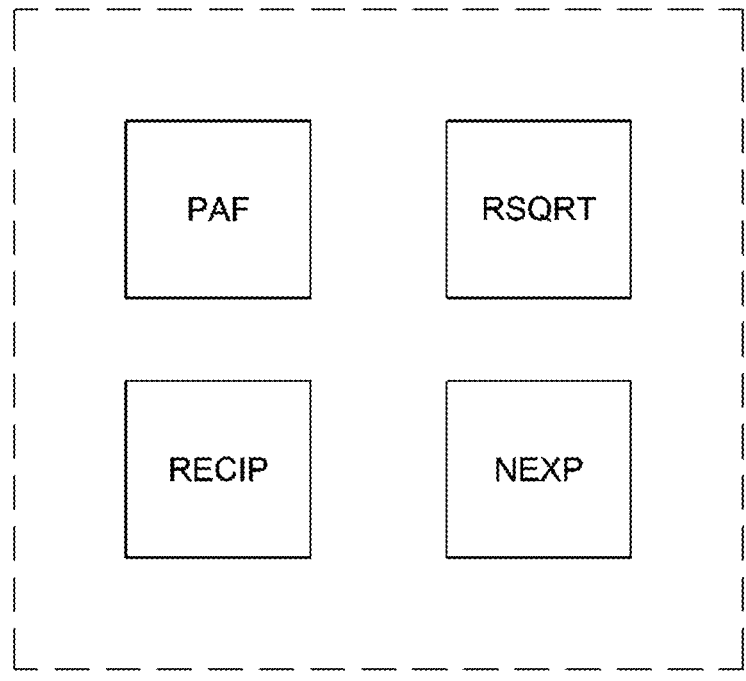
FIG. 27 is a block diagram illustrating a function approximation unit according to a fourth embodiment of the fourth example of the present disclosure.

FIG. 27 is a block diagram illustrating a function approximation unit according to a fourth embodiment of the fourth example of the present disclosure.

Referring to FIG. 5, FIG. 6, FIG. 24, FIG. 25, and FIG. 27, a function approximation unit FuncApx according to the fourth embodiment of the fourth example of the present disclosure will be described.

Referring to FIG. 27, the function approximation unit FuncApx according to the fourth embodiment of the fourth example of the present disclosure includes a programmable function approximation circuit PAF, a reciprocal function circuit RECIP, a reciprocal of a square root function circuit RSQRT, and a negative exponential function circuit NEXP. The circuits are individual circuits configured to independently process the operations of the functions required for the attention score operation of an artificial intelligence model.

The function approximation unit FuncApx of FIG. 27 according to the fourth embodiment of the fourth example of the present disclosure may correspond to the vector function approximation unit V_FuncApx of FIG. 5 or the scalar function approximation unit S_FuncApx of FIG. 6. The programmable function approximation circuit PAF of FIG. 24 according to the fourth embodiment of the fourth example of the present disclosure may correspond to the programmable function approximation circuit PAF of FIG. 25 or the programmable function approximation circuit PAF of FIG. 27. The reciprocal function circuit RECIP of FIG. 27 according to the fourth embodiment of the fourth example of the present disclosure may correspond to the vector reciprocal function circuit V_RECIP of FIG. 5 or the scalar reciprocal function circuit S_RECIP of FIG. 6. The reciprocal of a square root function circuit RSQRT of FIG. 27 according to the fourth embodiment of the fourth example of the present disclosure may correspond to the vector reciprocal of a square root function circuit V_RSQRT of FIG. 5 or the scalar reciprocal of a square root function circuit S_RSQRT of FIG. 6. The negative exponential function circuit NEXP of FIG. 27 according to the fourth embodiment of the fourth example of the present disclosure may correspond to the vector negative exponential function circuit V_NEXP of FIG. 5 or the scalar negative exponential function circuit S_NEXP of FIG. 6.

Each of the programmable function approximation circuit PAF, the reciprocal function circuit RECIP, the reciprocal of a square root function circuit RSQRT, and the negative exponential function NEXP circuit is a respective hard-wired operation circuit. That is, when each of the circuits receives an input parameter, it can process the operation very quickly through the hard-wired operation circuit without complex instructions. That is, the function approximation unit FuncApx activates at least one circuit corresponding to the function to be processed. Then, when the function approximation unit FuncApx provides an input parameter to the activated circuit, the function is calculated along the pipeline of the calculation circuit without complex instruction control. That is, each of the programmable function approximation circuit PAF, the reciprocal function circuit RECIP, the reciprocal of a square root function circuit RSQRT, and the negative exponential function NEXP circuit is a dedicated operation circuit for the function corresponding to each circuit. To elaborate, a hard-wired operation circuit can only process a predefined operation, and since its versatility is low, it cannot process other operations. However, each of the programmable function approximation circuit PAF, the reciprocal function circuit RECIP, the reciprocal of a square root function circuit RSQRT, and the negative exponential function NEXP circuit can process a predefined operation quickly and with low power. In particular, since all of the operation circuits can be used for calculating the attention score, a transformer-based artificial intelligence model can be operated quickly.

For example, the function approximation unit FuncApx may be designed to process a function approximation operation by activating only the programmable function approximation circuit PAF. For example, the programmable function approximation circuit PAF can process at least one of Swish, Mish, Sigmoid, Hyperbolic Tangent (Tanh), Scaled Exponential Linear Unit (SELU), Gaussian Error Linear Unit (GELU), Softplus, Rectified Linear Unit (ReLU), Leaky ReLU, Maxout, Exponential Linear Unit (ELU), Hard Sigmoid, Hard Tanh, Bent Identity, ArcTan, Softsign, Sinusoidal Activation, S-shaped Rectified Linear Unit (SReLU), Parametric Rectified Linear Unit (PReLU), Logistic Activation, Radial Basis Function (RBF), Binary Step, Reciprocal, root mean square, and negative exponential by receiving a programmable parameter.

Furthermore, the function approximation unit FuncApx may be designed to more precisely process the corresponding reciprocal function, square root function, and negative exponential function by activating one of the reciprocal function circuit RECIP, the reciprocal of a square root function circuit RSQRT, and the negative exponential function NEXP circuit while activating the programmable function approximation circuit PAF.

The feature of the function approximation unit FuncApx described above lies in a hybrid architecture for achieving both versatility and efficiency.

That is, the function approximation unit FuncApx includes a programmable function approximation circuit PAF for flexibly responding to various forms of nonlinear functions such as GELU and Swish or new ones that may appear in the future, and a dedicated function circuit for processing functions that are frequently used in neural network operations and whose forms are fixed, such as reciprocal RECIP, reciprocal of a square root RSQRT, and negative exponential NEXP, with the highest speed and efficiency.

When the controller 110 receives an instruction indicating the type of function to be processed, it selectively activates either the PAF circuit or a specific dedicated function circuit accordingly. Other circuit blocks that may be not activated can be cut off from power supply through power gating or clock gating to reduce unnecessary power consumption.

In addition, instead of each dedicated function circuit (RECIP, RSQRT, NEXP) having its own approximation operation circuit, one PAF circuit can be reused as a Shared Operation Unit. Each dedicated function circuit preprocesses an input value according to its function characteristics (e.g., mantissa normalization), and then transmits the result to the shared PAF circuit to delegate the approximation operation. The controller may be configured to provide the PAF circuit with a pre-learned optimal programmable parameter set (P_PARA-1, P_PARA-2, etc.) suitable for the corresponding function.

This structure can provide the core effect of the present disclosure of dramatically reducing the hardware area compared to a method of implementing all separate complex approximation circuits for each function, while maintaining high accuracy and performance through a preprocessing circuit and parameters improved for each function.

Figure 28:
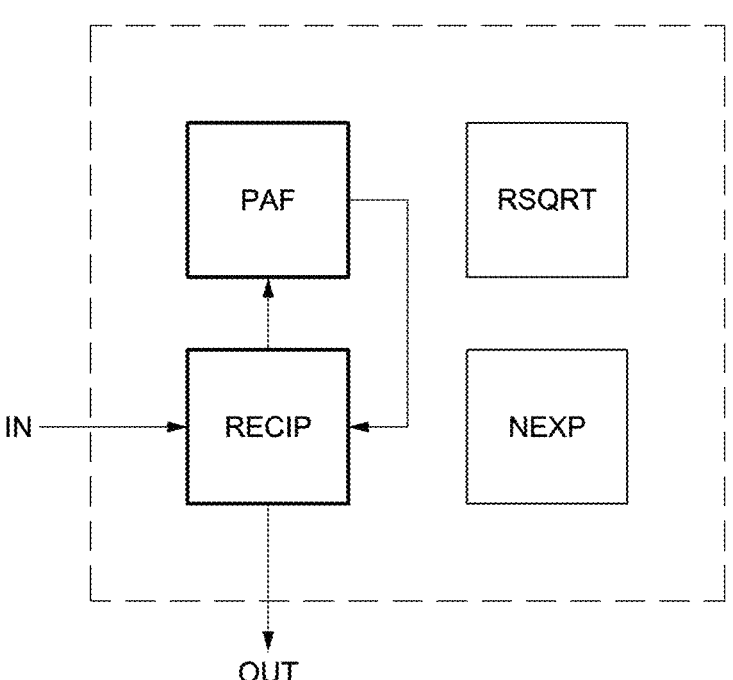
FIG. 28 is a block diagram illustrating a reciprocal function processing circuit according to a fifth embodiment of the fourth example of the present disclosure.

FIG. 28 is a block diagram illustrating a reciprocal function processing circuit according to a fifth embodiment of the fourth example of the present disclosure.

Figure 29:
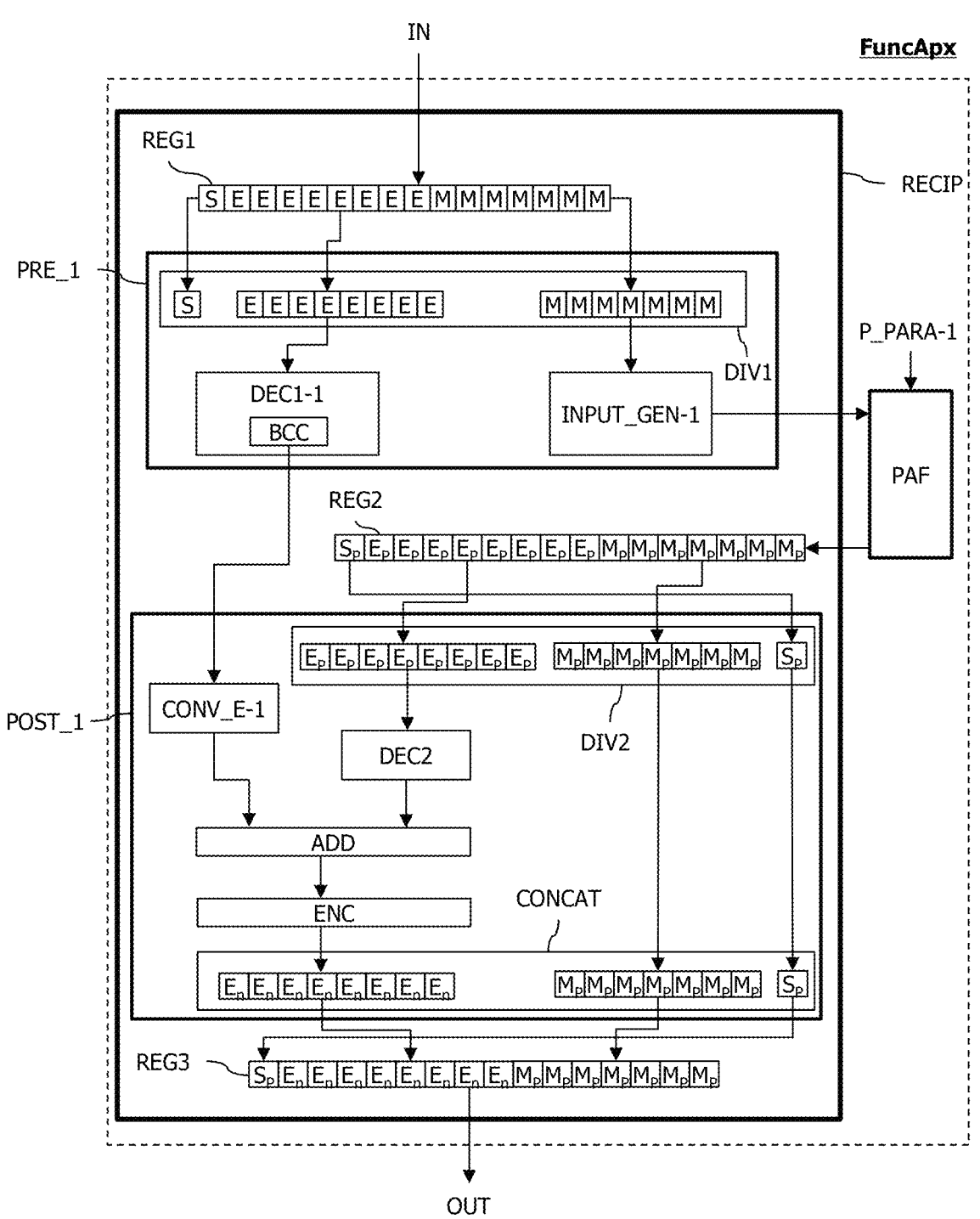
FIG. 29 is a diagram illustrating a detailed configuration of the reciprocal function processing circuit according to the fifth embodiment of the fourth example of the present disclosure.

The reciprocal function processing circuit according to the fifth embodiment of the fourth example of the present disclosure is a hardware circuit configuration for a reciprocal operation implemented within the function approximation unit FuncApx of the neural processing unit NPU. The reciprocal function processing circuit is configured to utilize the reciprocal function circuit RECIP and the programmable function approximation circuit PAF within the function approximation unit FuncApx to perform the reciprocal operation. FIG. 28 illustrates the overall configuration of the function approximation unit FuncApx including the reciprocal function processing circuit RECIP, and FIG. 29 illustrates the detailed configuration of the reciprocal function processing circuit RECIP.

Referring to FIG. 28, the neural processing unit NPU is configured to activate the programmable function approximation circuit PAF and the reciprocal function circuit RECIP within the function approximation unit FuncApx to perform reciprocal function processing. The function approximation unit FuncApx is configured such that the input and output terminals of each circuit are electrically connected so that the programmable function approximation circuit PAF and the reciprocal function circuit RECIP can communicate with each other.

As shown in FIG. 28, the data path for reciprocal function processing is connected to be input from an input value IN to the reciprocal function circuit RECIP. The output of the reciprocal function circuit RECIP is configured to be connected to the programmable function approximation circuit PAF. The output of the programmable function approximation circuit PAF is configured to be connected back to one of the input terminals of the reciprocal function circuit RECIP. Through this, the reciprocal function processing circuit is set to process a reciprocal function calculation by performing an iterative process between the reciprocal function circuit RECIP and the programmable function approximation circuit PAF. The final output of the reciprocal function circuit RECIP is configured to be output as an output value OUT.

In an embodiment, when the reciprocal function circuit RECIP and the programmable function approximation circuit PAF are activated, other dedicated operation circuits within the function approximation unit FuncApx, such as the reciprocal of a square root function circuit RSQRT and the negative exponential function circuit NEXP, may be configured to be deactivated. The function approximation unit FuncApx is configured to reduce the power consumption of the deactivated circuits using at least one of power gating, clock gating, and register retention functions.

Another technical idea of the present disclosure is to overcome the inefficiency of a method of approximating a function by sequentially executing a plurality of instructions. The prior art requires a separate instruction for each stage, such as preprocessing, approximation, and post-processing, causing an operation latency.

In contrast, the dedicated function circuits of the present disclosure (see FIG. 29, 31, 33) are implemented as a hard-wired pipeline that is triggered by a single instruction and operates autonomously.

Specifically, the controller 110 transmits, for example, a single instruction "perform a reciprocal operation on input value A" to the function approximation unit FuncApx. The control logic of the function approximation unit interprets the corresponding instruction and activates the reciprocal function circuit RECIP. Once the input value A enters the pipeline of the reciprocal function circuit, all subsequent multi-stage operations—that is, (1) a preprocessing step of decomposing the input value into an exponent part and a mantissa part, (2) an approximation operation step using a shared PAF circuit, and (3) a post-processing step of recombining the results-proceed autonomously and sequentially by the hard-wired connection of the internal circuit and the pipeline registers (REG1, REG2, REG3), without additional instruction intervention from the controller.

When all pipeline stages are completed, the final result value is output, and this entire process is completed with a single instruction. This reduces the overhead associated with instruction fetch and decode, and allows complex function operations to be completed within a few clock cycles, which can dramatically improve the throughput and performance of the neural processing unit.

FIG. 29 is a diagram illustrating a detailed configuration of a reciprocal function processing circuit according to a fifth embodiment of the fourth example of the present disclosure.

FIG. 29 is a block diagram illustrating a detailed configuration of a reciprocal function processing circuit RECIP. The reciprocal function processing circuit is a combination of dedicated operation circuits designed to generate an output value OUT representing an approximate value of the reciprocal of an input value IN in a floating-point format. The input value IN has a floating-point format composed of a sign bit S, exponent bits E, and mantissa bits M, and may have a BF16 format as an example, but the present disclosure is not limited thereto. The reciprocal function processing circuit is configured to obtain a reciprocal value by separating and individually processing the exponent bits E and the mantissa bits M constituting the input value IN, and then combining the processed results.

The reciprocal function processing circuit is designed to have a pipeline structure for hardware acceleration, and for this purpose, it is configured to include a plurality of registers (input register REG1, intermediate register REG2, output register REG3) that store the intermediate results of each processing stage. The configuration of each of the registers REG1, REG2, and REG3 may correspond to the bit width of the number format of the input data. For example, if the input data is BF16, the corresponding register may be configured as a 16-bit buffer.

This is differentiated from conventional approximation methods that require a large number of instructions and operation cycles by implementing them based on the sequential execution of computer program instructions.

The reciprocal function processing circuit may include a plurality of registers REG1, REG2, and REG3, a preprocessing circuit PRE_1, and a post-processing circuit POST_1.

The input register REG1 is configured to function as an input buffer that temporarily stores an input value IN input from the outside. The input register REG1 is arranged to correspond to the input of the first stage of the pipeline.

The preprocessing circuit PRE_1 is configured to convert the input value IN stored in the input register REG1 into a form suitable for reciprocal function calculation. The preprocessing circuit PRE_1 is configured to include a first decomposition circuit DIV1, a first decoder DEC1-1, and an input value generation circuit INPUT_GEN-1. The first decomposition circuit DIV1 is configured to separate the sign bit S, the exponent bits E, and the mantissa bits M from the input value IN. The preprocessing circuit PRE_1 is configured to convert the input value IN of the input register REG1 into a form suitable for reciprocal function approximation to reduce the approximation error.

The first decoder DEC1-1 is configured to receive the exponent bits E separated from the first decomposition circuit DIV1, decode them into an integer data form, and subtract a pre-stored bias value from the exponent bits E using a built-in binary calculation circuit BCC. The binary calculation circuit BCC is configured to process at least binary subtraction. In this way, the first decoder DEC1-1 is configured to prepare for use in subsequent exponent conversion and scaling operations by representing the actual value of the input exponent bits E (i.e., an integer-form exponent value with the bias removed).

The input value generation circuit INPUT_GEN-1 is configured to receive the mantissa bits M separated from the first decomposition circuit DIV1 and generate a value in a floating-point format that can be processed by the programmable function approximation circuit PAF.

Specifically, the input value generation circuit INPUT_GEN-1 generates an input value in a floating-point number format by combining the mantissa bits M with pre-set exponent bits and a sign bit (0), and this mantissa M is configured to be normalized to a 1.M form (e.g., BF16 standard) in a floating-point format (e.g., $x=(-1)^s \times M \times 2^{(E-bias)}$) to represent the significant digits.

In this way, the input value generation circuit INPUT_GEN-1 uses the mantissa bits M extracted from the first decomposition circuit DIV1 to convert it into a floating-point value mapped to a range of 1 or more and less than 2 [1, 2) that can be used for operations by the programmable function approximation circuit PAF. The converted value is connected to the input of the programmable function approximation circuit PAF, and as a result, the mantissa bits M of the generated floating-point number are always placed in the range of $1 \leq M < 2$. This is to reduce the approximation error in the subsequent programmable function approximation circuit PAF by moving the input range subject to function approximation to a domain where the variation of the function value is small.

The programmable function approximation circuit PAF is configured to receive the value in the floating-point format converted from the input value generation circuit INPUT_GEN-1 and execute a programmed activation function to generate an approximation result of the reciprocal function. The programmable function approximation circuit PAF is configured to utilize a programmable parameter P_PARA-1 configured to approximate a reciprocal function corresponding to a specific input section of 1 or more and less than 2.

Meanwhile, the programmable parameter P_PARA-1 may be a value derived through deep learning-based learning, according to an embodiment of the present disclosure.

Specifically, the programmable parameter P_PARA-1 may be a coefficient derived by learning to approximate a target function using a small-scale artificial neural network improved for representing a piecewise linear function. In the case of the reciprocal function circuit RECIP, since the mantissa of the input is always normalized to a narrow range of [1, 2) in the preprocessing process, the target function for learning can be set to f(x)=1/x, and its domain of definition can be set to x∈[1, 2).

The artificial neural network is learned in a direction that reduces the error with the target function within such a predictable section with small variation. Once learning is complete, an optimal programmable parameter set including a segment boundary value, the width of each segment, and the slope A and offset B of the corresponding section in a form that can be directly used by the programmable function approximation circuit PAF in hardware can be generated from the learned weights and biases of the neural network. This method makes it possible to derive the most effective parameters that reduce the approximation error of the reciprocal function within limited hardware resources.

In particular, this process has the advantage of being able to derive a programmable parameter P_PARA-3 that performs the most precise approximation within a given hardware resource by enabling hardware-software co-optimization that reflects the hardware constraints of the programmable function approximation circuit PAF (e.g., the maximum number of comparators) in the learning process.

That is, the programmable function approximation circuit PAF is configured to receive a programmable parameter P_PARA-1 that programs a reciprocal function. The programmable function approximation circuit PAF is configured to effectively reduce the approximation error compared to the case of approximating over a wide input range by performing function approximation in a range of 1 or more and less than 2 where the function value variation is small. The programmable function approximation circuit PAF may utilize a fixed-point number operation to perform function approximation internally, and in this case, it may be configured to include a process of converting a floating-point input to a fixed-point number and converting it back to a floating-point format after the operation. The output of the programmable function approximation circuit PAF is connected to be transmitted to the intermediate register REG2. A detailed description of processing a programmed activation function using the programmable function approximation circuit PAF refers to FIG. 21 to FIG. 25.

The post-processing circuit POST_1 may include an exponent conversion circuit CONV_E-1, a second decomposition circuit DIV2, a second decoder DEC2, an adder ADD, an encoder ENC, and a concatenation circuit CONCAT.

The exponent conversion circuit CONV_E-1 is configured to receive the exponent bits E decoded from the first decoder DEC1-1 and output a value obtained by converting its sign to a negative number. The output of the exponent conversion circuit CONV_E-1 is configured to be connected to the first input of the adder ADD. Therefore, the exponent conversion circuit CONV_E-1 can efficiently implement the mathematical property of a reciprocal operation ($1/2^E = 2^{-E}$) in hardware.

The second decomposition circuit DIV2 is configured to receive the output value (approximation result) of the programmable function approximation circuit PAF through the intermediate register REG2 and separate the sign bit $S_p$, exponent bit $E_p$, and mantissa bit $M_p$ of the operation result. The bits ($S_p$, $M_p$) separated from the second decomposition circuit DIV2 are transmitted to a concatenation circuit CONCAT via the intermediate register REG2, and the exponent bit $E_p$ is connected to be transmitted to a second decoder DEC2.

The second decoder DEC2 is configured to receive the exponent bits $E_p$ separated from the second decomposition circuit DIV2, decode them into an integer data form, and then subtract a bias. Here, the integer value of the bias is 127. By decoding, the actual value of the exponent bits $E_p$ (i.e., a fixed-point exponent value in integer form with the bias removed) can be represented. That is, the second decoder DEC2 is configured to decode the exponent bits $E_p$ of the reciprocal of the square root function approximated in the programmable function approximation circuit PAF to an actual value by subtracting a bias. The output of the second decoder DEC2 may be configured to be connected to the second input unit of the adder ADD.

The adder ADD is configured to obtain exponent bits of an integer value with the bias removed by adding the values input from the first input unit and the second input unit. The adder ADD is a circuit configured to receive two binary input values and process a binary addition operation. That is, by adding the decoded exponent bits input to each of the first input unit and the second input unit of the adder ADD, the output of the adder ADD is configured to be restored to the initial range of the input value IN. That is, the exponent part of the final result can be determined by subtracting the offset (the difference between the input exponent and the bias)

obtained from the initial input exponent from the exponent obtained through the reciprocal calculation of the mantissa part. The output of the adder ADD is connected to the encoder ENC, and the output of the adder ADD is configured to be transmitted to the encoder ENC.

The encoder ENC is configured to generate encoded exponent bits $E_n$ by adding a predefined bias (e.g., 127) value back to the unbiased exponent value, which is the output of the adder ADD. That is, the encoder ENC is configured to perform the role of restoring the exponent bits to a format suitable for the floating-point system by adding back the bias that was removed during the decoding process. The output of the encoder ENC is configured to be connected to the concatenation circuit CONCAT.

The concatenation circuit CONCAT combines the encoded exponent bit $E_n$ input from the encoder ENC and the sign bit $S_p$ and mantissa bit $M_p$ of the second decomposition circuit DIV2 input through the intermediate register REG2 in a preset order. In this way, a bit string in a floating-point format corresponding to the final approximation value of the corresponding function is generated. The output of the concatenation circuit CONCAT is connected to an output register REG3.

The output register REG3 is configured to function as an output buffer that stores the output of the concatenation circuit CONCAT. The output register REG3 is arranged as the final stage of the pipeline.

The reciprocal function calculation process can be described by three calculation paths.

A first calculation path is a path for decoding the exponent bits E extracted from the input value IN and performing a reciprocal conversion on the decoded value, and is configured to include an exponent processing part of the preprocessing circuit PRE_1 (e.g., the exponent extraction unit of the first decomposition circuit DIV1, the first decoder DEC1-1) and the exponent conversion circuit CONV_E-1. The output of this path is provided to the first input of the adder ADD.

A second calculation path is a path for converting the mantissa bits M of the input value IN into an input for the programmable function approximation circuit PAF, calculating an approximate value of the reciprocal function in the programmable function approximation circuit PAF, separating the exponent bits $E_p$ and the mantissa bits $M_p$ of the approximate value, and decoding the exponent bits $E_p$, and is configured to include a mantissa processing part of the preprocessing circuit PRE_1 (e.g., the mantissa extraction unit of the first decomposition circuit DIV1, the input value generation circuit INPUT_GEN-1), the programmable function approximation circuit PAF, the second decomposition circuit DIV2, and the second decoder DEC2. The output of the second decoder DEC2 is provided to the second input of the adder ADD, and the output $(S_p, M_p)$ of the second decomposition circuit DIV2 is provided to the concatenation circuit CONCAT via the intermediate register REG2.

A third calculation path is configured to include circuits (e.g., the adder ADD, the encoder ENC, and the concatenation circuit CONCAT) arranged to calculate the output value OUT of the input value IN (i.e., the reciprocal value of the input value) by adding the output value of the first calculation path (i.e., the output value of the exponent conversion circuit CONV_E-1) and the output value of the second calculation path (i.e., the output value of the second decoder DEC2), and combining the encoded exponent bits $E_n$, the mantissa bits $M_p$ of the linear function approximate value, and the sign bit $S_p$ in a preset order.

The reciprocal function processing circuit is designed to have a pipeline structure by arranging registers (input register REG1, intermediate register REG2, output register REG3) between each operation stage. The pipeline structure is configured to provide a hardware acceleration effect that greatly improves the total number of operations that can be processed per unit time (throughput) while maintaining the completion time (latency) of individual operations, by allowing several reciprocal calculation tasks to be processed simultaneously at different stages of the circuit. This is differentiated from conventional approximation methods that require a large number of instructions and operation cycles by implementing them based on the sequential execution of computer program instructions. In the reciprocal function processing circuit of the present disclosure, when an input parameter required for a function operation (e.g., an input value IN) is provided to the input register REG1, the necessary calculations are automatically performed in dedicated hardware blocks corresponding to each operation stage (PRE_1, DIV1, DEC1-1, INPUT_GEN-1, CONV_E-1, PAF, DIV2, DEC2, ADD, ENC, CONCAT, etc.), and a separate instruction for controlling the operation of the intermediate stage is not required. That is, once the input data enters the pipeline, each operation stage proceeds sequentially according to the hard-wired connection of the hardware itself and the data flow by the registers, so that a high-speed pipeline operation is performed.

According to the configuration, a reciprocal function can be calculated at high speed by activating only the hard-wired dedicated operation circuits (the reciprocal function circuit RECIP and the programmable function approximation circuit PAF). In particular, when the reciprocal function circuit RECIP and the programmable function approximation circuit PAF are used together, it is configured to reduce the approximation error over a wider input range than when using only the programmable function approximation circuit PAF. Other dedicated circuits, such as the reciprocal of a square root function circuit RSQRT or the negative exponential function circuit NEXP, which are not used in the reciprocal function calculation, are configured to be deactivated, thereby efficiently reducing the power consumption of the neural processing unit NPU.

The reciprocal function processing circuit according to the fifth embodiment of the fourth example of the present disclosure proposes a dedicated hardware accelerator to overcome the limitations of the operation cycle of the existing software instruction-based approximation method. In particular, to efficiently process complex floating-point operations, it adopts a division processing and pipeline structure based on the characteristics of the input data (exponent part and mantissa part).

The pipeline structure of the circuit is implemented with dedicated hardware for each stage of operation, so that once data enters the pipeline, it is processed along a continuous hardware flow. This eliminates the overhead of fetching, decoding, and executing a separate instruction for each arithmetic or logical operation in a conventional processor, which can dramatically improve the processing speed of the reciprocal function operation.

In addition, the reciprocal function processing circuit effectively reduces the approximation error that occurs in the piecewise approximation method by pre-mapping the input mantissa to a range favorable for function approximation. Through this, a reciprocal function approximate value with high accuracy can be provided even with limited hardware resources.

The reciprocal function processing circuit includes a power management function that selectively activates only the necessary dedicated operation circuits and deactivates the remaining circuits. Through this, it can contribute to improving the energy efficiency of the entire system by providing high-performance operations and at the same time reducing unnecessary power consumption.

Figure 30:
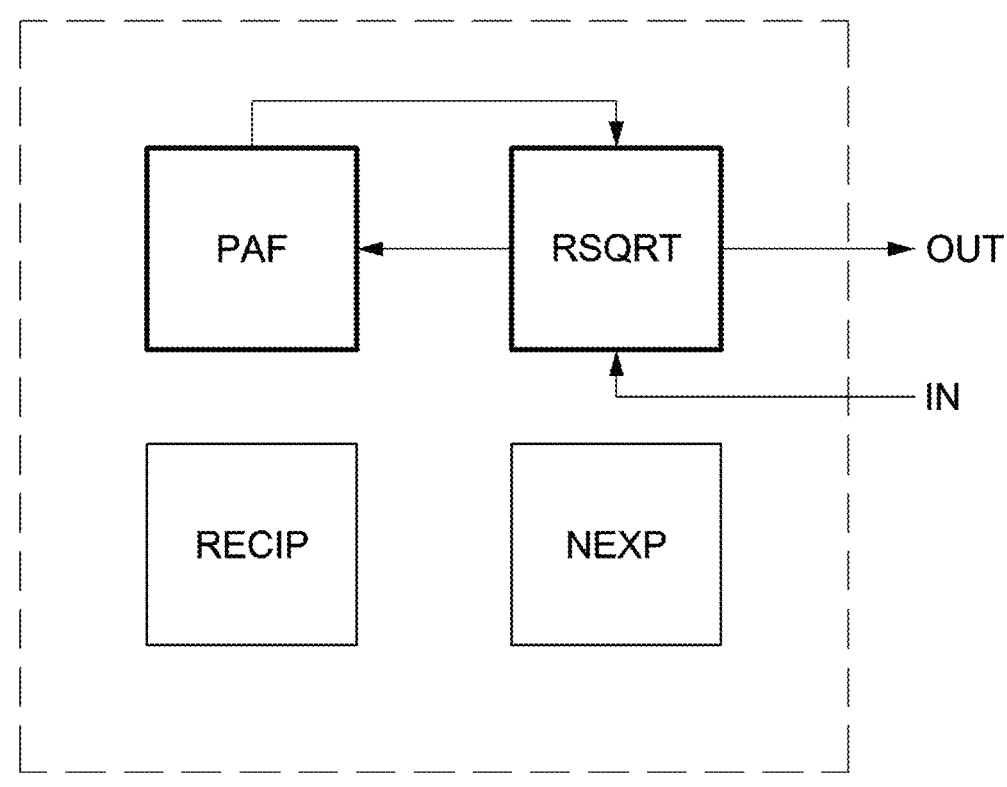
FIG. 30 is a block diagram illustrating a reciprocal of a square root function processing circuit according to a sixth embodiment of the fourth example of the present disclosure.

FIG. 30 is a block diagram illustrating a reciprocal of a square root function processing circuit according to a sixth embodiment of the fourth example of the present disclosure.

Figure 31:
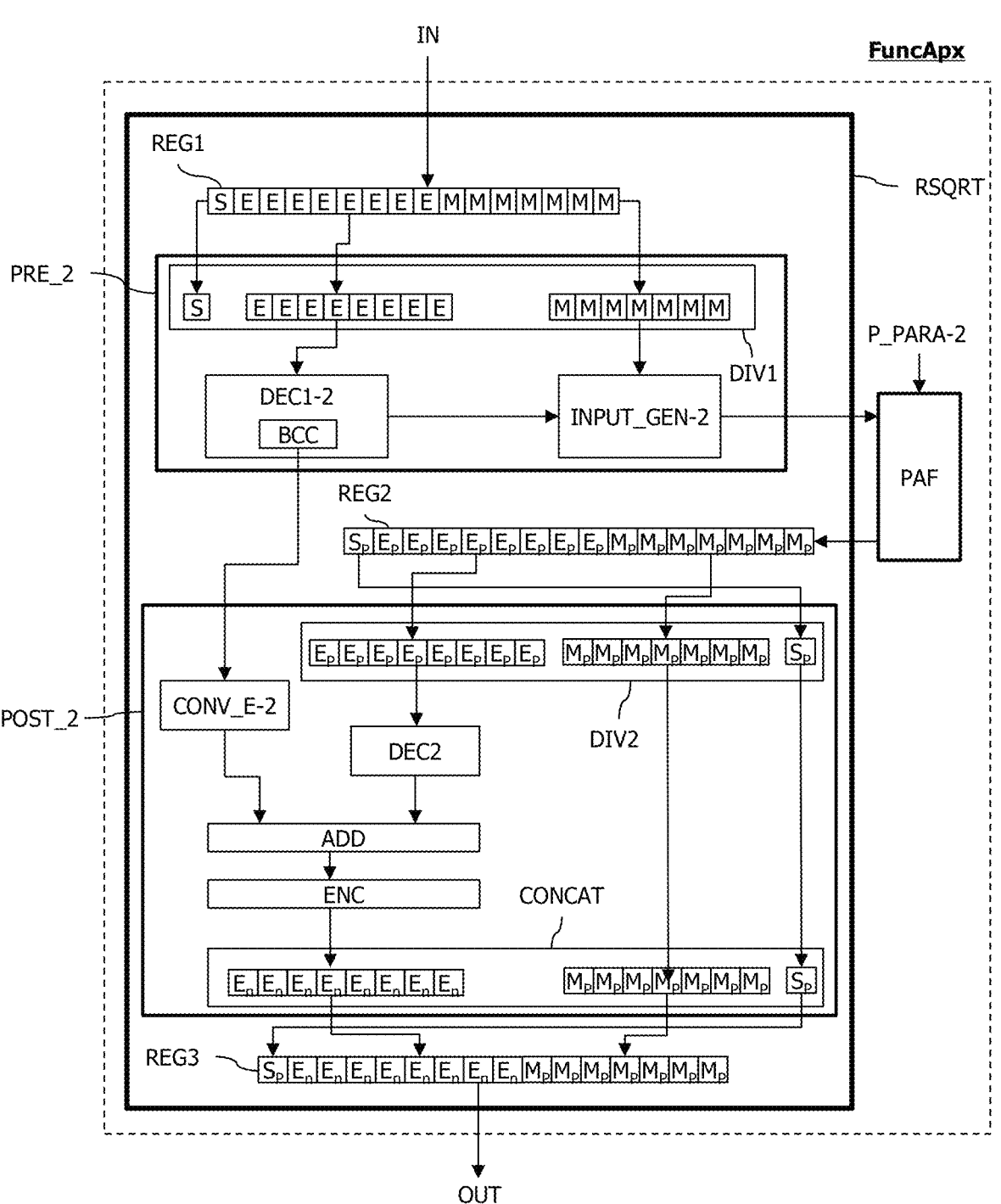
FIG. 31 is a diagram illustrating a detailed configuration of the reciprocal of a square root function processing circuit according to the sixth embodiment of the fourth example of the present disclosure.

The reciprocal of a square root function processing circuit according to the sixth embodiment of the fourth example of the present disclosure is also a hardware circuit configuration for a reciprocal of a square root operation implemented within the function approximation unit FuncApx of the neural processing unit NPU. The reciprocal of a square root function processing circuit is configured to utilize the programmable function approximation circuit PAF and the reciprocal of a square root function circuit RSQRT within the function approximation unit FuncApx to perform the reciprocal of a square root operation. FIG. 30 illustrates the overall configuration of the function approximation unit FuncApx including the reciprocal of a square root function processing circuit, and FIG. 31 illustrates the detailed configuration of the reciprocal of a square root function processing circuit.

Referring to FIG. 30, the neural processing unit NPU is configured to activate the programmable function approximation circuit PAF and the reciprocal of a square root function circuit RSQRT within the function approximation unit FuncApx to perform reciprocal of a square root function processing. The function approximation unit FuncApx is configured such that the input and output terminals of each circuit are electrically connected so that the programmable function approximation circuit PAF and the reciprocal of a square root function circuit RSQRT can communicate with each other.

As shown in FIG. 30, the data path for reciprocal of a square root function processing is connected to be input from an input value IN to the reciprocal of a square root function circuit RSQRT. The output of the reciprocal of a square root function circuit RSQRT is configured to be connected to the programmable function approximation circuit PAF. The output of the programmable function approximation circuit PAF is configured to be connected back to one of the input terminals of the reciprocal of a square root function circuit RSQRT. Through this, the reciprocal of a square root function processing circuit is set to process a reciprocal of a square root function calculation by performing an iterative process between the reciprocal of a square root function circuit RSQRT and the programmable function approximation circuit PAF. The final output of the reciprocal of a square root function circuit RSQRT is configured to be output as an output value OUT.

In an embodiment, when the reciprocal of a square root function circuit RSQRT and the programmable function approximation circuit PAF are activated, other dedicated operation circuits within the function approximation unit FuncApx, such as the reciprocal function circuit RECIP and the negative exponential function circuit NEXP, may be configured to be deactivated. The function approximation unit FuncApx is configured to reduce the power consumption of the deactivated circuits using at least one of power gating, clock gating, and register retention functions.

FIG. 31 is a diagram illustrating a detailed configuration of a reciprocal of a square root function processing circuit according to a sixth embodiment of the fourth example of the present disclosure.

FIG. 31 is a block diagram illustrating a detailed configuration of a reciprocal of a square root function processing circuit RSQRT. The reciprocal of a square root function processing circuit is a combination of dedicated operation circuits designed to generate an output value OUT representing an approximate value of the reciprocal of the square root of an input value IN in a floating-point format. The input value IN has a floating-point format composed of a sign bit S, exponent bits E, and mantissa bits M, and may have a BF16 format as an example, but the present disclosure is not limited thereto. The reciprocal of a square root function processing circuit is configured to obtain a reciprocal of a square root value by separating and individually processing the exponent bits E and the mantissa bits M constituting the input value IN, and then combining the processed results.

The reciprocal of a square root function processing circuit is designed to have a pipeline structure for hardware acceleration, and for this purpose, it is configured to include registers (input register REG1, intermediate register REG2, output register REG3) that store the intermediate results of each processing stage. The configuration of each of the registers REG1, REG2, and REG3 may correspond to the bit width of the number format of the input data. For example, if the input data is BF16, the corresponding register may be configured as a 16-bit buffer.

This is differentiated from conventional approximation methods that require a large number of instructions and operation cycles by implementing them based on the sequential execution of computer program instructions.

The reciprocal of a square root function processing circuit RSQRT may include a plurality of registers REG1, REG2, and REG3, a preprocessing circuit PRE_2, and a postprocessing circuit POST_2.

The input register REG1 is configured to function as an input buffer that temporarily stores an input value IN input from the outside. The input register REG1 is arranged to correspond to the input of the first stage of the pipeline.

The preprocessing circuit PRE_2 is configured to convert the input value IN stored in the input register REG1 into a form suitable for reciprocal of a square root function calculation. The preprocessing circuit PRE_2 is configured to include a first decomposition circuit DIV1, a first decoder DEC1-2, and an input value generation circuit INPUT_GEN-2. The first decomposition circuit DIV1 is configured to separate the sign bit S, the exponent bits E, and the mantissa bits M from the input value IN. The preprocessing circuit PRE_2 is configured to convert the input value IN stored in the input register REG1 into a form suitable for reciprocal of a square root function calculation to reduce the approximation error.

The first decoder DEC1-2 is configured to receive the exponent bits E separated from the first decomposition circuit DIV1, decode them into an integer data form, and subtract a bias from the decoded exponent bits E using a built-in binary calculation circuit BCC. The binary calculation circuit BCC is configured to process at least binary subtraction.

The first decoder DEC1-2 may be configured to select a bias value (e.g., 127 for even, 126 for odd in the case of BF16) according to whether the decoded exponent bits E are even or odd. This conditional bias selection is to reduce the rounding error that may occur when processing a square root operation (division) as a bit shift operation in the subsequent exponent conversion circuit CONV_E-2.

As a result, the first decoder DEC1-2 represents the actual value of the input exponent bits E (i.e., an exponent value with the bias removed), and is configured to prepare for use in operations by transmitting it to the subsequent exponent conversion circuit CONV_E-2 and the input value generation circuit INPUT_GEN-2. The function approximation unit FuncApx may include a selector or a multiplexer for this conditional bias selection, and the bias value may be determined according to the number format of the input value IN and stored in a memory or a register.

The input value generation circuit INPUT_GEN-2 is configured to receive the mantissa bits M separated from the first decomposition circuit DIV1 and generate a value in a floating-point format that can be processed by the programmable function approximation circuit PAF.

Specifically, the input value generation circuit INPUT_GEN-2 generates an input value in a floating-point number format by combining the mantissa bits M, exponent bits corresponding to whether the input exponent E received from the first decoder DEC1-2 is even or odd, and a sign bit set to 0. The value input to the exponent bits is 127 if the input exponent is even, and 128 if it is odd. This exponent bit setting is to effectively map the mantissa part to a range of $1 \leq M < 4$ according to whether the original input exponent is odd/even. In particular, if the original exponent is odd, the mantissa is doubled (e.g., 2M) to make the effective range [2, 4], thereby converting the exponent to an even number to reduce the rounding error that may occur when processing the division by a bit shift operation during the square root operation.

In this way, the input value generation circuit INPUT_GEN-2 uses the mantissa bits M in the floating-point format to convert it into a floating-point value mapped to a range of 1 to 4 that can be used for operations by the programmable function approximation circuit PAF. The converted value is connected to the input of the programmable function approximation circuit PAF, and as a result, the mantissa bits M of the generated floating-point value are always placed in the range of 1 to 4. This is to reduce the approximation error in the subsequent programmable function approximation circuit PAF by moving the input range subject to function approximation to a domain where the variation of the function value is small.

The programmable function approximation circuit PAF is configured to receive the value in the floating-point format converted from the input value generation circuit INPUT_GEN-2 and execute a programmed activation function to generate an approximation result of the reciprocal of a square root function. The programmable function approximation circuit PAF is configured to use a programmable parameter P_PARA-2 configured to approximate a reciprocal of a square root function corresponding to a specific input section of 1 to 4.

The programmable parameter P_PARA-2 may be a value derived through deep learning-based learning, according to an embodiment of the present disclosure.

Specifically, the programmable parameter P_PARA-2 may be a coefficient derived by learning to approximate a target function using a small-scale artificial neural network improved for representing a piecewise linear function. In the case of the reciprocal of a square root function circuit RSQRT, since the mantissa part is normalized to a range of [1, 4) according to whether the input exponent part is odd/even in the preprocessing process, the target function for learning can be set to $f(x)=1/\sqrt{x}$, and its domain of definition can be set to $x \in [1, 4)$.

The artificial neural network is learned in a direction that reduces the error with the target function within such a predictable section with small variation. Once learning is complete, an optimal programmable parameter set including a segment boundary value, the width of each segment, and the slope A and offset B of the corresponding section in a form that can be directly used by the programmable function approximation circuit PAF in hardware can be generated from the learned weights and biases of the neural network. This method makes it possible to derive the most effective parameters that reduce the approximation error of the reciprocal function within limited hardware resources.

In particular, this process has the advantage of being able to derive a programmable parameter P_PARA-3 that performs the most precise approximation within a given hardware resource by enabling hardware-software co-optimization that reflects the hardware constraints of the programmable function approximation circuit PAF (e.g., the maximum number of comparators) in the learning process.

That is, the programmable function approximation circuit PAF is configured to receive a programmable parameter P_PARA-2 that programs a reciprocal of a square root function. The programmable function approximation circuit PAF is configured to effectively reduce the approximation error compared to the case of approximating over a wide input range by performing function approximation in a range of 1 to 4 where the function value variation is small. The programmable function approximation circuit PAF may utilize a fixed-point operation to perform function approximation internally, and in this case, it may be configured to include a process of converting a floating-point input to a fixed-point number and converting it back to a floating-point format after the operation. The output of the programmable function approximation circuit PAF is connected to be transmitted to the intermediate register REG2. A detailed description of processing a programmed activation function using the programmable function approximation circuit PAF refers to FIG. 21 to FIG. 25.

The post-processing circuit POST_2 may include an exponent conversion circuit CONV_E-2, a second decomposition circuit DIV2, a second decoder DEC2, an adder ADD, an encoder ENC, and a concatenation circuit CONCAT.

The exponent conversion circuit CONV_E-2 is configured to receive the exponent bits E decoded from the first decoder DEC1-2, convert the sign of the corresponding value to a negative number, and then output a value divided by 2. This is to calculate a reciprocal of a square root scaling value corresponding to the exponent part, according to the mathematical property of the reciprocal of a square root function $(\text{rsqrt}(x))$ $(\text{rsqrt}(2^E)=2^{(-E/2)}$ or $2^{-(E-1)/2})$. Specifically, the exponent conversion circuit CONV_E-2 is configured to divide the input exponent value by 2 and apply a minus sign to generate an output value. Through the improved bias selection according to whether the exponent bits E are even or odd in the first decoder DEC1-2, the CONV_E-2 may be configured to perform this division without a rounding error through an efficient bit-shift operation. The output of the exponent conversion circuit CONV_E-2 is configured to be connected to the first input of the adder ADD.

The second decomposition circuit DIV2 is configured to receive the output value (approximation result) of the programmable function approximation circuit PAF through the intermediate register REG2 and separate the sign bit $S_p$, the exponent bits $E_p$, and the mantissa bits $M_p$ of the operation result. The bits $S_p$ and $M_p$ separated from the second decomposition circuit DIV2 are configured to be transmitted to the concatenation circuit CONCAT via the intermediate register REG2, and the exponent bits $E_p$ are connected to be transmitted to the second decoder DEC2.

The second decoder DEC2 is configured to receive the exponent bits $E_p$ separated from the second decomposition circuit DIV2, decode them into an integer data form, and then subtract a bias. Here, the integer value of the bias is 127. By decoding, the actual value of the exponent bits $E_p$ (i.e., a fixed-point exponent value in integer form with the bias removed) can be represented. That is, the second decoder DEC2 is configured to decode the exponent bits $E_p$ of the reciprocal of the square root function approximated in the programmable function approximation circuit PAF to an actual value by subtracting a bias. The output of the second decoder DEC2 may be configured to be connected to the second input unit of the adder ADD.

The adder ADD is configured to obtain exponent bits of an integer value with the bias removed by adding the values input from the first input unit and the second input unit. The adder ADD is a circuit configured to receive two binary input values and process a binary addition operation. That is, by adding the decoded exponent bits input to each of the first input unit and the second input unit of the adder ADD, the output of the adder ADD is configured to be restored to the initial range of the input value IN. That is, the exponent part of the final result can be determined by subtracting the offset (the difference between the input exponent and the bias) obtained from the initial input exponent from the exponent obtained through the reciprocal calculation of the mantissa part. The output of the adder ADD is connected to the encoder ENC, and the output of the adder ADD is configured to be transmitted to the encoder ENC.

The encoder ENC is configured to generate encoded exponent bits $E_n$ by adding a predefined bias (e.g., 127) value back to the unbiased exponent value, which is the output of the adder ADD. That is, the encoder ENC is configured to perform the role of restoring the exponent bits to a format suitable for the floating-point system by adding back the bias that was removed during the decoding process. The output of the encoder ENC is configured to be connected to the concatenation circuit CONCAT.

The concatenation circuit CONCAT is configured to combine the encoded exponent bits $E_n$ input from the encoder ENC and the sign bit $S_p$ and the mantissa bits $M_p$ of the second decomposition circuit DIV2 input through the intermediate register REG2 in a preset order. Through this, a bit string in a floating-point format corresponding to the final approximate value of the corresponding function is processed to be generated. The output of the concatenation circuit CONCAT is connected to be transmitted to the output register REG3.

The output register REG3 is configured to function as an output buffer that stores the output of the concatenation circuit CONCAT. The output register REG3 is arranged as the final stage of the pipeline.

The reciprocal of a square root function calculation process can be described by three calculation paths.

A first calculation path is configured to include circuits (e.g., an exponent processing part of the preprocessing circuit PRE_2, and an exponent conversion circuit CONV_E-2) arranged to decode the exponent bits E extracted from the input value IN and perform a reciprocal of a square root conversion on the decoded value based on whether the exponent bits are odd or even. The output of this path is provided to the first input of the adder ADD.

A second calculation path is configured to include circuits (e.g., a mantissa processing part of the preprocessing circuit PRE_2, the programmable function approximation circuit PAF, the second decomposition circuit DIV2, and the second decoder DEC2) arranged to convert the mantissa bits M extracted from the input value IN into an input for the programmable function approximation circuit PAF based on whether it is odd or even, calculate a linear function approximate value of the reciprocal of a square root function in the programmable function approximation circuit PAF, and decode the exponent bits $E_p$ extracted from the linear function approximate value. The output of the second decoder DEC2 is provided to the second input of the adder ADD, and the output $(S_p, M_p)$ of the second decomposition circuit DIV2 is provided to the concatenation circuit CONCAT.

A third calculation path is configured to include circuits (e.g., the adder ADD, the encoder ENC, and the concatenation circuit CONCAT) arranged to calculate the output value OUT of the input value IN (i.e., the reciprocal of the square root value of the input value) by adding the output value of the first calculation path (i.e., the output value of the exponent conversion circuit CONV_E-2) and the output value of the second calculation path (i.e., the output value of the second decoder DEC2), and combining the encoded exponent bits $E_n$, the mantissa bits $M_p$ of the linear function approximate value, and the sign bit $S_p$ in a preset order.

The reciprocal of a square root function processing circuit is designed to have a pipeline structure by arranging registers (input register REG1, intermediate register REG2, output register REG3) between each operation stage. The pipeline structure is configured to provide a hardware acceleration effect that greatly improves the total number of operations that can be processed per unit time (throughput) while maintaining the completion time (latency) of individual operations, by allowing several reciprocal of a square root calculation tasks to be processed simultaneously at different stages of the circuit. This is differentiated from conventional approximation methods that require a large number of instructions and operation cycles by implementing them based on the sequential execution of computer program instructions. In the reciprocal of a square root function processing circuit of the present disclosure, when an input parameter required for a function operation (e.g., an input value IN) is provided to the input register REG1, the necessary calculations are automatically performed in dedicated hardware blocks corresponding to each operation stage (PRE_2, DIV1, DEC1-2, INPUT_GEN-2, CONV_E-2, PAF, DIV2, DEC2, ADD, ENC, CONCAT, etc.), and a separate instruction for controlling the operation of the intermediate stage is not required. That is, once the input data enters the pipeline, each operation stage proceeds sequentially according to the hard-wired connection of the hardware itself and the data flow by the registers, so that a high-speed pipeline operation is performed.

According to the configuration, a reciprocal of a square root function can be calculated at high speed by activating only the hard-wired dedicated operation circuits (the circuits constituting the reciprocal of a square root function circuit RSQRT and the programmable function approximation circuit PAF). In particular, when the reciprocal of a square root function processing circuit uses the programmable function approximation circuit PAF together, it is configured to reduce the approximation error over a wider input range than when using only the programmable function approximation circuit PAF. Other dedicated circuits, such as the reciprocal function circuit RECIP or the negative exponential function circuit NEXP, which are not used in the reciprocal of a square root function calculation, are configured to be deactivated, thereby efficiently reducing the power consumption of the neural processing unit NPU.

The reciprocal of a square root function processing circuit according to the sixth embodiment of the fourth example of the present disclosure proposes a dedicated hardware accelerator to overcome the limitations of the operation cycle of the existing software instruction-based approximation method. In particular, to efficiently process complex floating-point operations, it adopts a division processing and pipeline structure based on the characteristics of the input data (exponent part and mantissa part).

The pipeline structure of the circuit is implemented with dedicated hardware for each stage of operation, so that once data enters the pipeline, it is processed along a continuous hardware flow. This eliminates the overhead of fetching, decoding, and executing a separate instruction for each arithmetic or logical operation in a conventional processor, which can dramatically improve the processing speed of the reciprocal function operation.

In addition, the reciprocal of a square root function processing circuit effectively reduces the approximation error that occurs in the piecewise approximation method by pre-mapping the input mantissa to a range favorable for function approximation. Through this, a reciprocal of a square root function approximate value with high accuracy can be provided even with limited hardware resources.

The reciprocal of a square root function processing circuit includes a power management function that selectively activates only the necessary dedicated operation circuits and deactivates the remaining circuits. Through this, it can contribute to improving the energy efficiency of the entire system by providing high-performance operations and at the same time reducing unnecessary power consumption.

Figure 32:
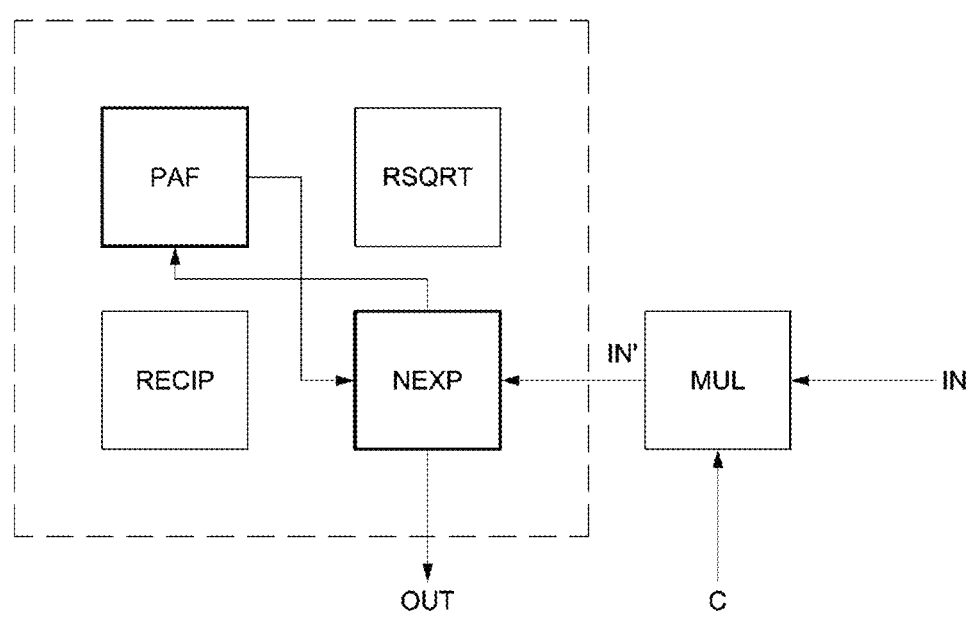
FIG. 32 is a block diagram illustrating a negative exponential function processing circuit according to a seventh embodiment of the fourth example of the present disclosure.

FIG. 32 is a block diagram illustrating a negative exponential function processing circuit according to a seventh embodiment of the fourth example of the present disclosure.

Figure 33:
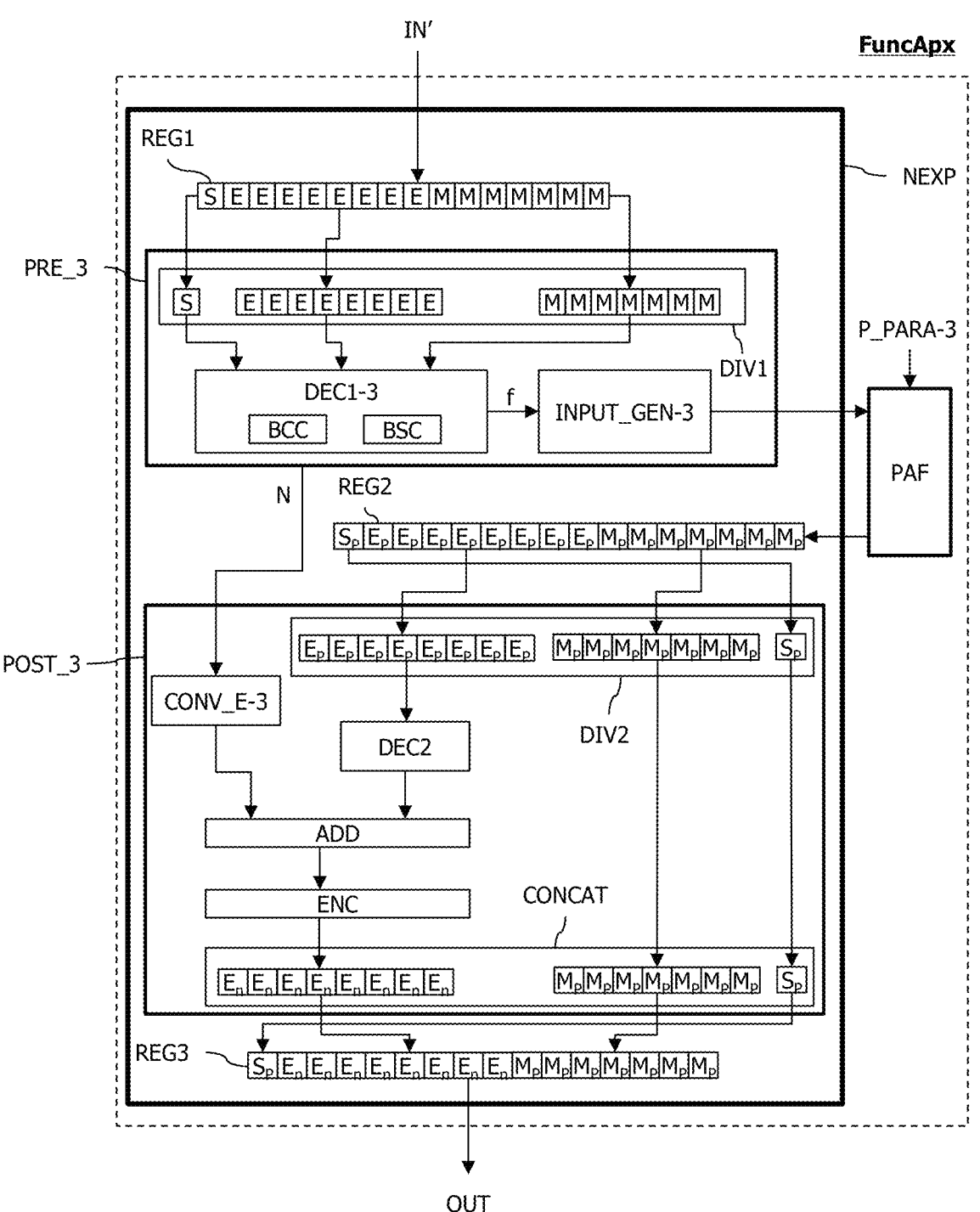
FIG. 33 is a diagram illustrating a detailed configuration of the negative exponential function processing circuit according to the seventh embodiment of the fourth example of the present disclosure.

The negative exponential function processing circuit according to the seventh embodiment of the fourth example of the present disclosure is also a hardware circuit configuration for a negative exponential operation implemented within the function approximation unit FuncApx of the neural processing unit NPU. The negative exponential function processing circuit is configured to utilize the programmable function approximation circuit PAF and the negative exponential function circuit NEXP within the function approximation unit FuncApx to perform the negative exponential operation. FIG. 32 illustrates the overall configuration of the function approximation unit FuncApx and a preprocessing device including the negative exponential function processing circuit, and FIG. 33 illustrates the detailed configuration of the negative exponential function processing circuit.

Referring to FIG. 32, the neural processing unit NPU is configured to activate the programmable function approximation circuit PAF and the negative exponential function circuit NEXP within the function approximation unit FuncApx to perform negative exponential function processing. The function approximation unit FuncApx is configured such that the input and output terminals of each circuit are electrically connected so that the programmable function approximation circuit PAF and the negative exponential function circuit NEXP can communicate with each other.

The negative exponential function processing circuit is configured to further include a multiplication unit MUL for preprocessing an input value IN. Here, the multiplication unit MUL may correspond to one of the multiplication unit V_MUL of the vector core V_CORE and the multiplication unit S_MUL of the scalar core S_CORE of the special function unit SFU, shown in FIG. 5 or FIG. 6. The multiplication unit MUL is configured to provide a preprocessed input value IN' calculated by multiplying the input value IN by a preset constant value (C, for example, log 2(e)) to the negative exponential function circuit NEXP.

As shown in FIG. 32, the data path for negative exponential function processing is connected to be input from the preprocessed input value IN' to the negative exponential function circuit NEXP. The output of the negative exponential function circuit NEXP may be configured to be connected to the programmable function approximation circuit PAF. The output of the programmable function approximation circuit PAF may be configured to be connected back to one of the input terminals of the negative exponential function circuit NEXP. Through this, the negative exponential function processing circuit may be set to process a negative exponential function calculation by performing an iterative process between the negative exponential function circuit NEXP and the programmable function approximation circuit PAF. The final output of the negative exponential function circuit NEXP may be configured to be output as an output value OUT.

In an embodiment, when the negative exponential function circuit NEXP and the programmable function approximation circuit PAF are activated, other dedicated operation circuits within the function approximation unit FuncApx, such as the reciprocal function circuit RECIP and the reciprocal of a square root function circuit RSQRT, may be configured to be deactivated. The function approximation unit FuncApx may be configured to reduce the power consumption of the deactivated circuits using at least one of power gating, clock gating, and register retention functions.

The negative exponential function utilized in the negative exponential function circuit NEXP can be expressed by the formula as shown in Equation 6.

$$y=e^{-x}=2^{-x*log2e}\approx2^{-1.442695*x}=2^{-c*x}=2^{-x'}=2^{-N}*2^{-f} \qquad \text{Equation 6}$$

where x is the input value IN of the multiplication unit MUL, x' is the preprocessed input value IN' input to the negative exponential function circuit NEXP, y is the output value OUT of the negative exponential function circuit NEXP, log 2(e) is the preset constant value C input to the multiplication unit MUL, N is the integer part of the preprocessed input value IN', and f is the fractional part of the preprocessed input value IN'. By applying the preset constant value C, the preprocessed input value IN' can be separated into an integer part N and a fractional part f, which can facilitate the hardware implementation of the negative exponential function circuit NEXP. Here, the preset constant value C is, for example, 1.442695, and the precision of the preset constant value C can be appropriately adjusted. For example, the preset constant value C may also be set to 1.443.

FIG. 33 is a diagram illustrating a detailed configuration of a negative exponential function processing circuit according to a seventh embodiment of the fourth example of the present disclosure.

FIG. 33 is a block diagram illustrating a detailed configuration of a negative exponential function processing circuit NEXP. The negative exponential function processing circuit is a combination of dedicated operation circuits designed to generate an output value OUT representing an approximate value of the negative exponential function of an input value IN. The preprocessed input value IN', which is the result of preprocessing the input value IN, has a floating-point format composed of a sign bit S, exponent bits E, and mantissa bits M, and may have a BF16 format as an example, but the present disclosure is not limited thereto. The negative exponential function processing circuit is configured to obtain a negative exponential function value by separating and individually processing the exponent bits E and the mantissa bits M constituting the preprocessed input value IN', and then combining the processed results.

The negative exponential function processing circuit is designed to have a pipeline structure for hardware acceleration, and for this purpose, it is configured to include registers (input register REG1, intermediate register REG2, output register REG3) that store the intermediate results of each processing stage. The configuration of each of the registers REG1, REG2, and REG3 may correspond to the bit width of the number format of the input data. For example, if the input data is BF16, the corresponding register may be configured as a 16-bit buffer.

This is differentiated from conventional approximation methods that require a large number of instructions and operation cycles by implementing them based on the sequential execution of computer program instructions.

The negative exponential function processing circuit NEXP may include a plurality of registers REG1, REG2, and REG3, a preprocessing circuit PRE_3, and a post-processing circuit POST_3.

The input register REG1 is configured to function as an input buffer that temporarily stores a preprocessed input value IN' input from the outside. The input register REG1 is arranged to correspond to the input of the first stage of the pipeline.

The preprocessing circuit PRE_3 is configured to include a first decomposition circuit DIV1, a first decoder DEC1-3, and an input value generation circuit INPUT_GEN-3.

The preprocessing circuit PRE3 is configured to efficiently calculate an approximate value of $e^{-x}$ for the input value IN. To this end, first, the input value IN is multiplied by a preset constant $\log_2(e)$ through a multiplication unit MUL to generate a preprocessed input value IN' (i.e., IN'=IN·$\log_2$e).

The preprocessing circuit PRE3 converts the preprocessed input value IN' into a form suitable for negative exponential function approximation. Specifically, $e^{-IN}$ is converted into an exponential form with a base of 2 and expressed as $e^{-IN}=2^{-IN·\log_2 e}$, where the exponent part x·$\log_2$e is decomposed into an integer part N and a fractional part f That is, it can be expressed as x·$\log_2$e=N+f (where $0 \leq f < 1$). In particular, the error in the subsequent approximation circuit can be effectively reduced by limiting the fractional part f to a specific range ($0 \leq f < 1$). Therefore, the Equation $e^{-x}=2^{-x·\log_2 e}$ can be converted as $e^{-x}=2^{-(N+f)}=2^{-N}·2^{-f}$. Therefore, $2^{-N}$ is configured to be processed independently in the exponent conversion circuit CONV_E-3, and $2^{-f}$ is configured to be processed independently in the programmable function approximation circuit PAF.

That is, the preprocessing circuit PRE_3 is configured to convert the preprocessed input value IN' stored in the input register REG1 into a form suitable for negative exponential function approximation, that is, by separating it into an integer part N and a fractional part f for approximation. This conversion facilitates the hardware implementation of the negative exponential function and is configured to effectively reduce the approximation error in the subsequent programmable function approximation circuit PAF by mapping the significant digits (fractional part f) of the preprocessed input value IN' to a fixed small range. The preprocessing circuit PRE_3 is configured to include a first decomposition circuit DIV1, a first decoder DEC1-3, and an input value generation circuit INPUT_GEN-3.

The first decomposition circuit DIV1 is configured to separate the sign bit S, the exponent bits E, and the mantissa bits M from the preprocessed input value IN'.

The first decoder DEC1-3 is configured to receive the exponent bit E and the mantissa bit M separated from the first decomposition circuit DIV1, and separate the preprocessed input value IN' into an integer part N and a fractional part f by utilizing a built-in binary calculation circuit BCC and a bit shifter circuit BSC. The binary calculation circuit BCC processes at least a binary subtraction operation, and the bit shifter circuit BSC facilitates the extraction of the integer part N through bit left and right shift operations. That is, the first output of the first decoder DEC1-3 is configured to output the integer part N, and the second output is configured to output the fractional part f.

The preprocessed input value IN' can be expressed as shown in Equation 7.

$$x'=N+f \qquad \text{Equation 7}$$

where x' is the preprocessed input value IN', N is the integer part of the preprocessed input value IN', and f is the fractional part of the preprocessed input value IN'.

Calculation of the integer part N of the first decoder DEC1-3: The first decoder DEC1-3 is configured to calculate the unbiased exponent bits by processing a subtraction operation of the exponent bits E and a pre-stored bias. This operation is configured to be performed by the built-in binary calculation circuit BCC. For example, when the exponent bits E of the preprocessed input value IN' are $10000001_2$ ($129_{10}$) and the bias is $01111111_2$ ($127_{10}$), the unbiased exponent bits are calculated as $00000010_2$ ($2_{10}$). The exponent bit value is utilized to extract the integer part N in the bit shifter circuit BSC to be described later.

The calculation formula for the integer part N of the preprocessed input value IN' can utilize Equation 8.

$$N=(1<<E_u)+(M>>(M_{width}-E_u)) \qquad \text{Equation 8}$$

Where N is the integer part of the preprocessed input value IN', Eu is the unbiased exponent bits, $<<$ is a bit left shift operation, $>>$ is a bit right shift operation, M is the mantissa bits M of the preprocessed input value IN', and Mwidth is the bit width of the mantissa bits M.

To extract the integer part N, the first decoder DEC1-3 includes a bit shifter circuit BSC, and the bit shifter circuit BSC can efficiently multiply or divide by a power of 2 by processing bit left shift ($<<$) and bit right shift ($>>$) operations.

Calculation of the fractional part f of the first decoder DEC1-3: The first decoder DEC1-3 is configured to calculate the fractional part f by subtracting the calculated integer part N from the preprocessed input value IN'. The calculation formula for the fractional part f can utilize Equation 9.

$$f=x'-N \qquad \text{Equation 9}$$

Where f is the fractional part of the preprocessed input value IN', x' is the preprocessed input value IN', and N is the integer part of the preprocessed input value IN'. Here, the subtraction operation can be processed by the binary calculation circuit BCC.

For example, if the preprocessed input value IN' is 4.71875 and the integer part N is 4, the fractional part f becomes 0.71875. For the calculation, the preprocessed input value IN' may be converted into a fixed-point format.

According to the above-described circuit configuration, it can be directly processed by a dedicated calculation circuit without a software command composed of a plurality of instructions.

The input value generation circuit INPUT_GEN-3 is configured to receive the fractional part f from the first decoder DEC1-3 and generate a value in a floating-point format that can be processed by the programmable function approximation circuit PAF. This is to reduce the approximation error in the subsequent programmable function approximation circuit PAF by moving the input range subject to function approximation to a domain where the variation of the function value is small.

The programmable function approximation circuit PAF is configured to receive the value in the floating-point format (related to the fractional part f) converted from the input value generation circuit INPUT_GEN-3 and execute a programmed activation function to generate an approximation result ($2^{-f}$) for the fractional part of the negative exponential function. The programmable function approximation circuit PAF is configured to utilize a programmable parameter P_PARA-3 to approximate a negative exponential function of 2 ($2^{-x}$) corresponding to a specific input section of 0 or more and less than 1.

The programmable parameter P_PARA-3 may be a value derived through deep learning-based learning, according to an embodiment of the present disclosure.

Specifically, the programmable parameter P_PARA-3 may be a coefficient derived by learning to approximate a target function using a small-scale artificial neural network improved for representing a piecewise linear function. In the case of the negative exponential function circuit NEXP, since the fractional part f is extracted after the input value x is converted into an exponential form with a base of 2 in the preprocessing process, and this fractional part f always belongs to a stable range of [0, 1), the target function for learning can be set to f(x)=2', and its domain of definition can be set to $x \in [0, 1)$.

The artificial neural network is learned in a direction that reduces the error with the target function within such a predictable section with small variation. Once learning is complete, an optimal programmable parameter set including a segment boundary value, the width of each segment, and the slope A and offset B of the corresponding section in a form that can be directly used by the programmable function approximation circuit PAF in hardware can be generated from the learned weights and biases of the neural network. This method makes it possible to derive the most effective parameters that reduce the approximation error of the reciprocal function within limited hardware resources.

In particular, this process has the advantage of being able to derive a programmable parameter P_PARA-3 that performs the most precise approximation within a given hardware resource by enabling hardware-software co-optimization that reflects the hardware constraints of the programmable function approximation circuit PAF (e.g., the maximum number of comparators) in the learning process.

The programmable function approximation circuit PAF is configured to effectively reduce the approximation error compared to the case of approximating over a wide input range by performing function approximation in a range of 0 or more and less than 1 where the function value variation is small. The programmable function approximation circuit PAF may utilize a fixed-point operation to perform function approximation internally, and in this case, it may be configured to include a process of converting a floating-point input to a fixed-point number and converting it back to a floating-point format after the operation. The output of the programmable function approximation circuit PAF may be connected to be transmitted to the intermediate register REG2. A detailed description of processing a programmed activation function using the programmable function approximation circuit PAF refers to FIG. 21 to FIG. 25.

The post-processing circuit POST_3 may include an exponent conversion circuit CONV_E-3, a second decomposition circuit DIV2, a second decoder DEC2, an adder ADD, an encoder ENC, and a concatenation circuit CONCAT.

The exponent conversion circuit CONV_E-3 is configured to receive the integer part N separated from the first decoder DEC1-3 and output a value related to the negative power of 2 for the value $2^{-N}$. The output of the exponent conversion circuit CONV_E-3 is configured to be connected to the adder ADD. The second decomposition circuit DIV2 is configured to receive the output value (approximation result $2^{-f}$) of the programmable function approximation circuit PAF through the intermediate register REG2 and separate the sign bit $S_p$, the exponent bits $E_p$, and the mantissa bits $M_p$ of the operation result. The bits $S_p$ and $M_p$ separated from the second decomposition circuit DIV2 are configured to be transmitted to the concatenation circuit CONCAT via the intermediate register REG2, and the exponent bits $E_p$ are connected to be transmitted to the second decoder DEC2.

The second decoder DEC2 is configured to receive the exponent bits $E_p$ separated from the second decomposition circuit DIV2, decode them into an integer data form, and then subtract a bias (e.g., 127). By decoding, the actual value of the exponent bits $E_p$ (i.e., a fixed-point exponent value in integer form with the bias removed) can be represented. The output of the second decoder DEC2 may be configured to be connected to the adder ADD.

The intermediate register REG2 is configured to function as a register group that stores intermediate results including the output of the programmable function approximation circuit PAF and the output of the second decomposition circuit DIV2. The intermediate register REG2 is arranged to perform the role of buffering data that does not go through the exponent operation path (CONV_E-3, ADD, ENC) (e.g., the function approximation result itself and the sign/mantissa bits separated therefrom) before being transmitted to the subsequent stage (concatenation circuit CONCAT).

The adder ADD is configured to obtain exponent bits of an integer value with the bias removed by adding the values input from the first input unit and the second input unit. The adder ADD is a circuit configured to receive two binary input values and process a binary addition operation. That is, by adding the decoded exponent bits input to each of the first input unit and the second input unit of the adder ADD, the output of the adder ADD is configured to be restored to the initial range of the input value IN. That is, the adder ADD is configured to generate an exponent scaling value corresponding to the final negative exponential value by adding the value related to the integer part N ($2^{-N}$) from the exponent conversion circuit CONV_E-3 and the unbiased exponent bits $E_p$ (the value related to the fractional part f) from the second decoder DEC2. The output of the adder ADD is connected to the encoder ENC, and the output of the adder ADD is configured to be transmitted to the encoder ENC.

The encoder ENC is configured to generate encoded exponent bits $E_n$ by adding a predefined bias (e.g., 127)

value back to the unbiased exponent value, which is the output of the adder ADD. That is, the encoder ENC is configured to perform the role of restoring the exponent bits to a format suitable for the floating-point system by adding back the bias that was removed during the decoding process. The output of the encoder ENC is configured to be connected to the concatenation circuit CONCAT.

The concatenation circuit CONCAT is configured to combine the encoded exponent bits $E_n$ input from the encoder ENC and the sign bit $S_p$ and the mantissa bits $M_p$ of the second decomposition circuit DIV2 input through the intermediate register REG2 in a preset order. Through this, a bit string in a floating-point format corresponding to the final approximate value of the corresponding function is processed to be generated. The output of the concatenation circuit CONCAT is connected to be transmitted to the output register REG3.

The output register REG3 is configured to function as an output buffer that stores the output of the concatenation circuit CONCAT. The output register REG3 is arranged as the final stage of the pipeline.

The negative exponential function calculation process can be described by three calculation paths.

A first calculation path is configured to include circuits (e.g., an exponent processing part of the preprocessing circuit PRE_3, and an exponent conversion circuit CONV_E-3) arranged to receive the integer part N extracted from the preprocessed input value IN' and output a value related to the negative power of 2 for the value ($2^{-N}$). The output of this path is provided to the first input of the adder ADD.

A second calculation path is configured to include circuits (e.g., a mantissa processing part of the preprocessing circuit PRE_3, the programmable function approximation circuit PAF, the second decomposition circuit DIV2, and the second decoder DEC2) arranged to convert the fractional part f extracted from the preprocessed input value IN' into an input for the programmable function approximation circuit PAF, calculate an approximation result ($2^{-f}$) for the fractional part of the negative exponential function in the programmable function approximation circuit PAF, separate the exponent bits $E_p$ and the mantissa bits $M_p$ extracted from the approximation result, and decode the exponent bits $E_p$. The output of the second decoder DEC2 is provided to the second input of the adder ADD, and the output ($S_p$, $M_p$) of the second decomposition circuit DIV2 is provided to the concatenation circuit CONCAT via the intermediate register REG2.

A third calculation path is configured to include circuits (e.g., the adder ADD, the encoder ENC, and the concatenation circuit CONCAT) arranged to calculate the output value OUT corresponding to the negative exponential function value of the input value IN by adding the output value of the first calculation path (i.e., the output value of the exponent conversion circuit CONV_E-3) and the output value of the second calculation path (i.e., the output value of the second decoder DEC2), and combining the final encoded exponent bits $E_n$, the mantissa bits $M_p$ of the approximation result, and the sign bit $S_p$ in a preset order.

The negative exponential function processing circuit is designed to have a pipeline structure by arranging registers (input register REG1, intermediate register REG2, output register REG3) between each operation stage. The pipeline structure is configured to provide a hardware acceleration effect that greatly improves the total number of operations that can be processed per unit time (throughput) while maintaining the completion time (latency) of individual operations, by allowing several negative exponential function calculation tasks to be processed simultaneously at different stages of the circuit. This is differentiated from conventional approximation methods that require a large number of instructions and operation cycles by implementing them based on the sequential execution of computer program instructions. In the negative exponential function processing circuit of the present disclosure, when an input parameter required for a function operation (e.g., a preprocessed input value IN') is provided to the input register REG1, the necessary calculations are automatically performed in dedicated hardware blocks corresponding to each operation stage (PRE_3, DIV1, DEC1-3, INPUT_GEN-3, CONV_E-3, PAF, DIV2, DEC2, ADD, ENC, CONCAT, etc.), and a separate instruction for controlling the operation of the intermediate stage is not required. That is, once the input data enters the pipeline, each operation stage proceeds sequentially according to the hard-wired connection of the hardware itself and the data flow by the registers, so that a high-speed pipeline operation is performed.

According to the configuration, a negative exponential function can be calculated at high speed by activating only the hard-wired dedicated operation circuits (the circuits constituting the negative exponential function circuit NEXP and the programmable function approximation circuit PAF). In particular, when the negative exponential function processing circuit uses the programmable function approximation circuit PAF together, it is configured to reduce the approximation error over a wider input range than when using only the programmable function approximation circuit PAF. Other dedicated circuits, such as the reciprocal function circuit RECIP or the reciprocal of a square root function circuit RSQRT, which are not used in the negative exponential function calculation, are configured to be deactivated, thereby efficiently reducing the power consumption of the neural processing unit NPU.

Figure 34:
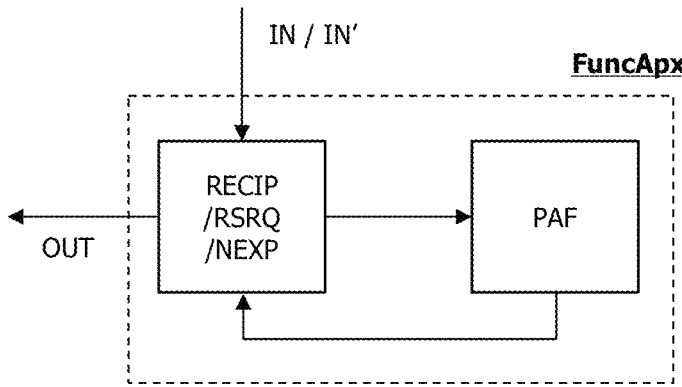
FIG. 34 is a block diagram illustrating a function approximation unit according to an eighth embodiment of the fourth example of the present disclosure.

FIG. 34 is a block diagram illustrating a function approximation unit FuncApx according to an eighth embodiment of the fourth example of the present disclosure.

As can be seen with reference to FIG. 34, according to the eighth embodiment of the fourth example of the present disclosure, the reciprocal function circuit RECIP, the reciprocal of a square root function circuit RSQRT, and the negative exponential function circuit NEXP within the function approximation unit FuncApx may be integrated into a single integrated circuit. According to a modified example, the function approximation circuit PAF may also be integrated into the single integrated circuit.

The description of the reciprocal function circuit RECIP will be based on the description with reference to FIG. 28 and FIG. 29, and will not be described redundantly. The description of the reciprocal of a square root function circuit RSQRT will be based on the description with reference to FIG. 30 and FIG. 31, and will not be described redundantly.

The description of the negative exponential function circuit NEXP will be based on the description with reference to FIG. 32 and FIG. 33, and will not be described redundantly.

Referring to FIG. 34, the function approximation unit FuncApx according to this embodiment may have a hybrid architecture in which functionally separated circuit blocks are organically interlocked to process a plurality of different nonlinear functions. The function approximation unit FuncApx may be configured to include a dedicated function processing unit (RECIP/RSRQ/NEXP) improved for processing the unique mathematical characteristics of specific functions, and a programmable function approximation circuit PAF that performs general-purpose approximation operations that can be commonly applied to various functions.

The dedicated function processing unit (RECIP/RSRQ/NEXP) may receive an input value IN from the outside and perform a pre-processing operation improved for the function to be processed. As an example, the pre-processing operation may include a process of separating the exponent and mantissa of the input value, and normalizing the mantissa to a specific range that is easy for function approximation. The preprocessed result may be transmitted to the programmable function approximation circuit PAF.

The programmable function approximation circuit PAF may perform a core piecewise function approximation operation based on a pre-loaded programmable parameter set, using the preprocessed data received from the dedicated function processing unit as input. The intermediate approximation value, which is the operation result of the PAF, may be fed back to the dedicated function processing unit.

The dedicated function processing unit (RECIP, RSRQ, NEXP) may receive the intermediate approximation value fed back from the PAF and perform a post-processing process linked to the initial preprocessing process. In the post-processing process, a final output value OUT may be generated by finally combining the intermediate approximation value with other data separated during the preprocessing process (e.g., exponent information for scaling).

The operating method of the function approximation unit according to the eighth embodiment of the fourth example of the present disclosure may be as follows.

First, the function approximation unit may include a dedicated function processing unit (RECIP, RSRQ, NEXP) and a programmable function approximation circuit PAF, and may be configured such that an operation path passing through the two circuits is pipelined on-the-fly according to a single command from the outside.

When the operation starts, the dedicated function processing unit may receive an input value from the outside and generate a preprocessed result by performing a preprocessing operation improved for the function to be processed on the received input value. As an example, the preprocessing operation may include a step of separating the input value into an exponent part and a mantissa part, and normalizing the mantissa part to a specific range that is easy for function approximation.

Next, the preprocessed result may be transmitted to the programmable function approximation circuit. The programmable function approximation circuit may generate an approximated function output through a piecewise approximation operation using a pre-stored programmable parameter set, based on the preprocessed result.

Subsequently, the approximated function output may be fed back to the dedicated function processing unit.

Finally, the dedicated function processing unit may generate a final output value by performing a post-processing operation based on the fed-back function output. As an example, the post-processing operation may include a step of recombining the approximated function output with data separated during the preprocessing operation (e.g., exponent part information).

As such, this embodiment presents a conceptual structure of a flexible and scalable function approximation unit that can process various nonlinear functions while improving the efficiency of hardware resources by functionally separating and organically combining a function-specific processing part (dedicated function processing unit) and a general-purpose approximation operation part PAF. This structure may be particularly effective in accelerating specific nonlinear functions required in, for example, the attention operation of a neural network model.

As such, this embodiment may have a technical feature in that it presents a new hybrid architecture in which two circuits operate organically by feeding back to each other, going beyond simply arranging a dedicated function processing unit improved for specific function processing and a programmable function approximation circuit capable of responding to various functions in parallel. That is, through a series of processes in which the dedicated function processing unit analyzes the characteristics of the input value and converts it into a form that is easy to approximate, the programmable function approximation circuit performs the core operation, and the result is finally corrected by the dedicated function processing unit, it may have the effect of simultaneously improving the operational efficiency and approximation accuracy, which were difficult to achieve with conventional technology.

Figure 35:
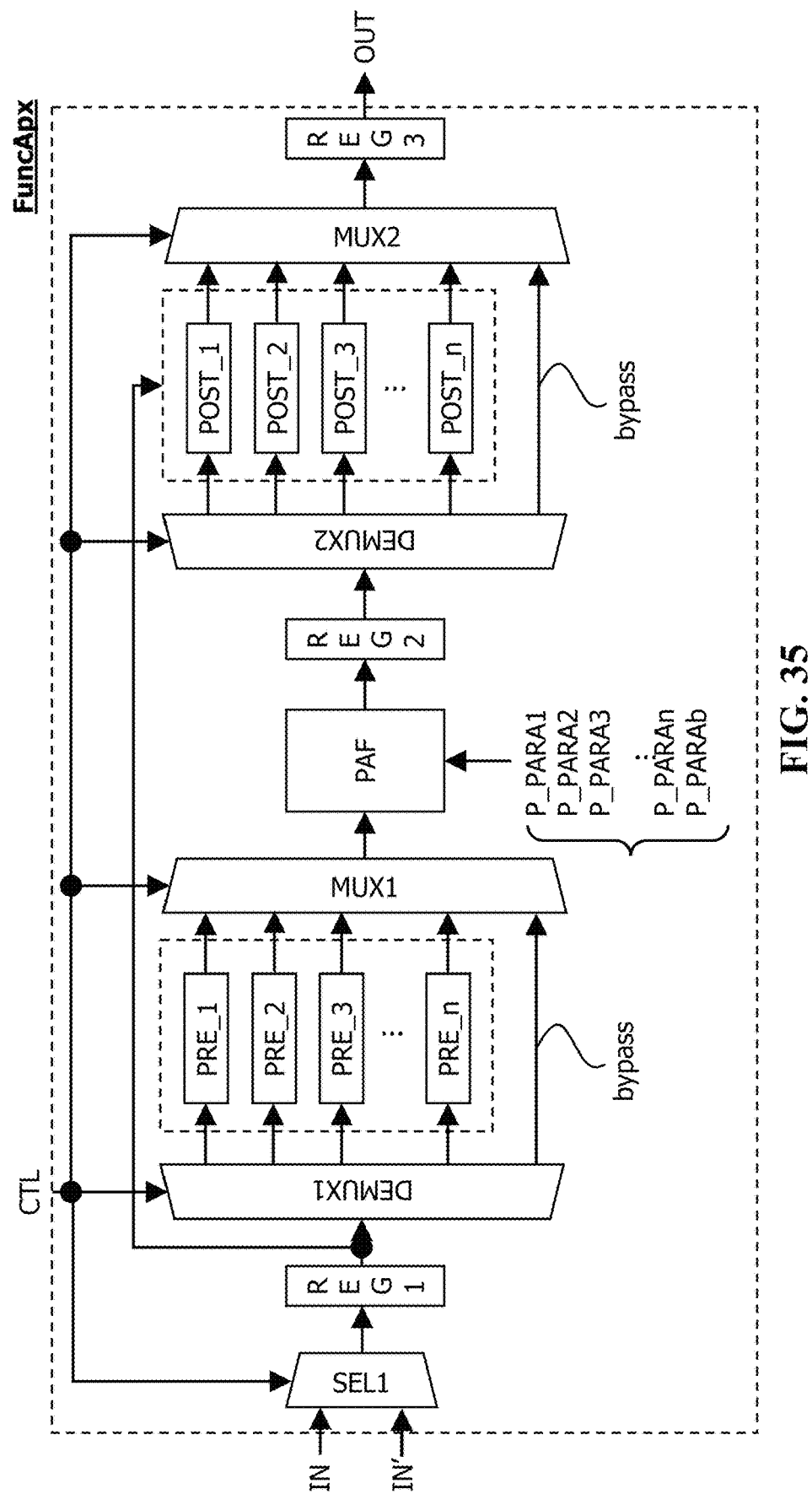
FIG. 35 is a diagram illustrating a detailed circuit configuration of a function approximation unit according to a ninth embodiment of the fourth example of the present disclosure.

FIG. 35 is a diagram illustrating a detailed circuit configuration of a function approximation unit according to a ninth embodiment of the fourth example of the present disclosure.

Referring to FIG. 35, the function approximation unit FuncApx according to this embodiment may have a flexible and reconfigurable pipeline structure that integrates individual circuits for processing a plurality of nonlinear functions and improves the efficiency of hardware resources by sharing major operation circuits. The operating mode of the function approximation unit FuncApx for processing a specific function may be determined by one or more control signals CTL.

As shown in FIG. 35, the function approximation unit FuncApx may include a data path that receives input signals (IN or IN') from the left and outputs a final output OUT to the right. The data path may be configured to include a selector SEL1, a plurality of registers (REG1, REG2, REG3), a plurality of multiplexers and demultiplexers (DEMUX1, MUX1, DEMUX2, MUX2), a plurality of preprocessing and post-processing circuit blocks, and a programmable function approximation circuit PAF.

Functionally, the structure may form a flexible pipeline in which the data path is dynamically reconfigured by the control signal set CTL. The CTL can control each switching circuit according to the function to be processed to set an optimal path in which the input signal sequentially passes through a specific preprocessing circuit, a programmable function approximation circuit, and a post-processing circuit, or bypasses some circuits as needed. Through this, it may have the effect of achieving both the efficiency of hardware resources and the flexibility of operations by having the main operation unit, the programmable function approximation circuit PAF, shared by several different function operations, while also going through pre-/post-processing processes specialized for each function.

The input path may include a selector SEL1 and an input register REG1. The selector SEL1 may be configured to select one of a main input IN from the outside or a pre-processed input IN' according to a CTL signal and transmit it to the input register REG1. As an example, the IN' path may be used when external preprocessing is required for a specific function operation. The input register REG1 may be configured to temporarily store the selected input value as the first stage of the pipeline.

The preprocessing path may include a first demultiplexer DEMUX1 and a plurality of preprocessing circuits (PRE_1 to PRE_n). The first demultiplexer DEMUX1 may be configured to transmit the output of the input register REG1 to one of the plurality of preprocessing circuits improved for a specific function such as reciprocal RECIP, reciprocal of a square root RSQRT, negative exponential NEXP, etc., or to a bypass path when preprocessing is unnecessary, according to a CTL signal. Since the detailed configuration of each of the plurality of preprocessing circuits can be referred to in FIG. 29, FIG. 31, FIG. 33, etc., a duplicate description thereof will be omitted.

The function approximation path may include a first multiplexer MUX1 and a programmable function approximation circuit PAF. The first multiplexer MUX1 may be configured to select the output of the activated preprocessing circuit or the data of the bypass path according to a CTL signal and transmit it to the programmable function approximation circuit PAF. The PAF may be configured to perform an actual function approximation operation using the transmitted data and a programmable parameter set (P_PARA1 to P_PARAb) selected by the CTL. Since the detailed circuit configuration of the PAF has been described above with reference to FIG. 24 and FIG. 25, a duplicate description may be omitted.

The post-processing path may include an intermediate register REG2, a second demultiplexer DEMUX2, and a plurality of post-processing circuits (POST_1 to POST_n). The operation result of the PAF may be stored in the intermediate register REG2 and then transmitted to a post-processing circuit paired with the corresponding function or to a bypass path through the second demultiplexer DEMUX2. Since the detailed configuration of each of the plurality of post-processing circuits can be referred to in FIG. 29, FIG. 31, FIG. 33, etc., a duplicate description thereof will be omitted.

The output path may include a second multiplexer MUX2 and an output register REG3. The second multiplexer MUX2 may select the output of the activated post-processing circuit or the data of the bypass path as the final result according to a CTL signal, and the result may be configured to be output as the final output OUT via the output register REG3.

A function approximation unit according to an embodiment of the present disclosure may include an input register that receives and stores an input value, as shown in FIG. 35. A selector may be further disposed upstream of the input register to select one of a plurality of input sources according to a control signal and transmit it to the input register.

The function approximation unit may include a first demultiplexer that receives an input value from the input register and transmits it to a selected one of a plurality of preprocessing circuits or a first bypass path according to the control signal. The plurality of preprocessing circuits may each include a circuit improved for processing at least one of a reciprocal function, a reciprocal of a square root function, and a negative exponential function.

In addition, the function approximation unit may include a first multiplexer that receives an output from the first demultiplexer and transmits it to a programmable function approximation circuit according to the control signal. The programmable function approximation circuit may be configured to generate an approximated function output based on the output from the first multiplexer and a programmable parameter set selected according to the control signal. Here, the programmable parameter set may include a parameter set corresponding to each of the plurality of preprocessing circuits or a parameter set corresponding to the first bypass path.

The function approximation unit may include an intermediate register that stores the approximated function output. In addition, it may include a second demultiplexer that receives the output of the intermediate register and the output of the first multiplexer and transmits them to a selected one of a plurality of post-processing circuits or a second bypass path according to the control signal. The plurality of post-processing circuits may each be an improved circuit.

Finally, the function approximation unit may include a second multiplexer that selects a final output value from the output of the second demultiplexer according to the control signal, and an output register that stores the final output value from the second multiplexer.

An operating method of a function approximation unit having such a structure may be as follows. First, a step of selecting one of a plurality of input sources according to a control signal and determining it as an input value may be performed.

Thereafter, a step of transmitting the input value to a selected one of a plurality of preprocessing circuits or a first bypass path according to the control signal, and generating a preprocessing result corresponding to the input value by the selected preprocessing circuit, or transmitting the input value through the first bypass path may be performed.

Next, a step of generating an approximated function output based on the preprocessing result or the transmitted input value and a programmable parameter set selected according to the control signal may be performed.

Subsequently, a step of transmitting the approximated function output and the preprocessing result to a selected one of a plurality of post-processing circuits or a second bypass path according to the control signal, and generating a final output value in the selected post-processing circuit based on the approximated function output and the preprocessing result, or transmitting the approximated function output as the final output value through the second bypass path may be performed.

Here, the control signal may include a signal set that simultaneously sets a plurality of switching circuits in the function approximation unit according to a specific function mode to form a pipeline operation path on-the-fly.

A technical feature of this embodiment may lie in a method in which a single command to process a specific function from the outside is converted into a set of control signals CTL to control the entire function approximation unit. The CTL can form a dedicated pipeline for the corresponding function on-the-fly by simultaneously setting all internal switching circuits according to a specific function mode. Once an input value enters this pipeline, all preprocessing, approximation, and post-processing processes can be automatically and continuously processed along a hardware-connected path without additional instructions. According to this configuration, a complex nonlinear function operation can be processed at a single hardware instruction level, thereby reducing the overhead associated with instruction decoding and scheduling, and it may have the effect of performing fast function approximation with low power.

A technical feature of this embodiment may lie in the fact that a plurality of preprocessing circuits, post-processing circuits, and a programmable function approximation circuit that perform different functions are dynamically connected by a control signal set CTL, thereby implementing an operation as if a dedicated hardware pipeline for a specific function were formed in real time. This may have the effect of improving area efficiency by sharing hardware resources compared to a method of implementing all separate dedicated circuits for each function, and improving performance and power efficiency by enabling high-speed processing at a single instruction level compared to a method that relies on the sequential execution of software instructions. In addition, by having a bypass path, it can provide scalability to flexibly process general-purpose activation functions that do not require dedicated pre-/post-processing within a single integrated circuit.

In addition, a technical feature of the function approximation unit of the present disclosure may lie in the fact that it does not only function as an independent operation block, but can also operate in organic conjunction with other operation circuits within the special function unit (SFU). As an example, as shown in FIG. 32 and FIG. 35, a pre-processed input IN' from an external multiplier MUL can be received when processing a negative exponential NEXP function. This may mean processing a complex function operation in a pipelining or task offloading manner that sequentially allocates it to the hardware most improved for each operation. This configuration may have the effect of improving the resource utilization of the entire special function unit and mitigating the bottleneck phenomenon of a specific operation, thereby improving the processing performance of the entire system, compared to a method of processing all operations within a single block.

The technical features of the examples of the present disclosure can be described as follows.

According to an embodiment of the present disclosure, an operating method of a function approximation unit configured to approximate a nonlinear function within a neural processing unit is provided, wherein the function approximation unit comprises an input register, a plurality of preprocessing circuits, a programmable function approximation circuit and a plurality of post-processing circuits. The method includes storing an input value through the input register; transmitting the input value to a selected one of the plurality of preprocessing circuits according to a control signal; generating a preprocessing result corresponding to the input value by the selected one of the plurality of preprocessing circuits; transmitting the preprocessing result to the programmable function approximation circuit and a selected one of the plurality of post-processing circuits; generating an approximated function output based on the preprocessing result in the programmable function approximation circuit; and generating a final output value by post-processing the preprocessing result or the approximated function output in the selected one of the plurality of post-processing circuits.

The plurality of preprocessing circuits include circuits for processing a reciprocal function, a reciprocal of a square root function, or a negative exponential function.

According to an embodiment of the present disclosure, the control signal has a length of two (2) bits and is used to select the selected one of the plurality of preprocessing circuits.

According to an embodiment of the present disclosure, the programmable function approximation circuit is configured to receive an output received from the plurality of preprocessing circuits through a multiplexer and perform an approximation operation according to the preprocessing result.

According to an embodiment of the present disclosure, the programmable function approximation circuit selectively receives one of a plurality of programmable parameter sets and performs an approximation operation on the preprocessing result.

According to an embodiment of the present disclosure, the function approximation unit includes an intermediate register that stores the preprocessing result and an output of the programmable function approximation circuit. The method includes transmitting an output of the intermediate register and an output of the plurality of preprocessing circuits to one of the plurality of post-processing circuits according to a control signal thereof.

According to an embodiment of the present disclosure, each of the plurality of preprocessing circuits includes a first decomposition circuit, a first decoder, and an input value generation circuit.

According to an embodiment of the present disclosure, each of the plurality of post-processing circuits includes an exponent conversion circuit, a second decomposition circuit, a second decoder, an adder, an encoder, and a concatenation circuit.

According to an embodiment of the present disclosure, the function approximation unit includes a demultiplexer for selecting one of the plurality of post-processing circuits according to a control signal thereof.

According to an embodiment of the present disclosure, the method further includes transmitting the final output value to an output register of the function approximation unit through a multiplexer and storing the final output value.

According to an embodiment of the present disclosure, the plurality of preprocessing circuits and the plurality of post-processing circuits are variably configured according to a function type.

According to an embodiment of the present disclosure, a function approximation device configured to approximate a nonlinear function within a neural processing unit is provided. The function approximation unit includes an input register that receives and stores an input value; a plurality of preprocessing circuits which performs a reciprocal function, a reciprocal of a square root function, or a negative exponential function. Here, an input value from the input register is transmitted to any one or a selected one of the plurality of preprocessing circuits. The function approximation unit also includes a programmable function approximation circuit that generates an approximated function output based on a preprocessing result by any one or the selected one of the plurality of preprocessing circuits and a plurality of post-processing circuits which performs a reciprocal function, a reciprocal of a square root function, or a negative exponential function. The preprocessing result by any one or the selected one of the plurality of preprocessing circuits and the approximated function output from the programmable function approximation circuit are transmitted to any one or the selected one of the plurality of post-processing circuits. The function approximation unit further includes an output register that receives and stores an output from any one or the selected one of the post-processing circuits.

According to an embodiment of the present disclosure, the function approximation unit further includes a first demultiplexer that transmits the input value from the input register to a selected preprocessing circuit among the plurality of preprocessing circuits according to a control signal thereof.

According to an embodiment of the present disclosure, the first demultiplexer transmits the input value to a selected circuit among the plurality of preprocessing circuits based on a two (2)-bit control signal.

According to an embodiment of the present disclosure, the function approximation unit further includes a first multiplexer and a second multiplexer that receive a preprocessing result output by any one or the selected one of the plurality of preprocessing circuits and selectively transmit the preprocessing result to the programmable function approximation circuit or the plurality of post-processing circuits.

According to an embodiment of the present disclosure, the function approximation unit further includes an intermediate register that stores a function approximation operation result output by the programmable function approximation circuit.

According to an embodiment of the present disclosure, the function approximation unit further includes a second demultiplexer that transmits an output from the intermediate register and the second multiplexer to a selected post-processing circuit among the plurality of post-processing circuits according to a control signal thereof.

According to an embodiment of the present disclosure, each of the plurality of preprocessing circuits includes a first decomposition circuit, a first decoder, and an input value generation circuit.

According to an embodiment of the present disclosure, each of the plurality of post-processing circuits includes an exponent conversion circuit, a second decomposition circuit, a decoder, an adder, an encoder, and a concatenation circuit.

According to an embodiment of the present disclosure, the plurality of preprocessing circuits and the plurality of post-processing circuits are variably configured according to an external setting or an internal operation condition.

The examples of the present disclosure disclosed in this specification and the drawings are presented as specific examples to easily explain the technical content of the present disclosure and to help understand the present disclosure, and are not intended to limit the scope of the present disclosure. It is apparent to those skilled in the art to which the present disclosure belongs that other modified examples based on the technical idea of the invention can be implemented in addition to the examples disclosed herein.

[National R&D Program Supporting This Invention]
[Project Unique Number] 2710008599
[Project Number] II220957
[Ministry] Ministry of Science and ICT
[Project Management (Specialized) Agency] Institute for Information & Communications Technology Planning & Evaluation (IITP)
[Research Program Name] PIM Artificial Intelligence Semiconductor Core Technology Development (Design)
[Research Project Name] Development of Edge-Oriented Distributed On-Chip Memory-Processor Converged PIM Semiconductor Technology
[Performing Organization] DeepX Co., Ltd.
[Research Period] Jan. 1, 2024-Dec. 31, 2024

What is claimed is:

1. An operating method of a function approximation unit configured to approximate a nonlinear function within a neural processing unit, wherein the function approximation unit comprises
an input register,
a plurality of preprocessing circuits respectively dedicated to different nonlinear functions and configured to perform a function-specific preprocessing including a reciprocal function, a reciprocal of a square root function, or a negative exponential function,
a single shared programmable function approximation circuit configured to approximate only a mantissa component using a comparator-based segmentation scheme, and a plurality of post-processing circuits respectively paired with the plurality of preprocessing circuits and configured to perform a function-specific post-processing, and the method comprises:
storing an input value through the input register;
transmitting the input value to a selected one of the plurality of preprocessing circuits according to a control signal;
generating a preprocessing result corresponding to the input value by the selected one of the plurality of preprocessing circuits;
transmitting the preprocessing result to the single shared programmable function approximation circuit and a selected one of the plurality of post-processing circuits;
generating an approximated function output based on the preprocessing result in the single shared programmable function approximation circuit; and
generating a final output value by post-processing the preprocessing result or the approximated function output in the selected one of the plurality of post-processing circuits.

2. The operating method of claim 1, wherein the control signal has a length of two bits and is used to select the selected one of the plurality of preprocessing circuits.

3. The operating method of claim 1, wherein the single shared programmable function approximation circuit is configured to receive an output received from the plurality of preprocessing circuits through a multiplexer and perform an approximation operation according to the preprocessing result.

4. The operating method of claim 1, wherein the single shared programmable function approximation circuit selectively receives one of a plurality of programmable parameter sets and performs an approximation operation on the preprocessing result.

5. The operating method of claim 1, wherein the function approximation unit further comprises an intermediate register that stores the preprocessing result and an output of the single shared programmable function approximation circuit, and the method comprises transmitting an output of the intermediate register and an output of the plurality of preprocessing circuits to one of the plurality of post-processing circuits according to a control signal thereof.

6. The operating method of claim 1, wherein each of the plurality of preprocessing circuits comprise a first decomposition circuit, a first decoder, and an input value generation circuit.

7. The operating method of claim 1, wherein each of the plurality of post-processing circuits comprise an exponent conversion circuit, a second decomposition circuit, a second decoder, an adder, an encoder, and a concatenation circuit.

8. The operating method of claim 1, wherein the function approximation unit further comprises a demultiplexer for selecting one of the plurality of post-processing circuits according to a control signal thereof.

9. The operating method of claim 1, further comprising transmitting the final output value to an output register of the function approximation unit through a multiplexer and storing the final output value.

10. The operating method of claim 1, wherein the plurality of preprocessing circuits and the plurality of post-processing circuits are variably configured according to a function type.

11. A function approximation device configured to approximate a nonlinear function within a neural processing unit, comprising:

an input register to receive and store an input value;

a plurality of preprocessing circuits respectively dedicated to different nonlinear functions and configured to perform a function-specific preprocessing including a reciprocal function, a reciprocal of a square root function, or a negative exponential function, wherein the input value from the input register is transmitted to a selected one of the plurality of preprocessing circuits;

a single shared programmable function approximation circuit configured to approximate only a mantissa component using a comparator-based segmentation scheme and to generate an approximated function output based on a preprocessing result generated by the selected one of the plurality of preprocessing circuits;

a plurality of post-processing circuits respectively paired with the plurality of preprocessing circuits and configured to perform a function-specific post-processing for the reciprocal function, the reciprocal of the square root function, or the negative exponential function, wherein the preprocessing result by the selected one of the plurality of preprocessing circuits and the approximated function output from the single shared programmable function approximation circuit are transmitted to a selected one of the plurality of post-processing circuits; and an output register to receive and store an output from the selected one of the plurality of post-processing circuits.

12. The function approximation device of claim 11, further comprising a first demultiplexer to transmit the input value from the input register to the selected one of the plurality of preprocessing circuits according to a control signal thereof.

13. The function approximation device of claim 12, wherein the first demultiplexer transmits the input value to the selected one of the plurality of preprocessing circuits based on a two-bit control signal.

14. The function approximation device of claim 11, further a comprising a first multiplexer and a second multiplexer, wherein the first multiplexer is configured to receive the preprocessing result output by the selected one of the plurality of preprocessing circuits and selectively transmit the preprocessing result to the single shared programmable function approximation circuit or the plurality of post-processing circuits.

15. The function approximation device of claim 14, further comprising an intermediate register to store a function approximation operation result output by the single shared programmable function approximation circuit.

16. The function approximation device of claim 15, further comprising a second demultiplexer to transmit an output from the intermediate register and a second multiplexer to the selected one of the plurality of post-processing circuits according to a control signal thereof.

17. The function approximation device of claim 11, wherein each of the plurality of preprocessing circuits comprises a first decomposition circuit, a first decoder, and an input value generation circuit.

18. The function approximation device of claim 11, wherein each of the plurality of post-processing circuits comprises an exponent conversion circuit, a second decomposition circuit, a decoder, an adder, an encoder, and a concatenation circuit.

19. The function approximation device of claim 11, wherein the plurality of preprocessing circuits and the plurality of post-processing circuits are variably configured according to an external setting or an internal operation condition.

\* \* \* \* \*